US011965325B2

(12) United States Patent
Puzio et al.

(10) Patent No.: US 11,965,325 B2
(45) Date of Patent: Apr. 23, 2024

(54) DRAIN CLEANING DEVICE

(71) Applicant: BLACK & DECKER INC.

(72) Inventors: Daniel Puzio, Baltimore, MD (US); Scott M. Rudolph, Aberdeen, MD (US); Jeffrey M. Cowart, El Dorado Hills, CA (US); Joseph C. Biser, Parkville, MD (US)

(73) Assignee: BLACK & DECKER INC., New Britain, CT (US)

( * ) Notice: Subject to any disclaimer, the term of this patent is extended or adjusted under 35 U.S.C. 154(b) by 0 days.

(21) Appl. No.: 17/976,396

(22) Filed: Oct. 28, 2022

(65) Prior Publication Data

US 2023/0047228 A1 Feb. 16, 2023

Related U.S. Application Data

(63) Continuation of application No. 16/811,030, filed on Mar. 6, 2020, now Pat. No. 11,512,460, which is a
(Continued)

(51) Int. Cl.
*E03F 9/00* (2006.01)
*B08B 9/043* (2006.01)
*B08B 9/045* (2006.01)

(52) U.S. Cl.
CPC ............ *E03F 9/005* (2013.01); *B08B 9/0436* (2013.01); *B08B 9/045* (2013.01)

(58) Field of Classification Search
CPC ............... F16B 2200/506; F16B 21/09; Y10T 403/7005; E03F 9/005; B08B 9/045
See application file for complete search history.

(56) References Cited

U.S. PATENT DOCUMENTS 1,251,404 A 12/1917 Mills
1,663,570 A 3/1928 Senz
(Continued)

FOREIGN PATENT DOCUMENTS

DE 102008015532 B4 8/2014
EP 2277634 B1 6/2012
(Continued)

OTHER PUBLICATIONS

European Patent Office Communication pursuant to Article 94(3) EPC, dated May 14, 2020, Application No. EP17164861.1.
(Continued)

*Primary Examiner* — Laura C Guidotti
(74) *Attorney, Agent, or Firm* — Scott B. Markow

(57) ABSTRACT

A drain cleaning device includes a power unit and a drum assembly coupled to the power unit for rotation by the power unit. The drum assembly includes a base, a cable received in the base that is configured to be fed from the base and rotated to clean a drain, and a cover releasably coupleable to the base. The drum assembly includes a plurality of taper locks releasably coupling an outer peripheral portion of the cover and an outer peripheral portion of the base. Each of the taper locks is moveable between a locked position in which the cover is retained on the base and an unlocked position in which the cover is removable from the base. Each of the taper locks being biased toward the locked position.

19 Claims, 49 Drawing Sheets

Related U.S. Application Data continuation of application No. 15/463,276, filed on Mar. 20, 2017, now Pat. No. 10,626,593.

(60) Provisional application No. 62/450,166, filed on Jan. 25, 2017, provisional application No. 62/318,671, filed on Apr. 5, 2016.

(56) References Cited

U.S. PATENT DOCUMENTS

| | | | |
|---|---|---|---|
| 1,803,847 | A | 5/1931 | Ellis |
| 1,927,780 | A | 9/1933 | Anderson |
| 2,272,178 | A | 2/1942 | McDowell et al. |
| 2,318,172 | A | 5/1943 | Long |
| 2,600,707 | A | 6/1952 | Turnbaugh |
| 2,661,489 | A | 12/1953 | Rudolph et al. |
| 3,018,127 | A | 1/1962 | Dobrosielski et al. |
| 3,093,854 | A | 6/1963 | Silverman |
| 3,224,024 | A | 12/1965 | Hunt |
| 3,268,937 | A | 8/1966 | Bollinger |
| 3,298,666 | A | 1/1967 | Prange |
| 3,329,044 | A | 7/1967 | Singer |
| 3,449,782 | A | 6/1969 | Hunt |
| 3,451,090 | A | 6/1969 | Lo Presti et al. |
| 3,556,570 | A | 1/1971 | Cosenza |
| 3,609,788 | A | 10/1971 | Mier |
| 3,691,583 | A | 9/1972 | Silverman et al. |
| 3,727,261 | A | 4/1973 | Levine |
| 3,747,153 | A | 7/1973 | O'Neill |
| 3,757,375 | A | 9/1973 | Strom |
| 3,897,602 | A | 8/1975 | Waterbury |
| RE30,175 | E | 12/1979 | Mier |
| 4,218,802 | A | 8/1980 | Babb et al. |
| 4,235,362 | A | 11/1980 | Hubenko |
| 4,361,924 | A | 12/1982 | Irwin |
| 4,364,139 | A | 12/1982 | Babb et al. |
| 4,395,791 | A | 8/1983 | Irwin |
| 4,580,306 | A | 4/1986 | Irwin |
| D284,125 | S | 6/1986 | Burke |
| 4,686,732 | A | 8/1987 | Irwin |
| 4,706,321 | A | 11/1987 | Kaye |
| 4,760,991 | A | 8/1988 | Asai |
| 4,763,374 | A | 8/1988 | Kaye |
| 4,793,017 | A | 12/1988 | Kaye |
| 4,914,775 | A | 4/1990 | Kirk |
| 4,956,889 | A | 9/1990 | Kirk |
| 5,029,356 | A | 7/1991 | Silverman |
| 5,031,263 | A | 7/1991 | Babb et al. |
| 5,031,276 | A | 7/1991 | Babb et al. |
| 5,116,382 | A | 5/1992 | Steinkamp et al. |
| 5,141,354 | A | 8/1992 | Morsbach |
| 5,156,573 | A | 10/1992 | Bytzek et al. |
| 5,173,984 | A | 12/1992 | Kaye |
| 5,193,824 | A | 3/1993 | Salpaka |
| 5,226,207 | A | 7/1993 | Elzauridia |
| 5,232,303 | A | 8/1993 | Rubner |
| 5,239,724 | A | 8/1993 | Salecker et al. |
| 5,297,310 | A | 3/1994 | Cox et al. |
| 5,347,673 | A | 9/1994 | Nickels, Jr. |
| 5,507,062 | A | 4/1996 | Salecker |
| 5,622,729 | A | 4/1997 | Mower |
| 5,640,736 | A | 6/1997 | Salecker |
| 5,675,202 | A | 10/1997 | Zenmei et al. |
| D387,254 | S | 12/1997 | Klamm |
| D403,932 | S | 1/1999 | Klamm |
| 5,901,401 | A | 5/1999 | Rutkowski et al. |
| 6,009,588 | A | 1/2000 | Rutkowski |
| 6,083,130 | A | 7/2000 | Mevissen et al. |
| 6,158,076 | A | 12/2000 | Rutkowski et al. |
| 6,243,905 | B1 | 6/2001 | Rutkowski |
| 6,343,398 | B1 | 2/2002 | Silverman et al. |
| 6,360,397 | B1 | 3/2002 | Babb |
| 6,398,179 | B1 * | 6/2002 | Soles .................... F16F 9/0454 248/617 |
| 6,412,136 | B1 | 7/2002 | Rutkowski |
| 6,470,525 | B1 | 10/2002 | Silverman |
| 6,478,463 | B2 | 11/2002 | Snider |
| 6,615,436 | B1 | 9/2003 | Burch, Jr. et al. |
| 6,637,064 | B2 | 10/2003 | Silverman et al. |
| 6,655,228 | B1 | 12/2003 | Margherio et al. |
| 6,729,470 | B2 | 5/2004 | Watlington |
| 6,758,116 | B2 | 7/2004 | Kriaski et al. |
| 7,073,224 | B2 | 7/2006 | Schmitt |
| 7,153,227 | B2 | 12/2006 | Dell et al. |
| 7,207,910 | B2 | 4/2007 | Dell et al. |
| 7,269,874 | B2 | 9/2007 | Hung |
| 7,367,077 | B2 | 5/2008 | Rutkowski et al. |
| 7,676,879 | B1 | 3/2010 | Rutenberg et al. |
| 7,685,669 | B2 | 3/2010 | Rutkowski et al. |
| 7,845,377 | B2 | 12/2010 | Edwards, Jr. et al. |
| 7,889,980 | B2 | 2/2011 | Sooy |
| 8,046,862 | B2 | 11/2011 | Eisermann et al. |
| 8,388,760 | B2 | 3/2013 | Aniban, Jr. |
| 8,615,837 | B2 | 12/2013 | Hale et al. |
| 8,677,868 | B2 | 3/2014 | Hoffman et al. |
| 8,826,483 | B2 | 9/2014 | Rutkowski et al. |
| 8,931,131 | B1 | 1/2015 | Feduke |
| 9,009,906 | B2 | 4/2015 | Hale et al. |
| 9,126,241 | B2 | 9/2015 | Majeed |
| 9,209,664 | B2 | 12/2015 | Sugitani |
| 9,410,607 | B2 | 8/2016 | Yamamoto |
| 2004/0086353 | A1 | 5/2004 | Diaconu |
| 2005/0279517 | A1 | 12/2005 | Hoffman et al. |
| 2007/0089254 | A1 | 4/2007 | Alaine |
| 2008/0148503 | A1 | 6/2008 | Babb et al. |
| 2008/0244816 | A1 | 10/2008 | Babb et al. |
| 2012/0210596 | A1 | 8/2012 | Lebel |
| 2013/0019422 | A1 | 1/2013 | Miller et al. |
| 2014/0260831 | A1 | 9/2014 | Hays et al. |
| 2015/0343583 | A1 | 12/2015 | McRoberts et al. |

FOREIGN PATENT DOCUMENTS

| | | | |
|---|---|---|---|
| EP | 2371462 | B1 | 5/2014 |
| FR | 2968173 | A3 | 6/2012 |
| GB | 2192224 | A | 1/1988 |
| JP | 56138558 | A | 10/1981 |
| JP | 60241564 | A | 11/1985 |
| WO | WO-2006113847 | A1 | 10/2006 |

OTHER PUBLICATIONS

K-45 Sink Machine—Ridgid Professional Tools—www.rigid.com/us/en/k45af-sink-machine—Apr. 17, 2015—15 pages.

Ridgid K-45 Drain Cleaning Machine—www.youtube.com/watch?v=Pik0ktbh5gU—Apr. 17, 2015—2 pages.

K-39/K39-B Drain Cleaner Operator's Manual—Ridgid/Kollmann—12 pages.

Geisenhofer, Michael—European Search Report re: EP 17164861.1-1614—dated Oct. 30, 2017—10 pages—Munich.

Geisenhofer, Michael—Communication pursuant to Article 94(3) EPC re: EP 17164861.1-1002—dated Aug. 12, 2019—Munich.

Communication pursuant to Article 94(3) EPC, EP Application No. 21193688.5, dated Dec. 6, 2023, 8 pages, EPO.

* cited by examiner

DRAIN CLEANING DEVICE

RELATED APPLICATIONS

This application is a continuation of U.S. patent application Ser. No. 16/811,030, filed Mar. 6, 2020, titled “Drain Cleaning Device,” which is a continuation of U.S. patent application Ser. No. 15/463,276, filed Mar. 20, 2017, titled “Powered Drain Auger,” which claims priority, under 35 U.S.C. § 119(e), to U.S. Provisional Application No. 62/450,166, filed Jan. 25, 2017, titled “Powered Drain Auger,” and to U.S. Provisional Application No. 62/318,671, filed Apr. 5, 2016, titled “Powered Drain Auger,” each of which is hereby incorporated by reference.

FIELD

This document relates, generally, to a drain cleaning device, and in particular, to a powered drain cleaning device.

BACKGROUND

Drain cleaning devices may direct a cleaning cable, or snake, into a drain or pipe to dislodge and clear obstructions in the drain or pipe. A twisting or rotating motion may be applied to the cleaning cable, either alone or in combination with insertion of the cleaning cable into the pipe and/or removal of the cleaning cable from the pipe, to dislodge the obstruction and remove the obstruction from the pipe. In a handheld, powered, or motorized, drain cleaning device, the ability to quickly and easily adjust a feed direction of the cleaning cable, and a more compact and lightweight design, may make the device more convenient and easy to use in a variety of different environmental situations, and may facilitate use of the device in drain cleaning operations requiring more precise control and manipulation of the cleaning cable.

SUMMARY

In one aspect, a drain cleaning device may include a power unit, and a drum assembly coupled to the power unit. The drum assembly may include a shroud fixedly coupled to a housing of the power unit, a drum fixedly coupled to a spindle of the power unit, wherein the drum is configured to rotate in response to a rotational force generated by the power unit and transferred to the spool by the spindle, and a cable wound in the drum. The drain cleaning device may also include a feed handle assembly coupled to the drum assembly; and a feed mechanism coupled to the handle assembly and configured to guide the cable through the feed handle assembly, the feed mechanism including a quick release selector configured to selectively engage the roller assembly with the cable to enable the cable to be fed through the feed handle assembly, and a directional selector configured to vary a feed direction of the cable based on a rotational positon of a roller assembly in the feed mechanism.

In some implementation, the feed mechanism may include a feed housing; a shift plate at a first end of the feed housing; a front plate at a second end of the feed housing; an axial bore extending through the handle assembly, the shift plate, the feed housing and the front plate to guide the cable through the feed mechanism; a circumferential band surrounding the shift plate, the feed housing and the front plate; and a shift ring coupled between the circumferential band and a housing of the handle assembly, and fixedly coupled to the shift plate such that the shift plate rotates together with the shift ring. In some implementations, the feed mechanism may also include a plurality of radial bores defined in the feed housing, extending radially outward from the axial bore; and a plurality of roller subassemblies respectively positioned in the plurality of radial bores. Each of the plurality of roller subassemblies may include a carrier received in a respective radial bore of the plurality of radial bores; a pin extending from the carrier into a corresponding slot in the shift plate such that the carrier rotates about an axial centerline of its respective radial bore in response to rotation of the shift ring and corresponding rotation of the shift plate; and a roller rotatably coupled to the carrier and extending into the axial bore to contact the cable passing through the axial bore.

In some implementations, in a first mode, the shift ring and the shift plate are rotated to a first position, and the plurality of roller subassemblies are rotated to a first position in the plurality of bores such that the rollers of the plurality of roller subassemblies are oriented to guide the cable through the handle assembly in a first direction. In a second mode, the shift ring and the shift plate are rotated to a second position, and the plurality of roller subassemblies are rotated to a second position in the plurality of bores such that the rollers of the plurality of roller subassemblies are oriented to guide the cable through the handle assembly in a second direction. In a third mode, the shift ring and the shift plate are rotated to a third position, and the plurality of roller subassemblies are rotated to a third position in the plurality of bores such that the rollers of the plurality of roller subassemblies are oriented to maintain the cable in a stationary position in the axial bore.

In some implementations, the drain cleaning device may include a radial projection extending radially outward from an outer circumference of the shift plate and through an opening in the feed housing, with a radial slot defined in the radial projection, the pin of one of the plurality of roller subassemblies being received in the radial slot. In some implementations, the drain cleaning device may include a release switch slidably coupled in a radial slot defined in the shift ring, the release switch including a finger configured to be selectively received in the radial slot defined in the radial projection of the shift plate. In a retention mode, the release switch is in a forward position in the axial slot defined in the shift ring, the finger of the release switch is positioned in the radial slot defined in the radial projection of the shift plate, and the pin of the one of the plurality of roller subassemblies is maintained at an inner radial position in the radial slot by the finger positioned in the radial slot, with the roller of the one of the plurality of roller subassemblies in an engagement position with the cable in the axial bore. In a release mode, the release switch is in a rearward position in the axial slot defined in the shift ring, the finger of the release switch is removed from the radial slot defined in the radial projection of the shift plate, and the pin of the one of the plurality of roller subassemblies is moved to an outer radial position in the radial slot, with the roller of the one of the plurality of roller subassemblies disengaged from the cable in the axial bore.

In some implementations, the drain cleaning device may include a lighting assembly coupled to the shroud, the lighting assembly including at least one mounting flange at an outer peripheral portion of the shroud; a light source pivotably coupled to the at least one mounting flange; and a retention device configured to selectively fix a position of the light source relative to the at least one mounting flange. In some implementations, the drain cleaning device may include at least one lighting assembly coupled to one of the handle assembly or the drum; and at least one power source included in the one of the handle assembly or the drum to provide power to the at least one lighting assembly.

In some implementations, the drain cleaning device may include a plurality of detents defined in a forward peripheral edge of the shroud; and an adjustment lever elastically coupled to a rear portion of the handle assembly and configured to selectively engage one of the plurality of detents to couple the handle assembly to the shroud, wherein a position of the handle assembly relative to the shroud is adjustable to a plurality of positons corresponding to the plurality of detents. In some implementations, the cable may include a first tool at a first end of the cable, and a second tool at a second end of the cable, the diameter of the first tool and a diameter of the second tool being greater than a diameter of the cable.

In another aspect, a feed mechanism for a drain cleaning device may include a feed housing; a shift plate at a first end of the feed housing; a front plate at a second end of the feed housing; an axial bore extending through the handle assembly, the shift plate, the feed housing and the front plate to guide a cable through the feed mechanism; a plurality of radial bores defined in the feed housing, extending radially outward from the axial bore; a plurality of roller subassemblies respectively positioned in the plurality of radial bores defined in the feed housing; a circumferential band surrounding the shift plate, the feed housing and the front plate; and a shift ring fixedly coupled to the shift plate and rotatably coupled with respect to the circumferential band such that the shift plate rotates together with the shift ring.

In some implementations, each of the plurality of roller subassemblies may include a carrier received in a respective radial bore of the plurality of radial bores; a roller mounted on an axle coupled to the carrier and extending into the axial bore to contact the cable passing through the axial bore; and a pin extending from the carrier into a corresponding slot in the shift plate, wherein the position of the pin in the corresponding slot in the shift plate causes the carrier to rotate about an axial centerline of its respective radial bore in response to rotation of the shift ring and corresponding rotation of the shift plate. In a first mode, the shift ring and the shift plate are rotated to a first position, and the plurality of roller subassemblies are rotated to a first position in the plurality of bores such that the rollers of the plurality of roller subassemblies are oriented to guide the cable through the axial bore in a first direction. In a second mode, the shift ring and the shift plate are rotated to a second position, and the plurality of roller subassemblies are rotated to a second position in the plurality of bores such that the rollers of the plurality of roller subassemblies are oriented to guide the cable through the axial bore in a second direction. In a third mode, the shift ring and the shift plate are rotated to a third position, and the plurality of roller subassemblies are rotated to a third position in the plurality of bores such that the rollers of the plurality of roller subassemblies are oriented to maintain the cable in a stationary position in the axial bore.

In another aspect, a cable for a drain cleaning device may include a main cable body having a first end and a second end; a first tool included at the first end of the main cable body; and a second tool included at the second end of the main cable body. In some implementations, the first tool and the second tool are different tools.

In another aspect, a drain cleaning device may include a power unit including a housing containing a motor and an output spindle configured to be rotated by the motor, and a handle having a first end coupled to the housing and extending transverse to the housing to a second end that is coupleable to a power supply; a drum assembly including a shroud having a center portion non-rotatably coupled to the housing and a drum containing a drain cleaning cable, the drum rotatably received in the shroud and non-rotatably coupled to the output spindle so that the drum rotates in response to rotation of the output spindle by the motor; a light emitting assembly coupled to shroud; and a support arm coupled to the second end of the handle and to a peripheral portion of the shroud, the support arm providing structural support for the shroud and providing a channel for providing electrical power from the power supply to the light emitting assembly. In some implementations, the light assembly is pivotally mounted to the shroud. In some implementations, the power unit includes a switch configured to control operation of the motor and of the light emitting assembly.

In another aspect, a drain cleaning device may include a drum assembly including a rotationally stationary shroud and a drum containing a drain cleaning cable, the drum rotatably received in the shroud so that the drum rotates in response to rotation of the output spindle by the motor; a handle assembly coupled to the drum assembly and including a longitudinal bore configured to receive the cable as it is fed from the drum; a tool-free selector configured to non-rotatably fix the handle assembly to the shroud in a plurality of discrete rotational positions relative to the shroud. In some implementations, the tool-free selector comprises a spring biased lever extending radially outward from the handle assembly and a plurality of detents on a periphery of the shroud such that the lever is configured to engage one of the plurality of detents in each of the discrete rotational positions.

In another aspect, a drain cleaning device may include a power unit, a drum assembly coupled to the power unit, the drum assembly including a drum containing a cable, the drum configured to be rotatably driven by the power unit, a feed handle assembly coupled to the drum assembly and configured to receive the cable, and a cable locking mechanism coupled to the feed handle assembly and having a selector with a plurality of positions, each configured to selectively secure a different sized cable diameter in the feed handle assembly.

In some implementations, the cable locking mechanism may include a sleeve positioned between an inner circumferential portion of the handle assembly and an outer circumferential portion of a guide portion of the drum, an engagement portion defined on an inner circumferential surface of the sleeve, and a plurality of locking clamps coupled to the outer circumferential portion of the guide portion of the drum, and configured to selectively engage with the engagement portion of the sleeve. In some implementations, the engagement portion may include a plurality of stepped portions, and a plurality of ramped portions alternately arranged with the plurality of stepped portions. In some implementations, each of the plurality of locking clamps may include an inclined portion configured to selectively engage the engagement portion of the sleeve, and a leg portion configured to extend into a hollow interior portion of the guide portion in response to engagement of the inclined portion with the engagement portion of the sleeve so as to selectively contact a cable in the guide portion. In some implementations, the leg portion is configured to extend into the guide portion as the inclined portion of the locking clamp moves along one of the ramped portions, and the leg portion is configured to be fixed in place in engagement with the cable when the inclined portion of the locking clamp is engaged with one of the plurality of stepped portions, each of the plurality of stepped portions corresponding to a diameter size of a cable to be received in the guide portion.

In another aspect, a drain cleaning device may include a power unit, and a drum assembly coupled to the power unit. The drum assembly may include a base that receives a cable, a cover releasably coupleable to the base, and a lock assembly releasably coupling the cover to the base, the lock assembly including a plurality of taper locks releasably coupling an outer peripheral portion of the cover and an outer peripheral portion of the base.

In some implementations, each of the plurality of taper locks may include a locking plate received in a recess defined in the outer peripheral portion of the cover, a keyhole slot formed in the locking plate, the keyhole slot extending longitudinally in the locking plate, the keyhole slot having an elongated portion and an enlarged portion, and an engagement pin provided on the outer peripheral portion of the base, at a position corresponding to the keyhole slot, the engagement pin being configured to selectively engage the elongated portion or the enlarged portion of the keyhole slot based on a rotational positon of the cover relative to the base. In some implementations, the engagement pin may include a shank extending upward from the outer peripheral portion of the base and through the keyhole slot in the locking plate, and a head at a top end portion the of shank, the head selectively engaging a top surface of the locking plate based on a position of the engagement pin in the keyhole slot. In some implementations, a thickness of the locking plate increases gradually from a portion of the locking plate corresponding to the enlarged portion of the keyhole slot to a portion of the locking plate corresponding to the elongated portion of the keyhole slot.

In some implementations, each of the plurality of taper locks is configured to be in an unlocked position when the head of the engagement pin is at a position corresponding to the enlarged portion of the keyhole slot, and is configured to be in a locked position when the locking plate is moved relative to the base so as to position the engagement pin in the elongated portion of the keyhole slot such that the head of the engagement pin abuts a top surface of the locking plate. In some implementations, an elastic member may be coupled to an end portion of the locking plate, wherein the elastic member is configured to bias the taper lock in the locked position, and the elastic member is configured to be compressed in response to an external force applied to the locking plate to move the taper lock to the unlocked position.

In some implementations, the device may include an actuating pad provided on a top surface of the locking plate and configured to receive a first external force, the first external force moving the taper lock from the locked position to the unlocked position, an articulating protrusion formed on an edge of the actuating pad, a stepped portion formed in an edge portion of the locking plate, and a release pad extending upward from a top portion of the locking plate. In some implementations, the articulating protrusion is configured to contact a first lateral side wall of the recess in response to the first external force applied to the actuating pad, and to articulate an opposite end of the taper lock outward, and the stepped portion is configured to engage a corner portion of a second lateral side wall of the recess, opposite the first lateral side wall of the recess, in response to the outward articulation of the taper lock, the engagement of the stepped portion of the locking plate with the corner portion of the second lateral side wall of the recess maintaining the unlocked position of the taper lock. In some implementations, the locking plate is configured to articulate inward, from the locked position, in response to a second external force applied to release pad, the second external force applied to the release pad releasing the engagement of the stepped portion of the locking plate with the corner portion of the second lateral side wall of the recess.

The details of one or more implementations are set forth in the accompanying drawings and the description below. Other features will be apparent from the description and drawings, and from the claims.

DETAILED DESCRIPTION

Figure 1A:
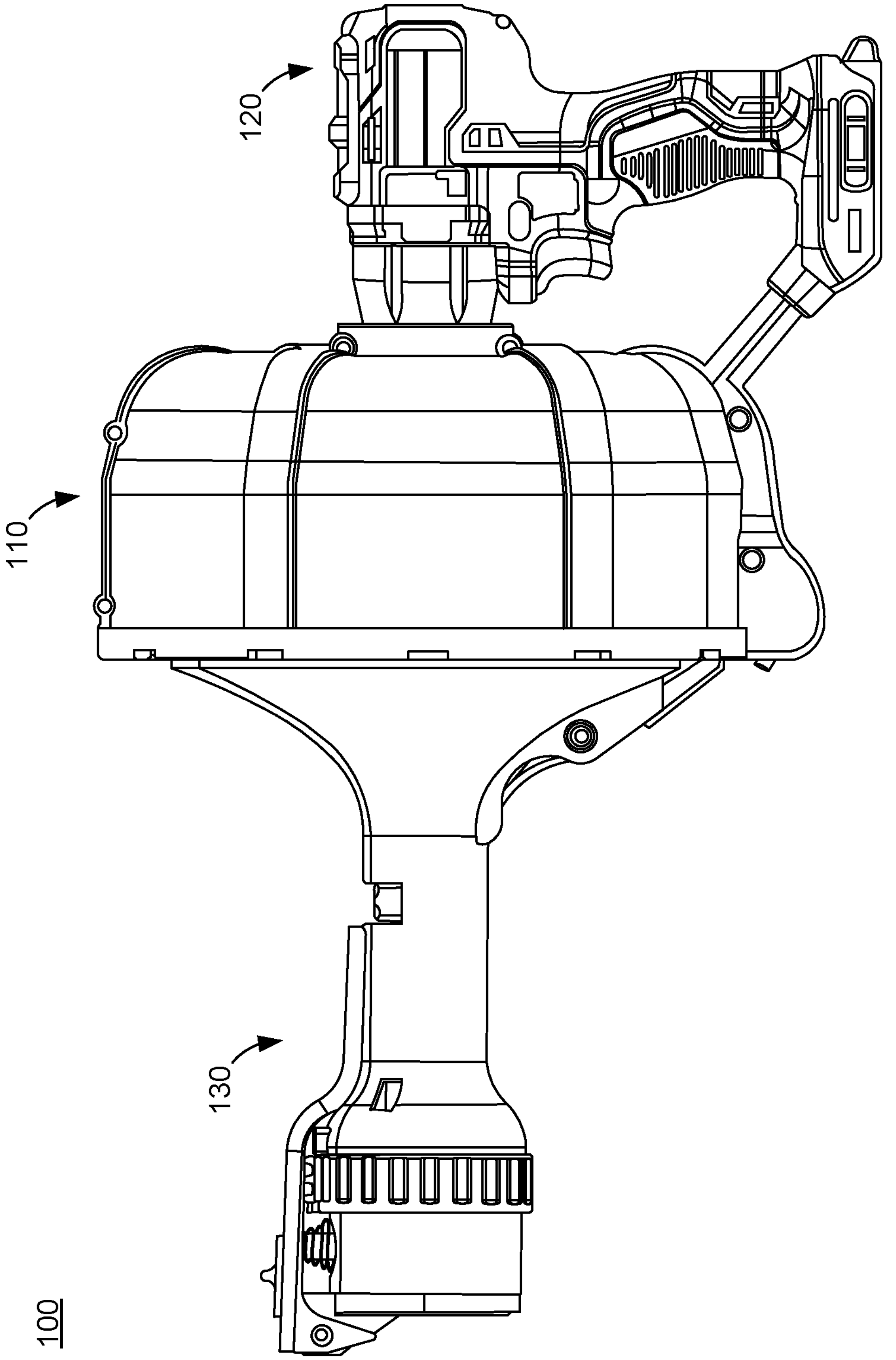
FIGS. 1A-1C and 1E illustrate example drain cleaning devices.
Figure 1B:
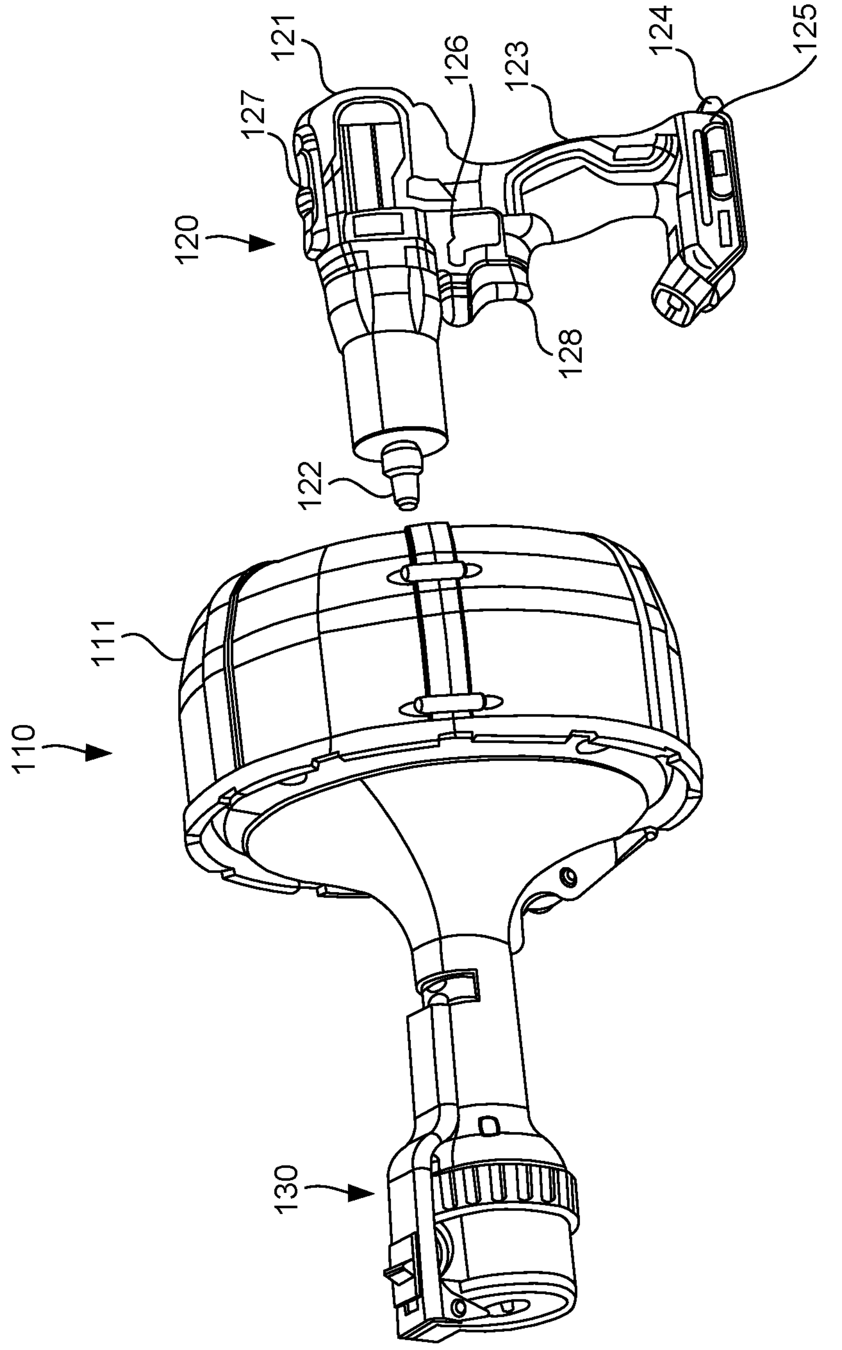

A drain cleaning device such as, for example, a powered, or motorized, drain auger, may be used to dislodge and/or clear obstructions from, for example, waste water and sewer drains, pipes and the like. This type of drain cleaning device may include, for example, a rotating drum coupled to a handheld power unit, with a cleaning cable wound in the drum, and a feed mechanism controlling a feed direction of the cleaning cable into and/or out of the drain to be cleaned, as well as rotating or twisting the cable, as the handheld power unit rotates the drum. The feed mechanism may be housed within a handle coupled to the drum, for example, on a side of the drum opposite the power unit, to facilitate the movement of the cable into and out of the drain, and engagement of a tool at a cleaning end of the cable with an obstruction to be dislodged. In some implementations, the feed of the cable through the feed mechanism (i.e., into and out of the drain cleaning device) may be powered, for example, in response to power transmitted to the feed mechanism by the power unit. In some implementations, the feed of the cable through the feed mechanism (i.e., into and out of the drain cleaning device) may be accomplished manually, by a user. Simple and precise control of the cable feed, as well as rotation of the cable once in place and engaged with the obstruction to be dislodged, and a relatively compact and/or relatively light weight design, may facilitate access to the drain to be cleaned and use of the drain cleaning device in a variety of different situations in which factors such as portability, maneuverability, and augering power may impact the effectiveness of a particular drain cleaning device. In a drain cleaning device in accordance with implementations as described herein, a feed direction of a cable through the device may be controlled by controlling a direction/orientation of a single set of roller subassemblies, without changing a rotation direction of the motor provided in the power unit 120. Further, enlarged ends of the cable, and differed sized cables, may be easily accommodated by manipulation of a shift ring, lever, and selector switch to adjust a size of a feed opening at a distal end of the device.

An example drain cleaning device 100, in accordance with implementations as described herein, is shown in FIGS. 1A-1D. The drain cleaning device 100 may include a drum assembly 110 coupled to a handheld power unit 120. The power unit 120 may include a spindle 122 that is rotated by a motor received within a housing 121 of the power unit 120, with a receptacle 125 receiving a power supply 124 to supply power to the motor. The spindle 122 may be coupled, for example, fixedly coupled, to a drum 113 housed within a stationary shroud 111 of the drum assembly 110 so that, as the motor rotates the spindle 122 of the power unit 120, the drum 113 is rotated together with the spindle 122. In some implementations, the drum 113 may include a base 113A and a cover 113B. In some implementations, a cable 140 may be wound directly in the drum 113. In some other implementations, a spool or drum liner 112 having the cable 140 wound thereon may be received in the drum 113. The spool 112 may facilitate the installation and removal of different types of cables, and may contain any debris and/or water collected on the cable 140 within the spool 112, and from infiltrating other areas of the drain cleaning device 100.

A feed handle assembly 130 may be coupled to the drum assembly 110, for example, at a side of the shroud 111 of the drum assembly 110 opposite the power unit 120. In some implementations, after the cover 113B is attached to the base 113A of the drum 113, the feed handle assembly 130 may be coupled to the cover 113B of the drum 113. As the spool 112 is rotated within the shroud 111, the shroud 111 and the handle assembly 130 may remain substantially stationary, and a cleaning cable 140 wound in the drum 113 may also rotate and be fed out of drum assembly 110 and through the handle assembly 130 and/or retracted back into the handle assembly 130 and drum assembly 110, based on a directional orientation of a feed mechanism 200 of the feed handle assembly 130.

Figure 1C:
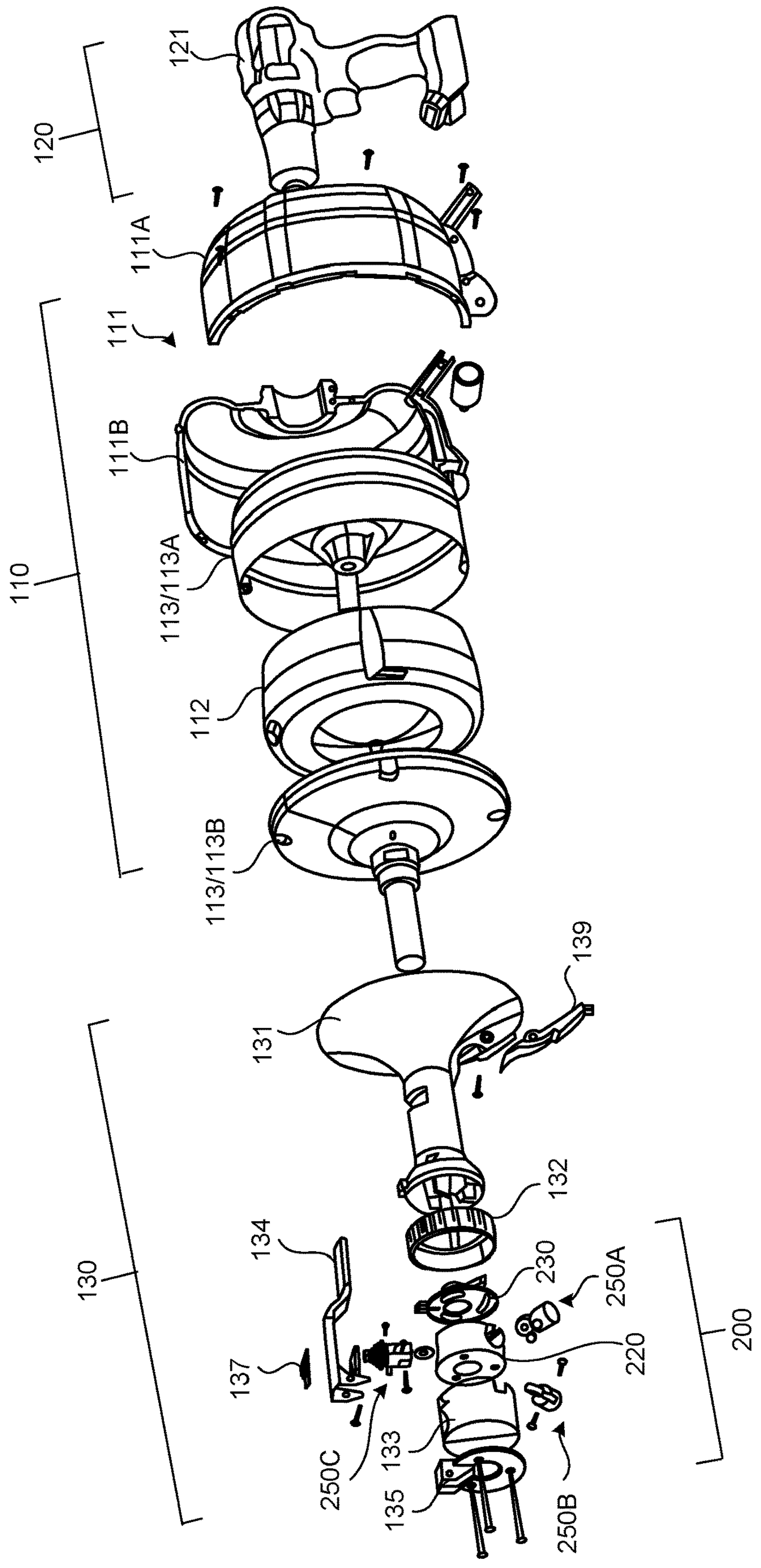
Figure 1D:
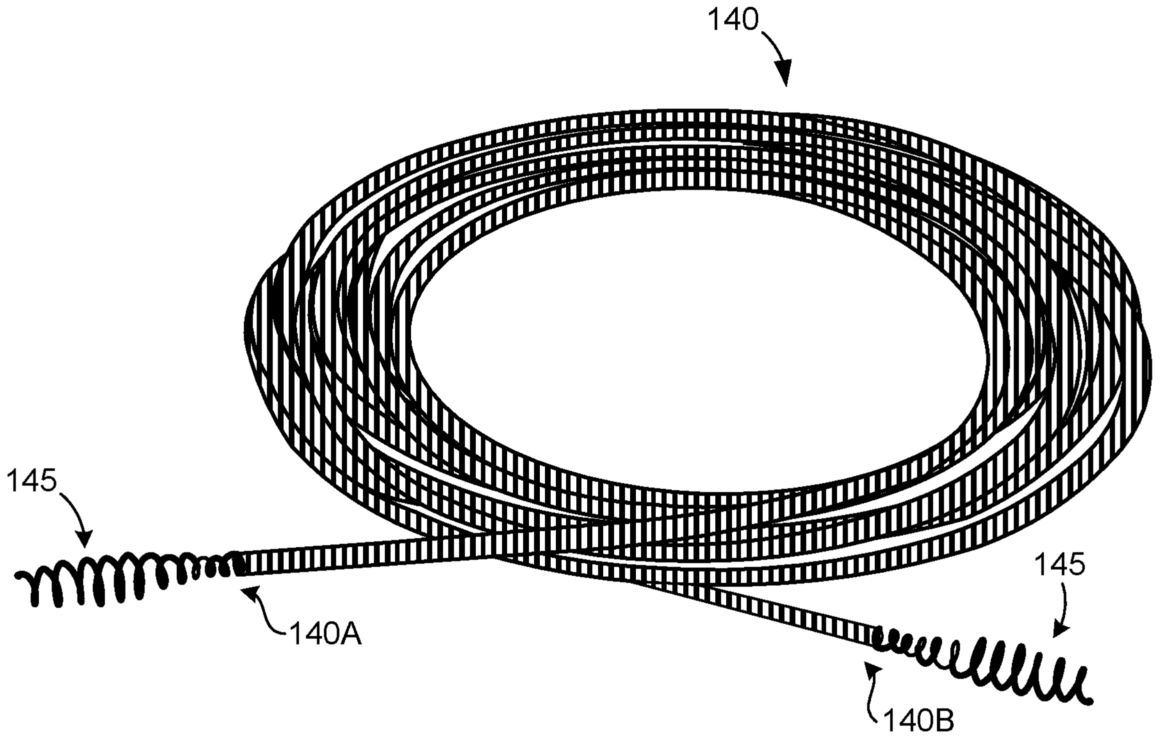
FIG. 1D illustrates an example cleaning cable of the example drain cleaning devices shown in FIGS. 1A-1C and 1E, in accordance with implementations as described herein.

An example cleaning cable 140, which may be loaded in the drum 113 and/or wound around the spool 112 as described above, and which may be fed out of the drum 113 and through the handle assembly 130 and/or may be fed back into the handle assembly 130 and into the drum 113, is shown in FIG. 1D. The cleaning cable 140 may include a tool 145 at a working end portion of the cable 140, the tool 145 being configured to engage and dislodge obstructions encountered in the drain or pipe as the cleaning cable 140 is moved into and out of the pipe. In some implementations, both a first end 140A and a second end 140B of the cable 140 may include a tool 145. The tool 145 may be integrally formed at or attached to the respective end 140A/140B of the cable 140. In some implementations, the cable 140 may include a tool 145 at only one end of the cable 140.

The cable 140 having a tool 145 at each end, as shown in FIG. 1D, is just one example of a cleaning cable which may be used with a drain cleaning device 100 as described herein. In some implementations, the cleaning cable 140 may have various different sizes, i.e., diameters and lengths, depending on a particular working environment, capacity and capability of the drain cleaning device 100, and other such factors. In some implementations, the tool 145 may be, for example, a coiled, bulbous tool 145 as shown in the example of FIG. 1D, a brush type tool, a hook type tool, and other such tools which may engage and dislodge obstructions encountered in drains and pipes. A cable 140 having a tool 145 at both ends 140A and 140B of the cable 140 may provide additional flexibility and functionality to the user, in that this type of cable 140 may allow for different tools to be provided at the first and second ends 140A and 140B of the cable 140, and/or may provide a backup tool 145 at the second end 140B of the cable 140 should the tool 145 at the first end 140A of the cable 140 break, should the cable 140 become crimped, and the like. Additionally, the tool 145 at the second end 140B of the cable 140 may provide a stop that prevents the cable 140 from completely exiting the drain cleaning device 100 and being lost in the drain or pipe being cleaned.

In some implementations, the power unit 120 may include, for example, a motor and a power transmission device (not shown) received in the housing 121 and configured to transmit a rotational force from the motor to the spindle 122 at a speed that is appropriate for rotation of the drum 113 in the drum 110 in drain cleaning/augering operation(s). In some implementations, the power unit 120 may be, for example, similar to a power unit of a handheld drill driver tool having a spindle end that may be connected to the drum assembly 110, and/or may that be adapted to be connected to the drum 110, the drill driver tool being capable of operation at speeds that are appropriate for the drain cleaning/augering operation(s) to be described below. For example, the power unit 120 may include a motor assembly and transmission assembly disposed in the housing 121, a handle 123 extending downward from the housing 121, and a power supply receptacle 124 at a base of the handle 123 for receiving a power supply such as a battery pack or an AC power supply. Coupled to the handle 123 are a variable speed trigger 128 that controls power supply to the motor via control electronics to control the output speed of the motor. Also coupled to the housing 121 is a forward/reverse switch 126 for changing the direction of rotation of the motor. In addition, the power unit 120 may include a speed selector switch 127 for changing the gear ratio of the transmission among more than one output speed reduction. Operation and features of the power unit 120 are well known and further details can be found, for example, in U.S. Pat. Nos. 5,897,454 and 6,431,289, which are hereby incorporated by reference.

Figure 1E:
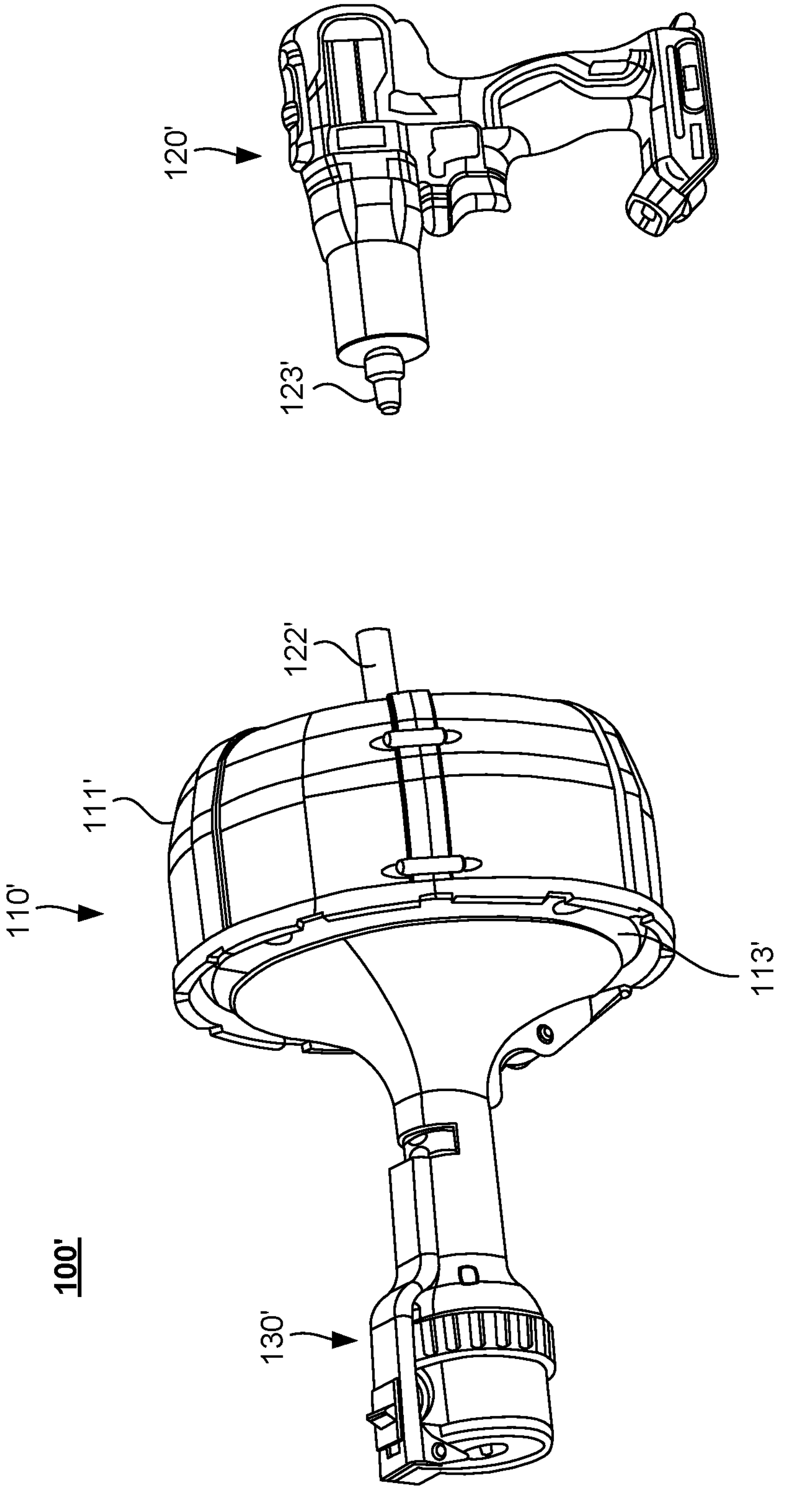

As shown in FIG. 1E, in an alternative implementation, the a drain cleaning device 100' may include a drum assembly 110' and a feed handle mechanism 130' that may be detachably coupled to a separate and conventional rotary power tool 120', such as a corded or cordless drill, a drill driver, an impact driver, a hammer drill, or a screwdriver. The drain cleaning device 100' may include a drive spindle 122' fixedly and non-rotatably coupled to the drum assembly 110' and extending axially rearward from a stationary shroud 111'. The drive spindle 122' can be non-rotatably received in a tool holder or chuck 123' of the rotary power tool 120'. Actuation of the motor of the power tool 120' causes rotation of the tool holder or chuck 123', which in turn rotates the drive spindle 122' and drum 113' of the drain cleaning device 100'.

Figure 2A:
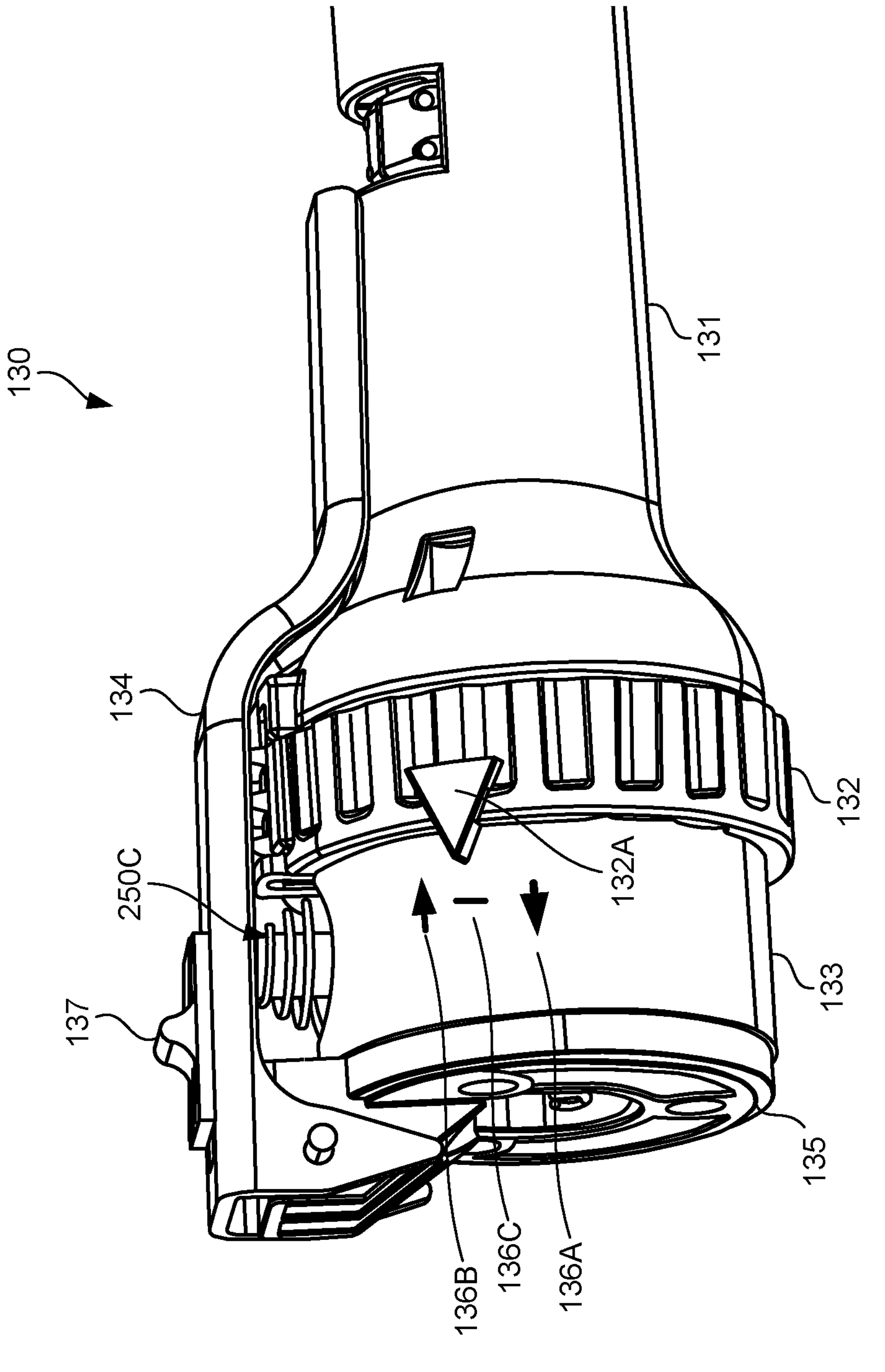
FIGS. 2A-2D illustrate a handle assembly and feed mechanism of a drain cleaning device.

As shown in FIG. 2A, the handle assembly 130 may include a handle housing 131 that defines a grasping surface for positioning the drain cleaning device 100 relative to the drain or pipe to be cleaned. A shift ring 132 may be rotatably coupled between the handle housing 131 and a circumferential band 133, with a front end plate 135 enclosing a distal end of the handle assembly 130. The shift ring 132 may include a selector 132A to select a feed direction for the cable 140 through the handle assembly 130. That is, the shift ring 132 may be rotated relative to the handle housing 131 and the circumferential band 133 so that the selector 132A is aligned with a forward feed direction indicator 136A. This alignment, together with a force applied to a lever 134 and power applied by the motor of the power unit 120 to rotate the drum, may cause the cable 140 to be fed out through the distal end of the handle assembly 130. Similarly, the shift ring 132 may be rotated so that the selector 132A is aligned with a reverse, or retract feed direction indicator 136B. This alignment, together with a force applied to the lever 134 and power applied by the motor of the power unit 120, may cause the cable 140 to be retracted back into the handle assembly 130. The shift ring 132 may be rotated so that the selector 132A is aligned with a neutral, or locked, indicator 136C, causing the cable 140 remain fixed at the current position or length. While in this neutral, or fixed position, the cable 140 may continue to twist or rotate due to the rotation of the spool 112 in response to the rotational force generated by the power unit 120 and an application of force to the lever 134. This twisting or rotation of the cable 140, and in particular, the tool 145 at the working end of the cable 140 while engaged with an obstruction in the drain or pipe may work to dislodge the obstruction and clear the drain or pipe. The cable 140, and in particular, the tool 145 at the working end of the cable 140, may also be twisted or rotated while being fed out of the handle assembly 130 or retracted into the handle assembly 130, to dislodge debris as it travels along the length of the pipe or drain to be cleared.

In the example shown in FIG. 2A, the forward feed indicator 136A, the reverse feed indicator 133B, and the neutral indicator 136C are shown on a portion of the circumferential band 133. However, in some implementations, these indicators 136A/136B/136C may be provided in another location such as, for example, on a corresponding portion of the handle housing 131 adjacent to the shift ring 132. In the example shown in FIG. 2A, the indicators 136A/136B/136C are illustrated as symbols, i.e., forward and reverse arrows, and a line symbolizing neutral. However, in some implementations, the indicators 136A/136B/136C may be represented by other symbols such as, for example, letters, numbers, other characters, other symbols and the like.

The lever 134 may be pivotably coupled to, for example, the front end plate 135. The lever 134 may engage and disengage a pressure roller subassembly 250C so that, together with adjustment of a cable diameter selector switch 137, the feed mechanism 200/handle assembly 130 may be adjusted to feed cables having different diameters. This may also allow the tool 145 at the working end of the cable 140, having a larger diameter than the cable 140, to be fed through the distal end of the handle assembly 130 when loading a new cable 140 in the drain cleaning device 100.

Figure 2B:
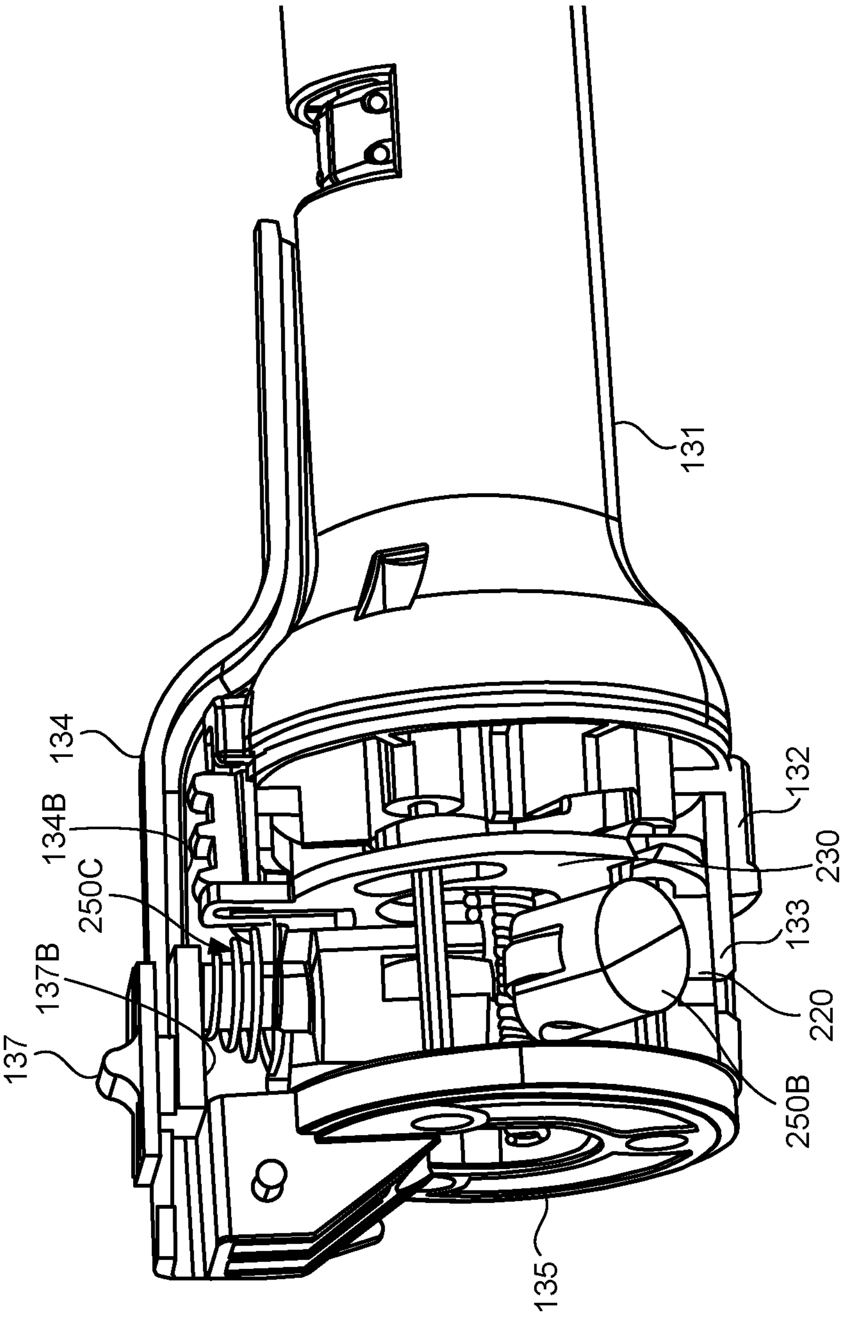
Figure 2C:
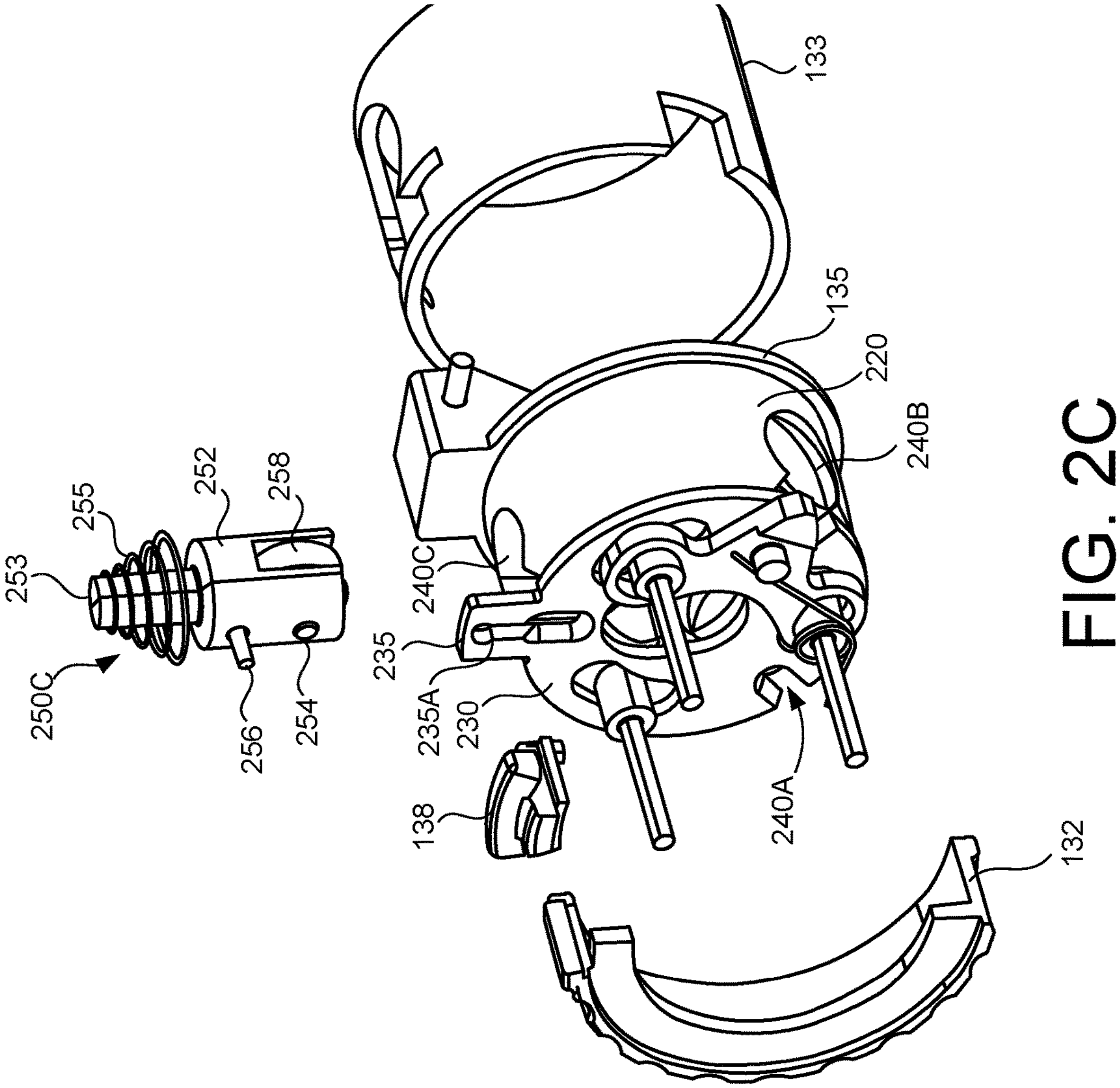
Figure 2D:
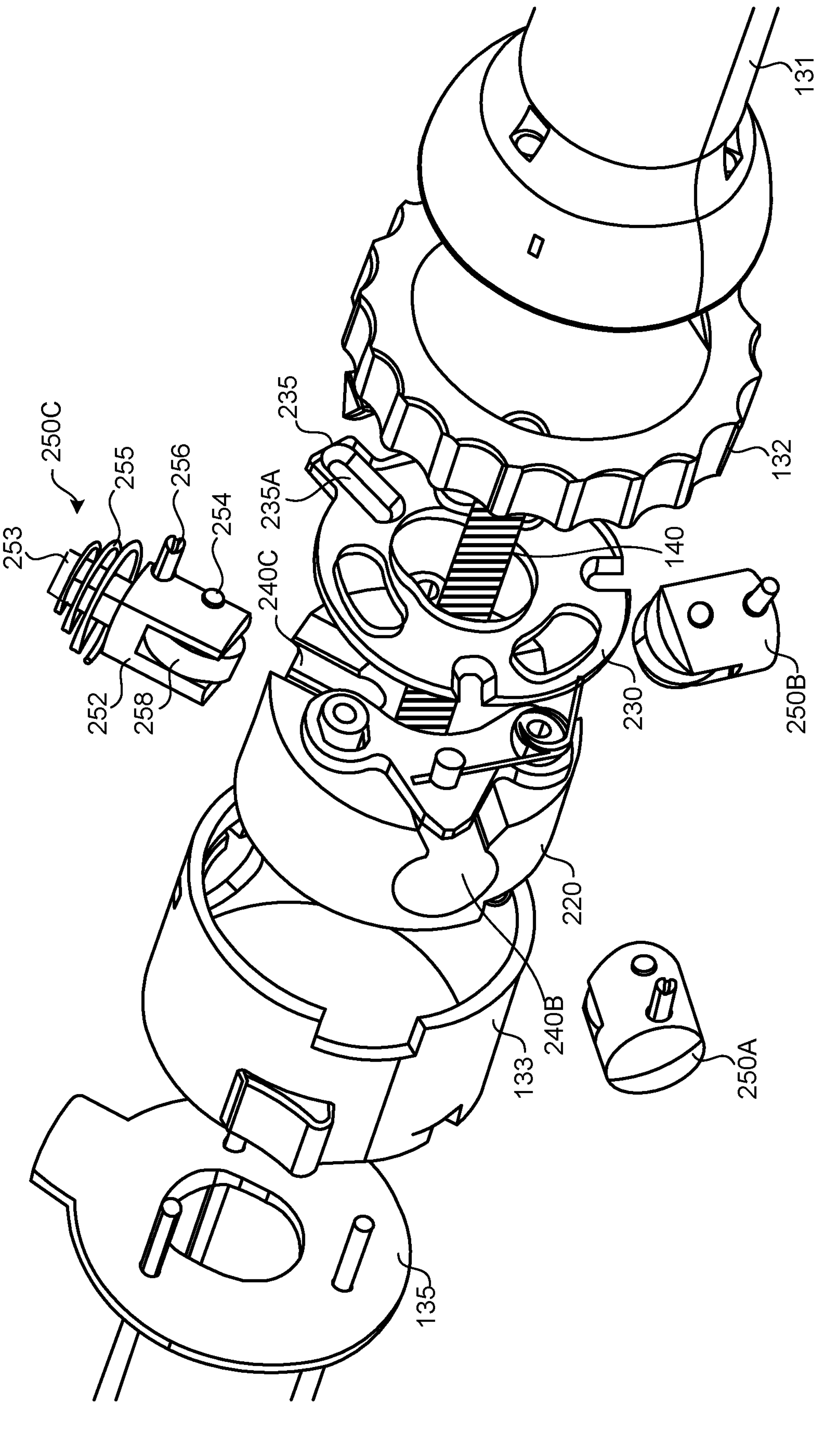

FIG. 2B is a side view of the handle assembly 130, with the shift ring 132 and the circumferential band 133 partially cut away so that the feed mechanism 200 is visible, and FIGS. 2C and 2D are exploded perspective views of the feed mechanism 200. As noted above, operation of the power unit 120 may rotate the drum 113 within the drum assembly 110, causing the cable 140 to rotate axially as the drum 113 rotates. The feed mechanism 200 may receive the cable 140 from the drum assembly 110 and may feed the cable 140 in a forward direction out of the drum assembly 110 and handle assembly 130, or in a reverse direction into the handle assembly 130 and the drum assembly 110, or may maintain the cable 140 in a stationary position in which the cable 140 rotates but is not fed in either direction.

The feed mechanism 200 may include a feed housing 220 and a shift plate 230 received in the circumferential band 133, positioned between the handle housing 131 and the front end plate 135. Each of the handle housing 131, the feed housing 220, the shift plate 230 and the front end plate 135 may include a concentrically aligned axial bore that receives and guides the cable 140 through the handle assembly 130. The feed housing 220 may include three radial bores 240A, 240B and 240C in communication with the axial bore. The first radial bore 240A may be positioned at approximately 4 o'clock to receive a first feed roller subassembly 250*a*, and the second radial bore 240B may be positioned at approximately 8' oclock to receive a second feed roller subassembly 250B. The third radial bore 240C may be positioned at approximately 12 o'clock to receive the pressure roller subassembly 250C.

Figure 2E:
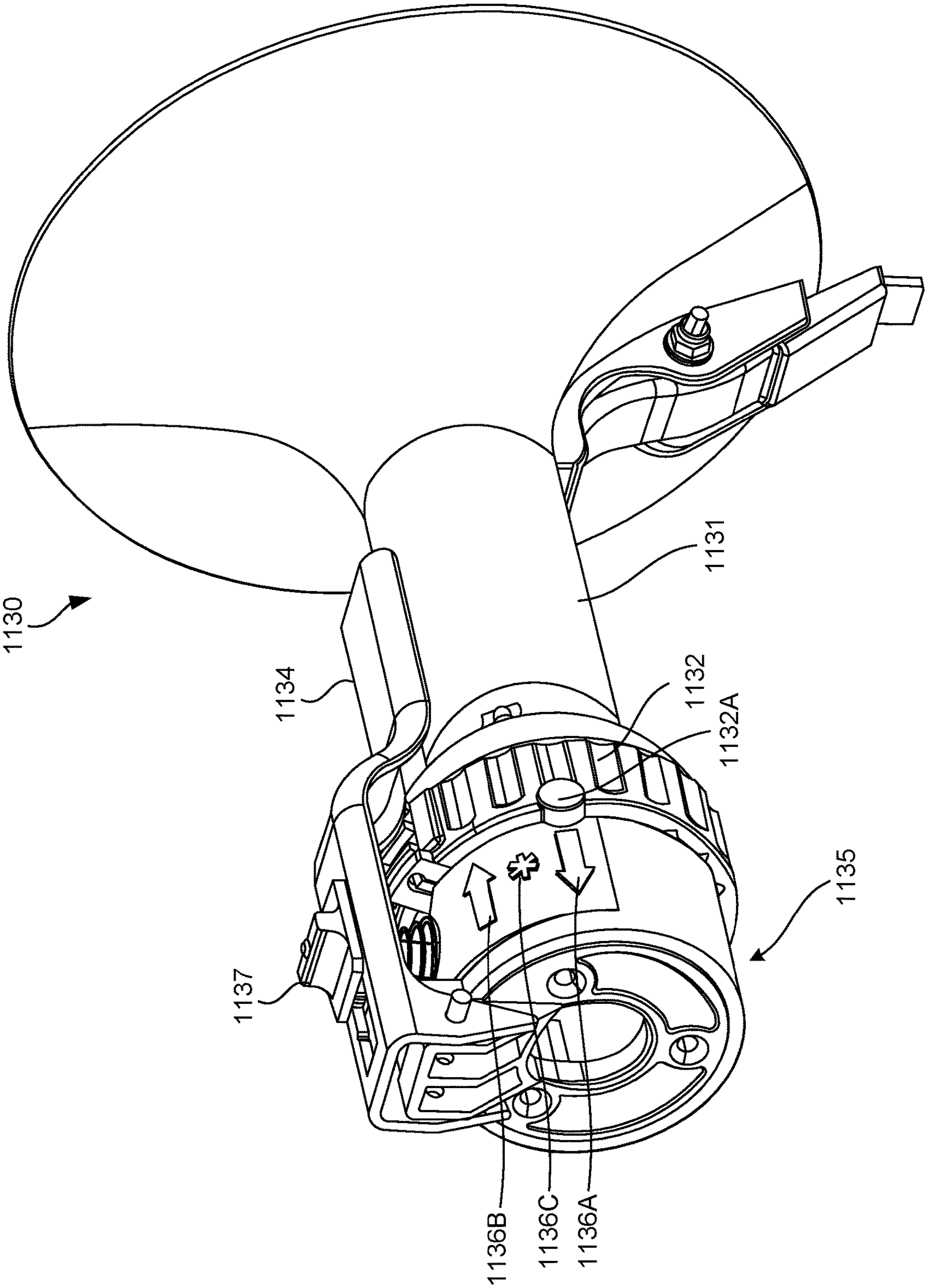
FIGS. 2E-2G illustrate a handle assembly and feed mechanism of a drain cleaning device, in accordance with implementations as described herein.
Figure 2F:
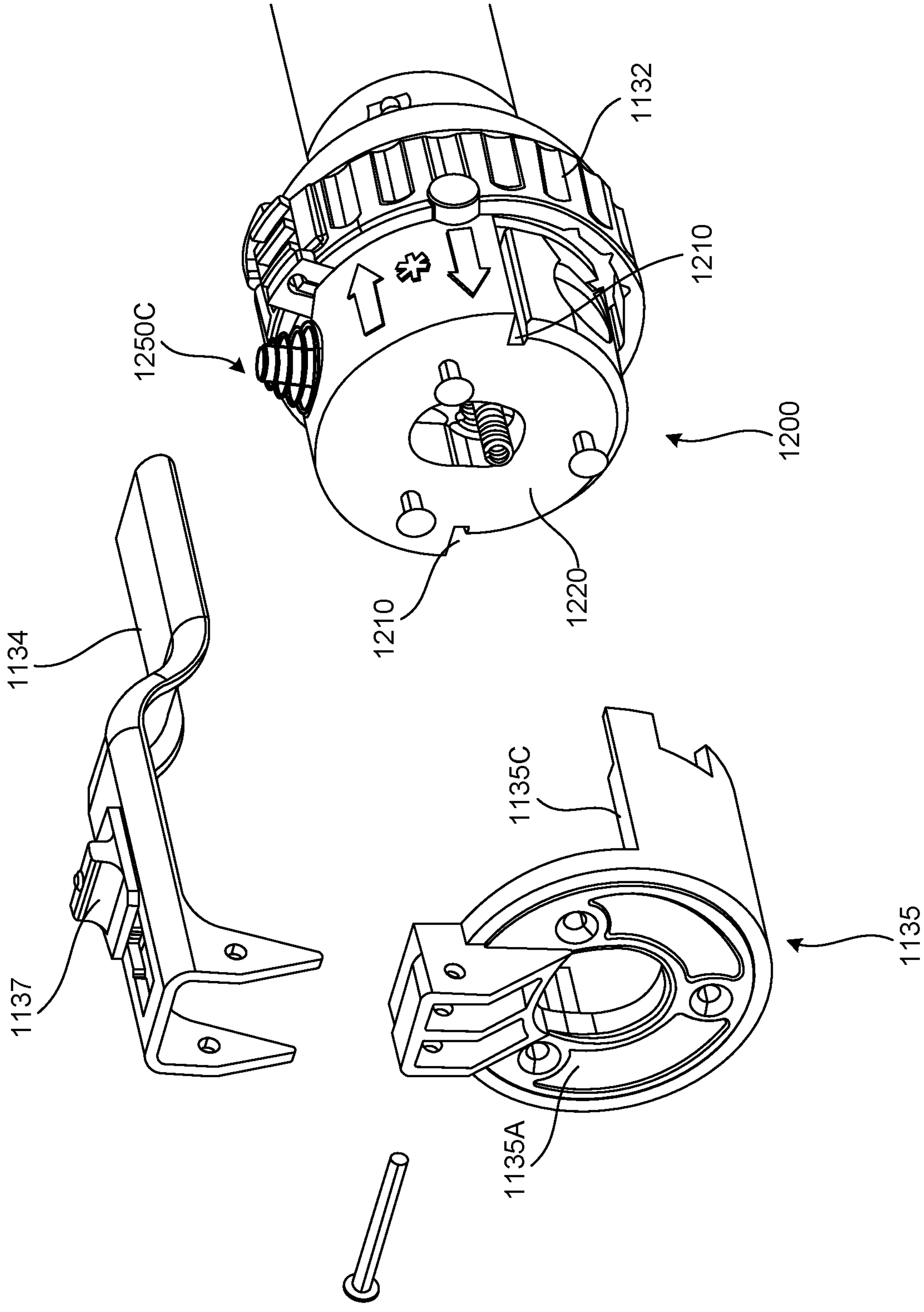
Figure 2G:
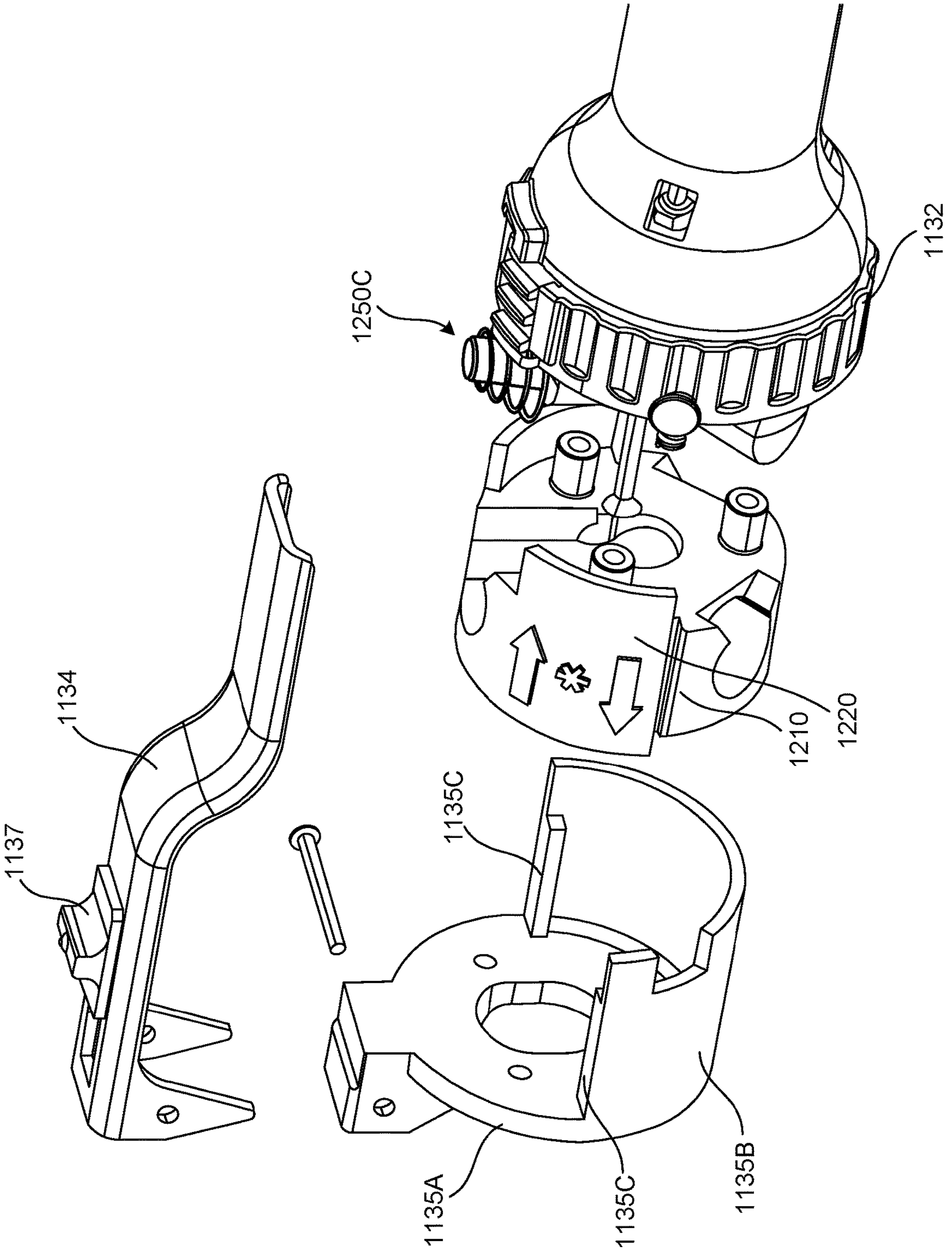

Another example of a handle assembly 1130 and a feed mechanism 1200 of a drain cleaning device, in accordance with implementations as described herein, is shown in FIGS. 2E-2G. In this example implementation, the handle assembly 1130 may include a handle housing 1131, with a shift ring 1132 rotatably coupled between the handle housing 1131 and a circumferential extension of a front housing 1135 enclosing a distal end of the handle assembly 1130. The shift ring 1132 may include a selector 1132A to select a feed direction through the handle assembly 1130 by rotating the shift ring 1132 to align the selector 1132A with one of a plurality feed direction indicators 1136A/1136B/1136C. A lever 1134 may be pivotably coupled to, for example, the front housing 1135 to selectively engage and disengage a pressure roller subassembly 1250C so that, together with adjustment of a cable diameter selector switch 1137, the feed mechanism 1200/handle assembly 1130 may be adjusted to feed cables having different diameters.

As shown in FIGS. 2F and 2G, the front housing 1135 may include a front plate portion 1135A and a cylindrical housing portion 1135B. In some implementations, the cylindrical housing portion 1135B may be integrally formed with the front plate portion 1135A of the front housing 1135. The cylindrical housing portion 1135B may include protrusions 1135C that may be inserted, for example, slidably inserted, into corresponding slots 1210 formed in an outer circumferential portion of a feed housing 1220 of the feed mechanism 1200 in which roller subassemblies, such as, for example, the roller subassemblies 250A/250B/250C described above, may be received. The circumferential housing portion 1135B of the front housing 1135 may resist the outward force of the lower roller subassemblies 250A and 250B, retaining the lower roller subassemblies 250A and 250B within respective radial bores of the feed housing 1220. This may eliminate the need for the circumferential ring 133 discussed above.

Figure 3A:
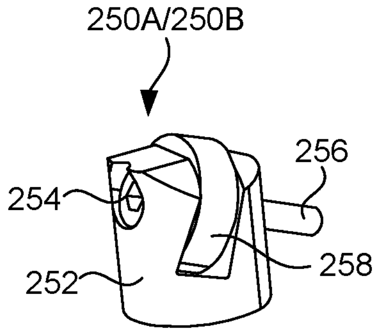
FIGS. 3A-3C illustrate a feed roller subassembly of a feed mechanism of a drain cleaning device, in accordance with implementations as described herein.
Figure 3B:
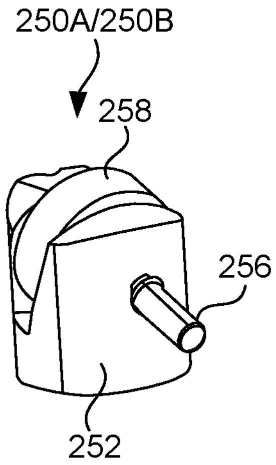
Figure 3C:
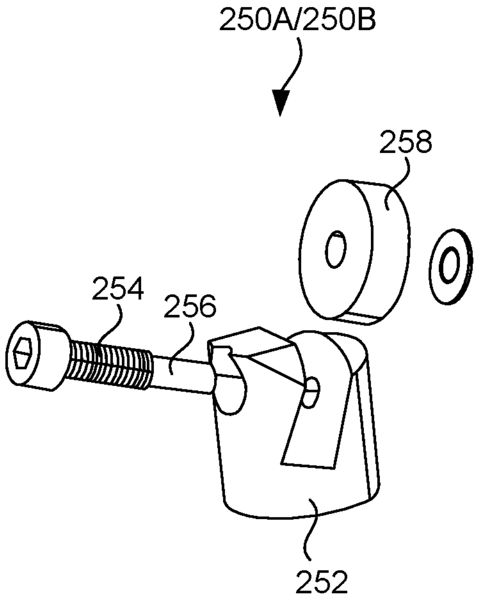

FIGS. 3A-3C illustrate various views of the feed roller subassemblies 250A and 250B. Each of the feed roller subassemblies 250A and 250B includes a carrier 252 that supports an axle 254, and a pin 256 extending from the axle 254 and projecting outward from the carrier 252. A roller 258 is rotatably supported in the carrier 252 by the axle 254.

Figure 4A:
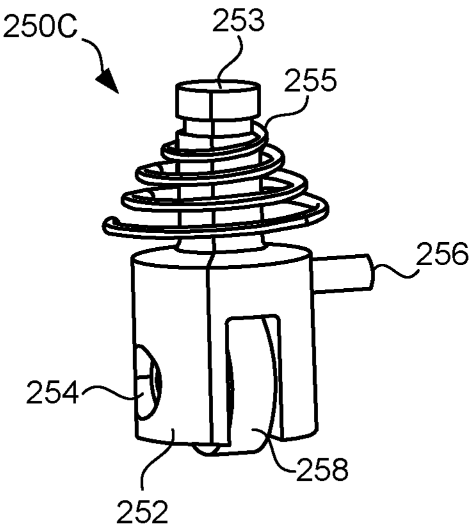
FIGS. 4A-4C illustrate a pressure roller subassembly of a feed mechanism of a drain cleaning device, in accordance with implementations as described herein.
Figure 4B:
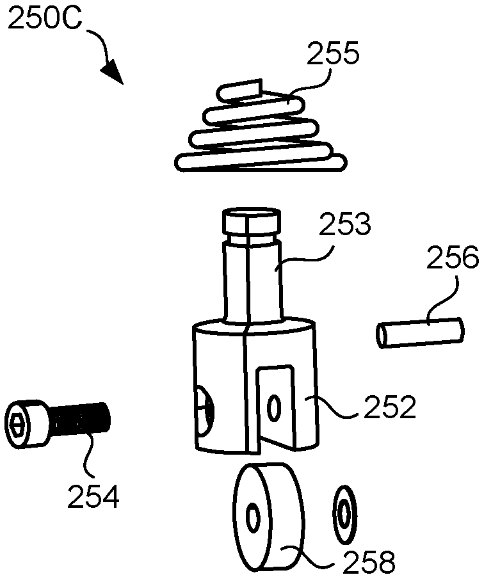
Figure 4C:
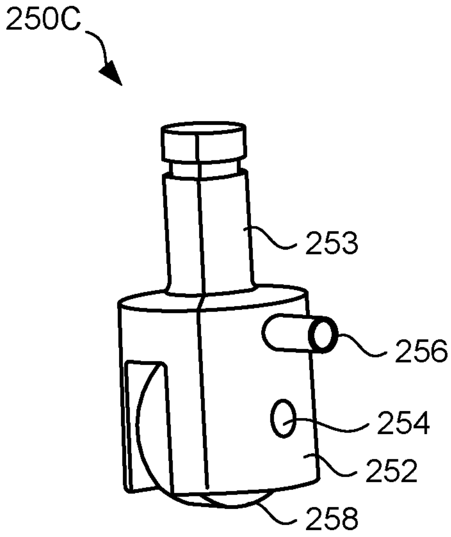

FIGS. 4A-4C illustrate various views of the pressure roller subassembly 250C. The pressure roller subassembly 250C may include the carrier 252, the axle 254, the pin 256 and the roller 258 as described above with respect to the feed roller subassemblies 250A and 250B shown in FIGS. 3A-3C. The pressure roller subassembly 250C may also include a protrusion 253 projecting outward from the body of the carrier 252, and a spring 255 coiled around the protrusion 253 at the top of the carrier 252. Each of the rollers 258 rotatably mounted in the carriers 252 of the roller subassemblies 250A/250B/250C projects into the axial bore to engage an outer circumferential portion of the cable 140. Each of the roller subassemblies 250A/250B/250C may be radially retained in the feed housing 220 by the circumferential band 133 surrounding the feed housing 220 and defining an outer wall of the feed mechanism 200.

Figure 5A:
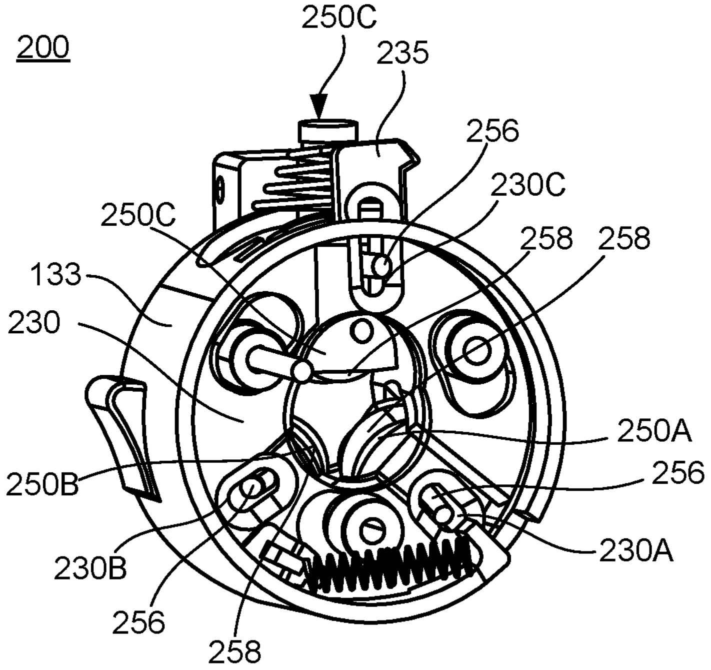
FIGS. 5A and 5B illustrate operation of a feed mechanism of a drain cleaning device, in accordance with implementations as described herein.
Figure 5B:
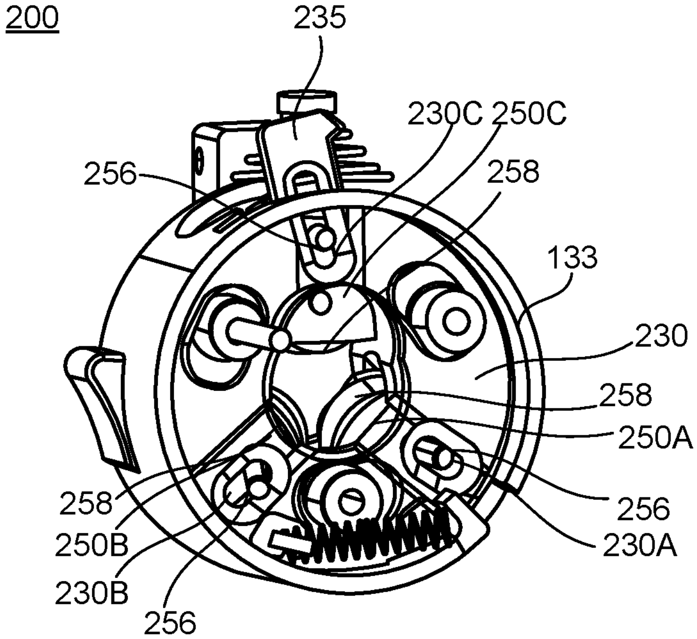

As noted above, the feed mechanism 200 may allow for a feed direction of the cable 140 through the handle assembly 130 to be changed based on manipulation of the shift ring 132. As shown in FIGS. 5A-5B, the pins 256 on the roller subassemblies 250A/250B/250C may extend rearward of the carriers 252, so that each of the pins 256 is received in a respective circumferential slot 230A/230B/230C in the shift plate 230. The shift ring 132 may surround the shift plate 230, and be coupled, for example, fixedly coupled, to the shift plate 230 so that rotation of the shift ring 132 also rotates the shift plate 230. This rotation of the shift plate 230, for example, from the position shown in FIG. 5A to the position shown in FIG. 5B, in turn causes the carriers 252 of the roller subassemblies 250A/250B/250C to rotate in their respective radial bores 240A/240B/240C. This rotation of the roller subassemblies 250A/250B/250C in turn adjusts an angle, or orientation, of each of the respective rollers 258, thus adjusting a direction in which the cable 140 is fed through the feed mechanism 200. That is, depending on the relative angles of the rollers 258 (based on the rotated positions of the roller subassemblies 250A/250B/250C in response to rotation of the shift ring 132), the rollers 258 may cause the cable 140 to be fed in the forward direction, the reverse direction, or to remain stationary/not fed in either direction. The rotation of the shift ring 132 may cause a corresponding rotation in the shift plate 230, and a corresponding change in orientation of the rollers 258, with the cable 140 being fed in a direction corresponding to the orientation of the rollers 258, as shown in FIGS. 5A and 5B. Thus, the feed direction of the cable 140 through the drain cleaning device 100 may be controlled by changes in orientation of this single set of three roller subassemblies 250A/250B/250C. The rollers 258 may be smooth or textured (e.g., with grooves or threads) to facilitate gripping the cable.

Figure 6A:
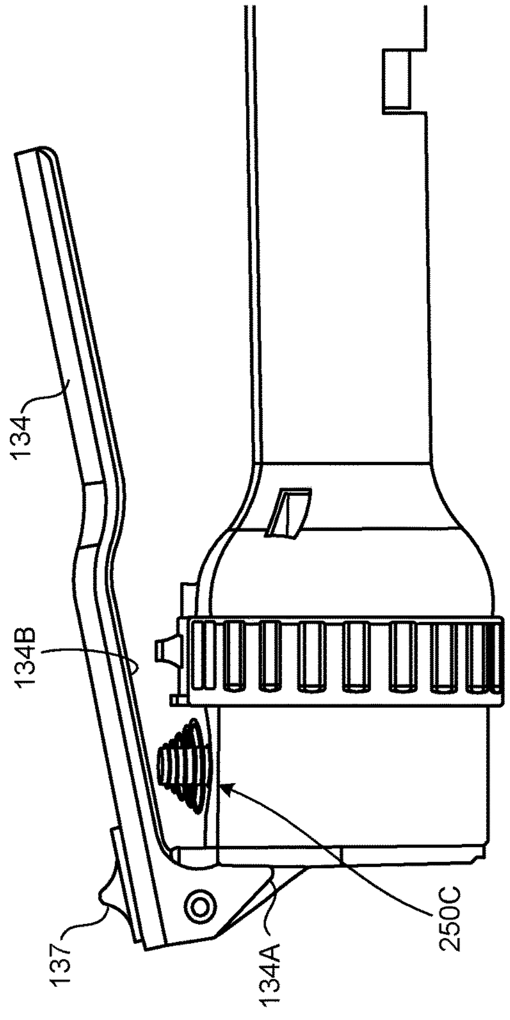
FIGS. 6A-6L illustrate operation of a selector switch and a lever of a handle assembly of a drain cleaning device, in accordance with implementations as described herein.
Figure 6B:
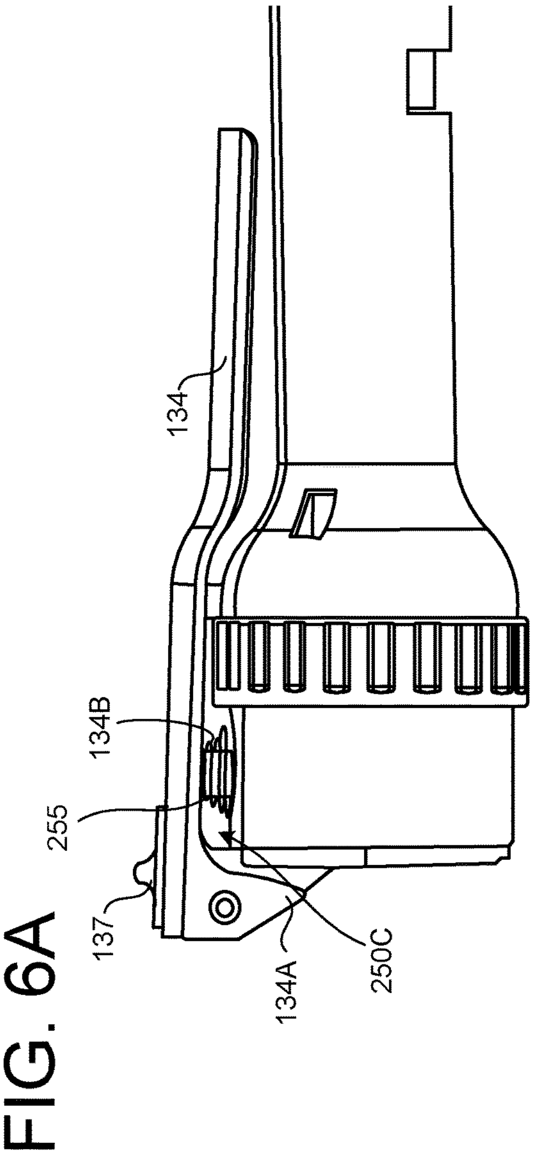

In some implementations, the feed mechanism 200 may be configured to be selectively engaged and disengaged. The pressure roller subassembly 250C may be biased by the spring 255 in a radially outward direction, away from the cable 140, so that the pressure roller subassembly 250C does not engage the cable 140 in the default, or at rest, position of the spring 255, as shown in FIG. 6A. A bottom wall 134B of the lever 134 may engage the radial end of the protrusion 253 of the pressure roller subassembly 250C, so that when the lever 134 is pressed down, toward the handle housing 131 of the handle assembly 130, as shown in FIG. 6B, the pressure roller subassembly 250C is pressed radially inward so that the pressure roller 258 engages the cable 140. When the lever 134 is released and moved away from the handle housing 131, as shown in FIG. 6A, the spring 255 may return to its at rest position, and the pressure roller subassembly 250C including the pressure roller 258 may move radially outward, away from the cable 140. As also shown in FIG. 6A, the lever 134 may include a stop protrusion 134A. An amount of pivoting or rotation of the lever 134 with respect to the handle housing 131 may be limited by the stop protrusion 134A as the stop protrusion 134A abuts the surface of the front end plate 135.

Figure 6C:
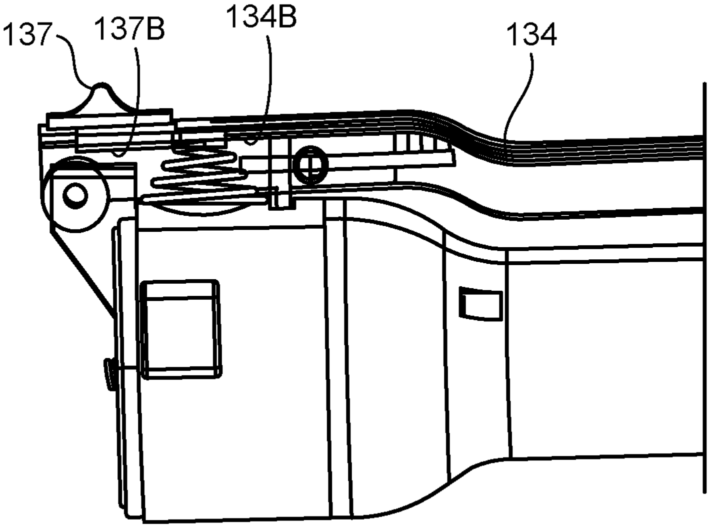
Figure 6D:
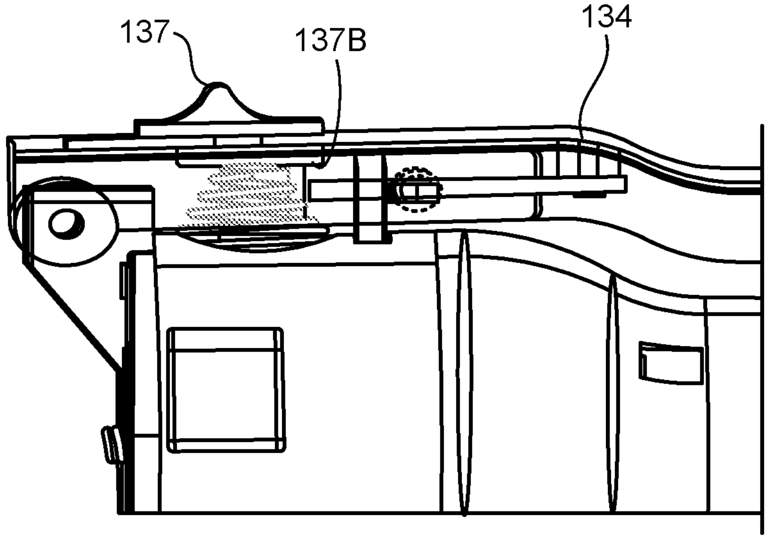

In some implementations, the drain cleaning device 100, and in particular, the feed mechanism 200, may be configured to accommodate different sizes of cables and/or different types of cables. For example, the lever 134 may include a cable diameter selector switch 137 that is movable in a longitudinal direction of the lever 134. A bottom wall 137B of the selector switch 137 may be lower than the bottom wall 134B of the lever 134 that selectively contacts the protrusion 253 of the pressure roller subassembly 250C. When the selector switch 137 is moved in a rearward direction (i.e., in a direction away from the front end plate 135), from the position shown in FIG. 6C to the position shown in FIG. 6D, the bottom wall 137B of the selector switch 137 may engage the protrusion 253 of the pressure roller subassembly 250C. Thus, in the position shown in FIG. 6D, the bottom wall 137B of the selector switch 137, rather than the bottom wall 134B of the lever 134, engages the protrusion 253 of the pressure roller subassembly 250C. When the selector switch 134 is shifted rearward in this manner, the space between the lever 134 and the pressure roller subassembly 250C changes, setting the movement of the lever 134 relative the handle assembly 130 at a distance which accommodates a different size, i.e., diameter, cable. Thus, manipulation of this multiple position switch selector 137 and the lever 134 may provide for and control movement of the pressure roller subassembly 250C to accommodate different sized cables, depending on a position of the switch selector 137.

Figure 6E:
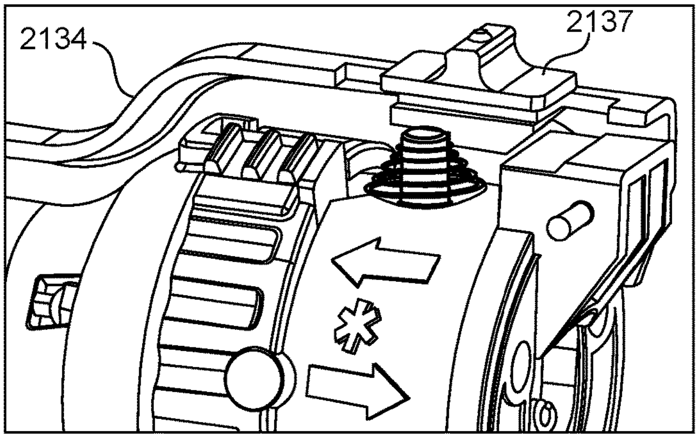
Figure 6F:
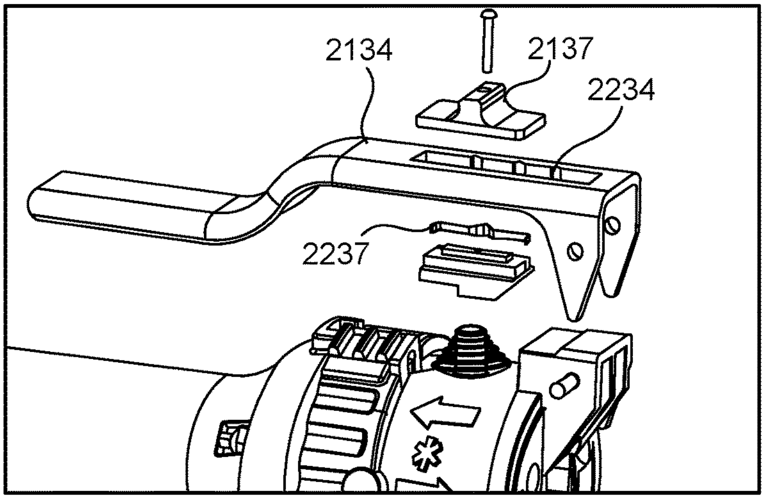
Figure 6G:
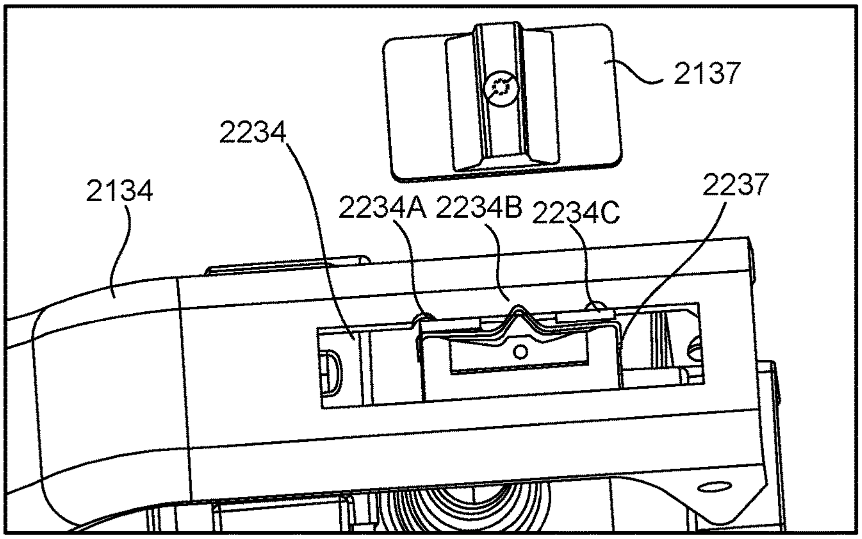
Figure 6H:
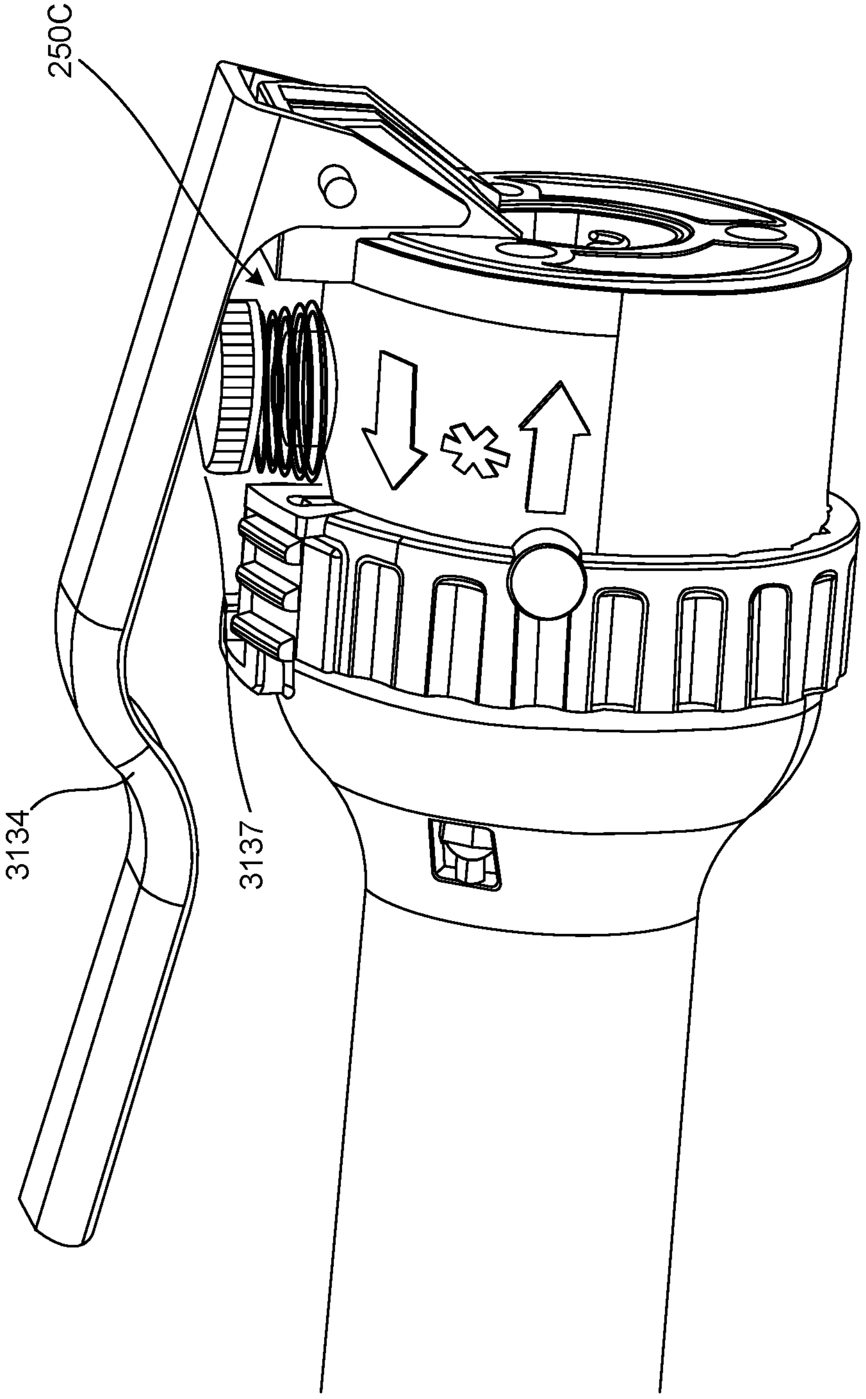
Figure 6J:
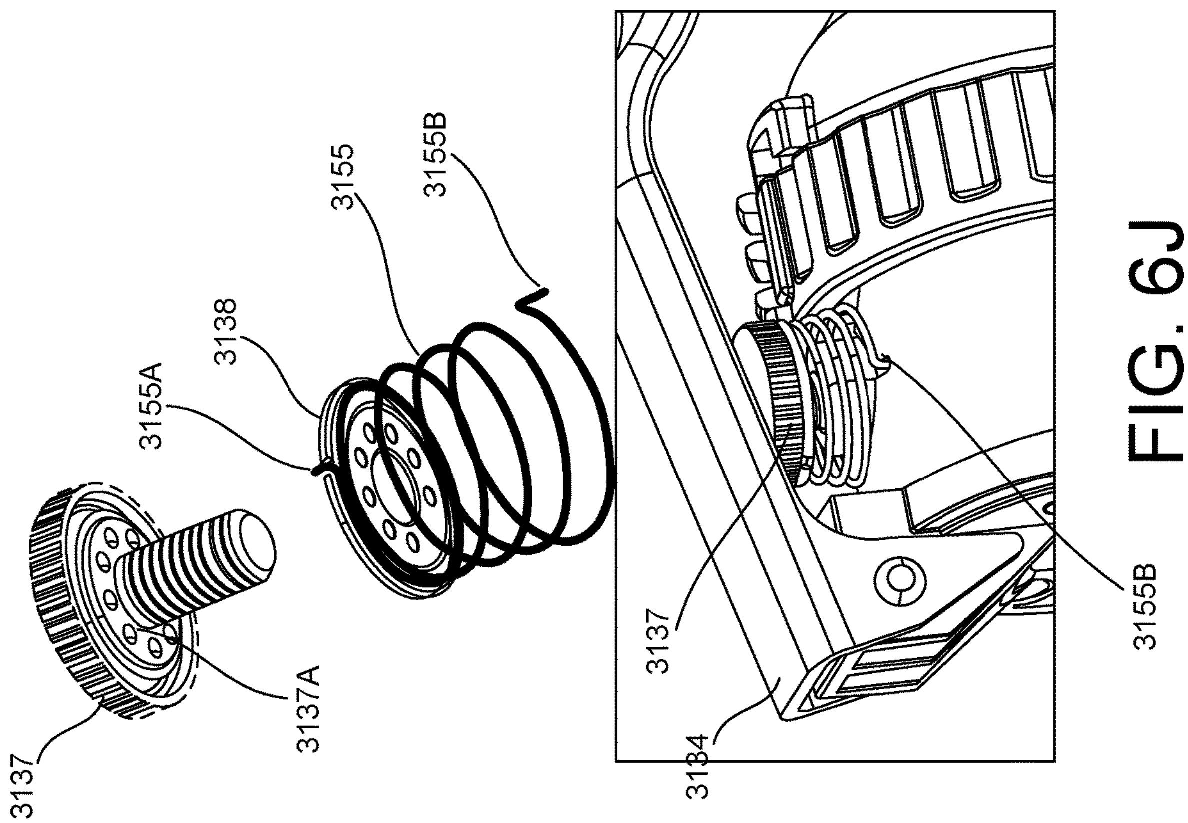
Figure 6I:
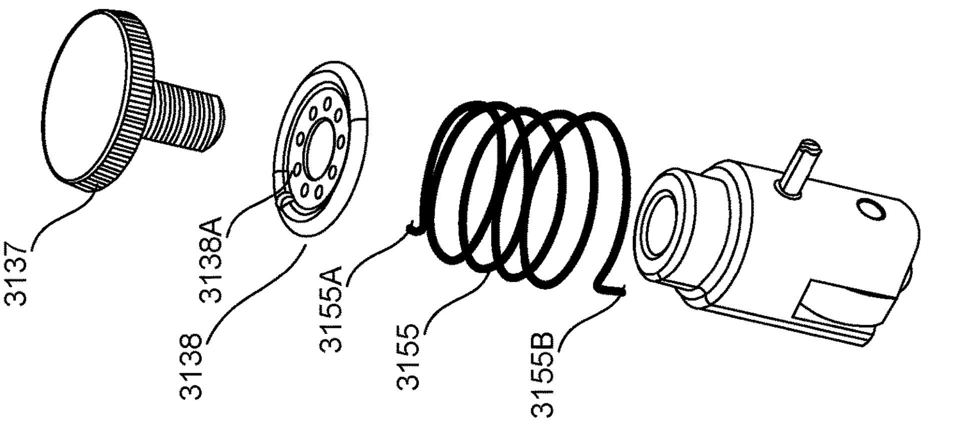

As shown in FIGS. 6E-6G, in some implementations, the drain cleaning device may include a lever 2134 having a cable diameter selector switch 2137 that is movable, for example, slidable, in a slot 2234 defined in a longitudinal direction of a lever 2134. The slot 2234 may include a plurality of detents 2234A, 2234B and 2234C formed in a peripheral wall surface of the slot 2234, corresponding to different sized cables to be fed through the drain cleaning device. A detent spring 2237 may elastically couple the selector switch 2137 in the slot 2234, biasing the selector switch 2137 into a selected one of the detents 2234A, 2234B or 2234C to retain the selector switch 2137 at the cable size corresponding to the selected detent 2234A, 2234B or 2234C. This may simply and easily facilitate adjustment of the cleaning device to receive different size, for example, diameter, cables.

Figure 6K:
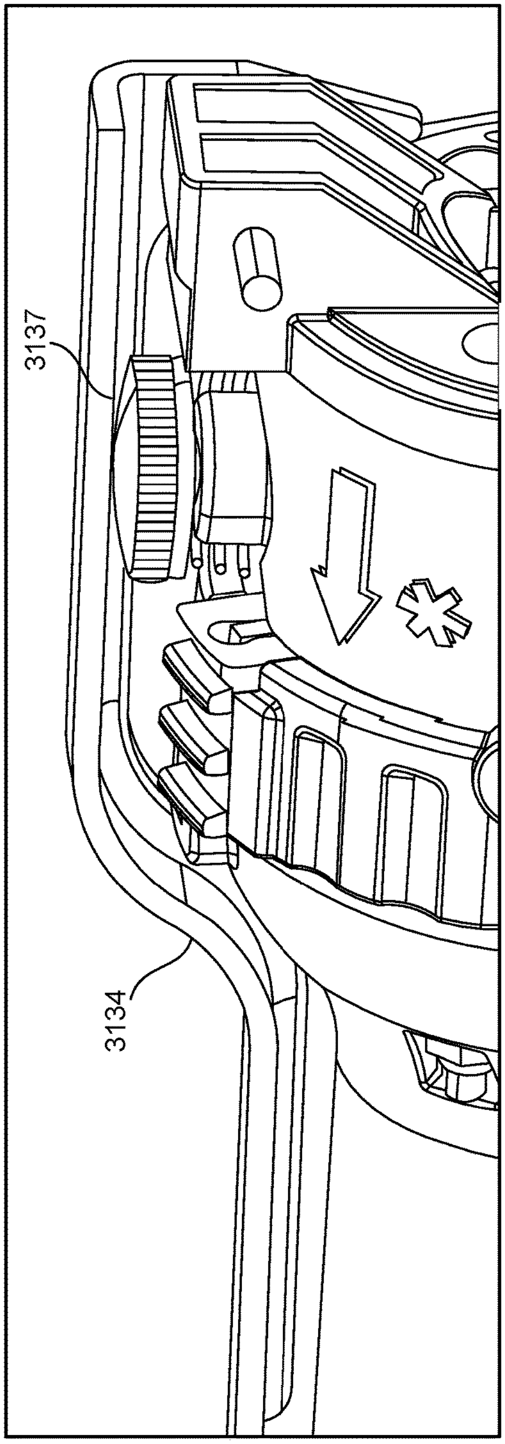
Figure 6L:
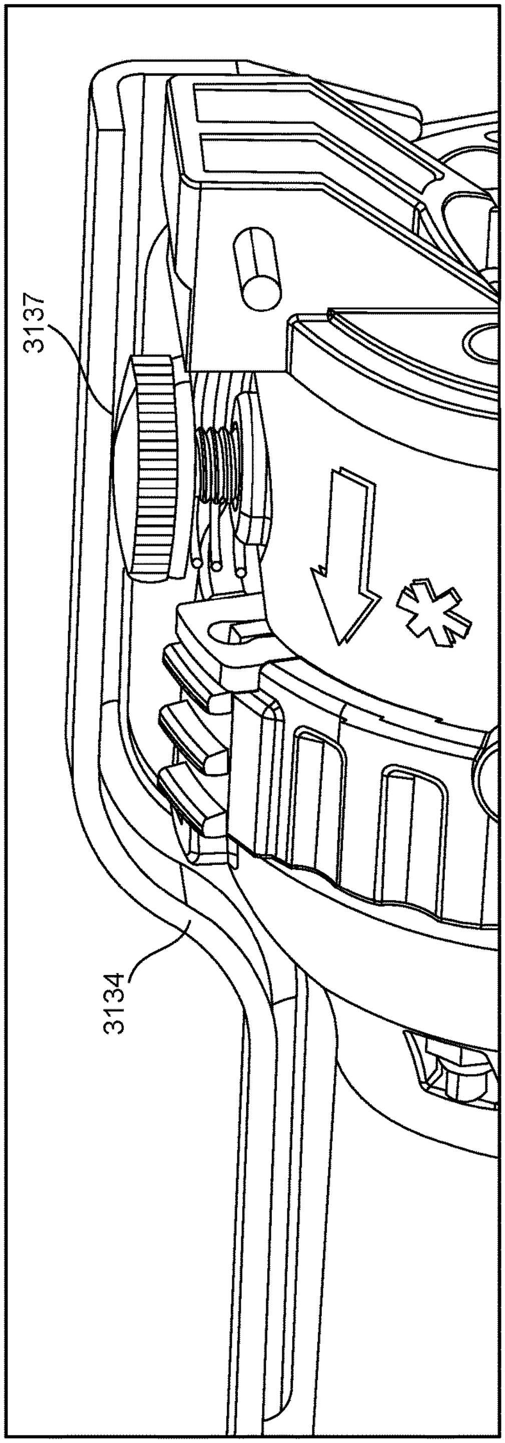

As shown in FIGS. 6H-6L, in some implementations, the drain cleaning device may include a lever 3134 having a cable diameter adjustment knob 3137 that is coupled, for example, threadably coupled, to the protrusion 253 of the pressure roller subassembly 250C. A disc 3138, for example, a lock washer, may be inserted between a bottom of the adjustment knob 3137 and a top of a return spring 3155 coiled on the protrusion 253 of the pressure roller subassembly 250C. A first leg 3155A at a first end of the spring 3155 may be engaged in the disc 3138, and a second leg 3155B at a second end of the spring may be engaged in the feed housing, to fix the first and second ends of the spring 2155 in place. Dimples 3137A on the underside of the adjustment knob 3137 may engage corresponding openings 3138A in the upper surface of the disk 3138. This arrangement may allow for a rotation of the adjustment knob 3137 to correspondingly adjust a distance in which the roller 258 of the pressure roller subassembly 250C extends into the axial bore, thus adjusting a contact distance of the pressure roller subassembly 250C with the outer surface of the cable. For example, when the thread on the knob stem is left-handed, a clockwise rotation of the adjustment knob 3137 may urge the pressure roller subassembly 250C radially inward, so as to contact a relatively smaller diameter cable, as shown in FIG. 6K. Similarly, a counter-clockwise rotation of the adjustment knob 3137 may allow the pressure roller subassembly 250C to move radially outward, so as to accommodate a relatively larger diameter cable, as shown in FIG. 6L.

Figure 7:
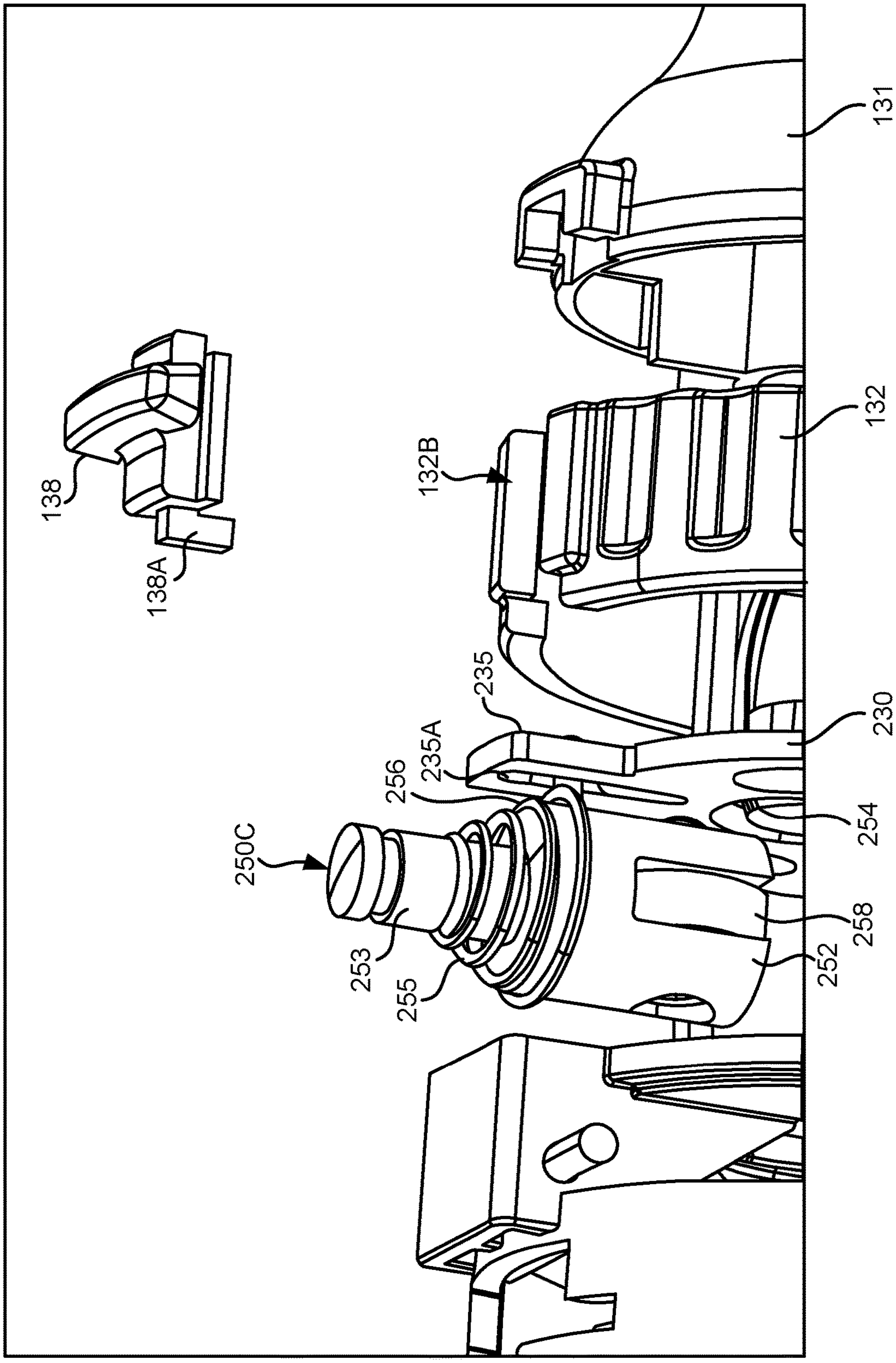
FIG. 7 is an exploded partial view of a cable adjustment mechanism of a drain cleaning device, in accordance with implementations as described herein.

In some implementations, the feed mechanism 200 may include a bearing carrier release mechanism configured to allow the pressure roller subassembly 250C to be moved partially radially outward from the feed housing 220 to, for example, load and/or unload a cable 140 having a tool 145 at the end of the cable 140, or a working end that is larger in size, or diameter, than the main body portion of the cable 140. As shown in, for example, FIGS. 2C, 2D and 7, the shift plate 230 may include a radial projection 235 that projects radially outward from the shift plate 230 at the 12 o'clock position. The radial projection 235 may include a radial slot 235A that receives the pin 256 extending from the carrier 252 of the pressure roller sub-assembly 250C. An axially moveable release switch 138 may be received in an axial slot 132B in the shift ring 132. The release switch 138 may include a finger 138A that projects radially inward. When the finger 138A is received in the radial slot 235A, the finger 138A may abut the pin 256, preventing the pin 256 from moving radially outward from the feed housing 220. The finger 138A of the release switch 138 is positioned in the radial slot 235A of the radial projection 235 when the selector 132A of the shift ring 132 is aligned with the forward feed direction indicator 136A, the reverse feed direction indicator 136B, and the neutral indicator 136C.

Figure 8A:
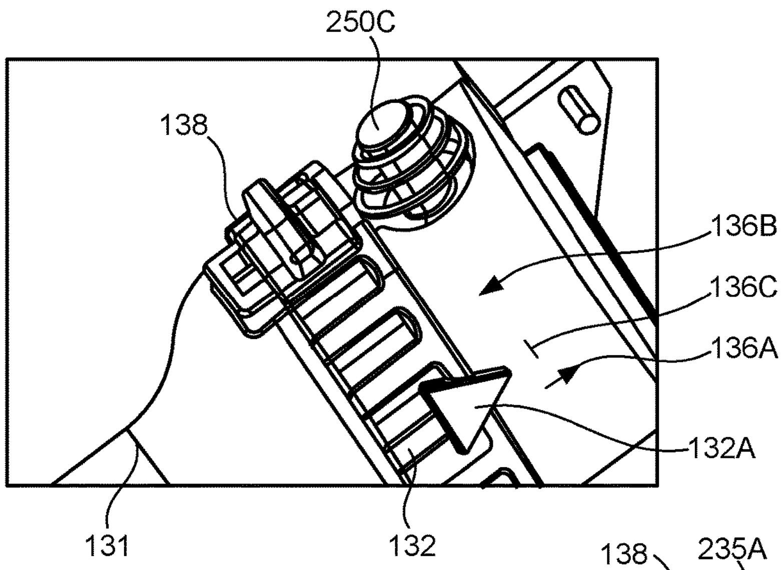
FIGS. 8A-8G illustrate operation of a cable adjustment mechanism of a drain cleaning device, in accordance with implementations as described herein.
Figure 8B:
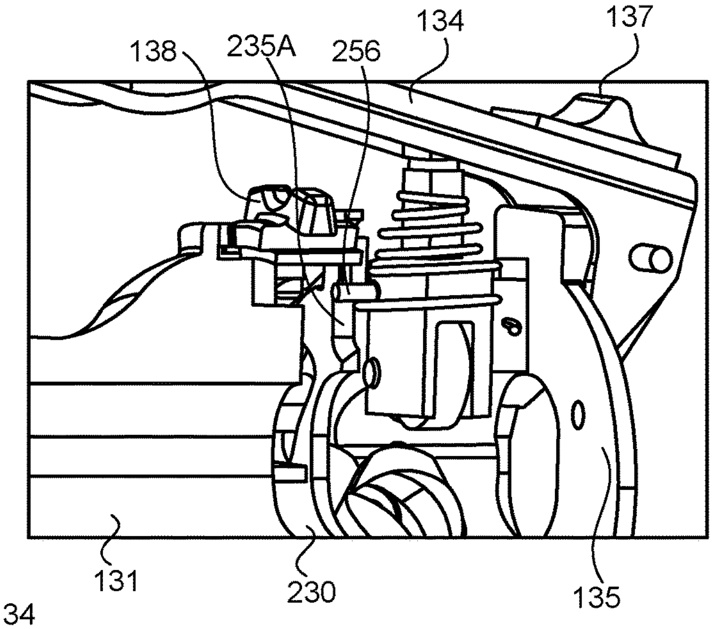
Figure 8C:
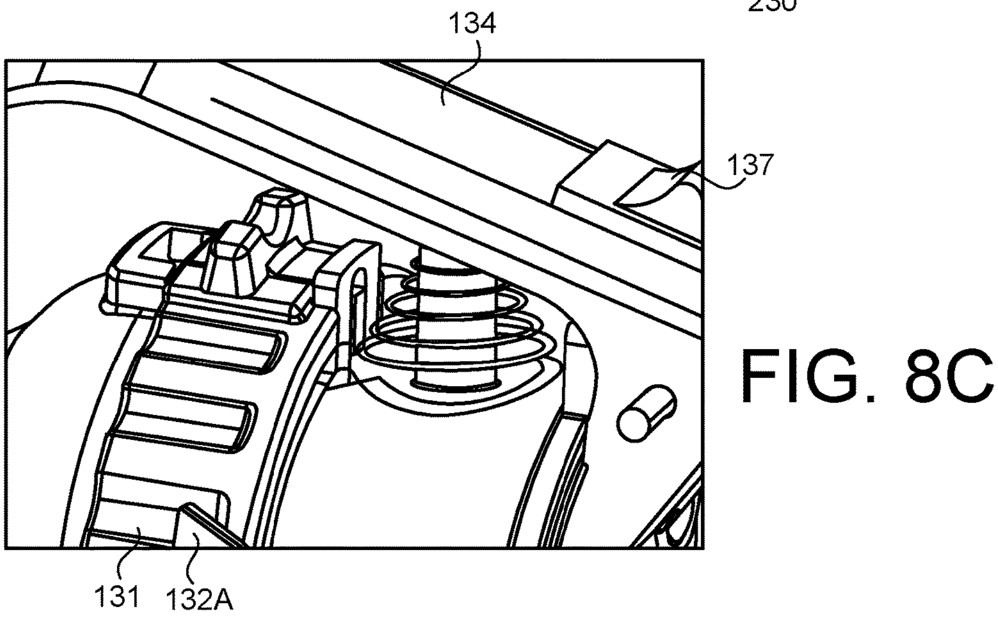

To initiate release of the pressure roller subassembly 250C, the shift ring 132 may first be rotated so that the indicator 132A is aligned with the neutral indicator 136C, as shown in FIG. 8A. This may in turn align the release switch 138 and the radial projection 235 of the shift plate 230 with the 12 o'clock position of the pressure roller subassembly 250C. As shown in FIGS. 8B and 8C, at this point, the finger 138A of the release switch 138 is positioned inside the radial slot 235A of the radial projection 235, preventing the pin 256 of the pressure roller subassembly 250C from moving radially outward.

Figure 8D:
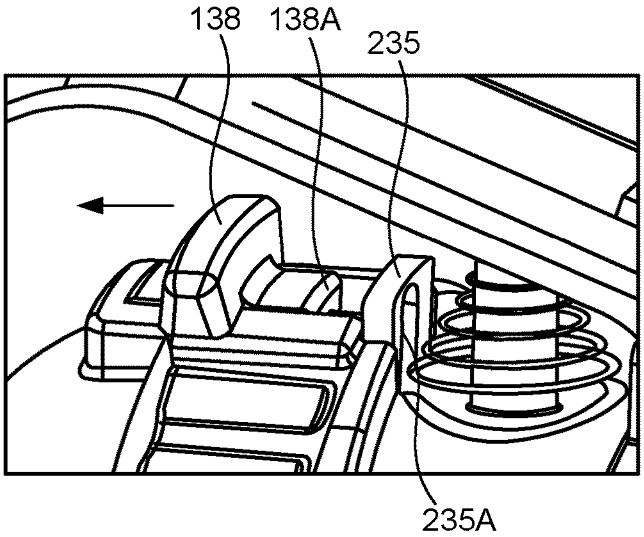
Figure 8E:
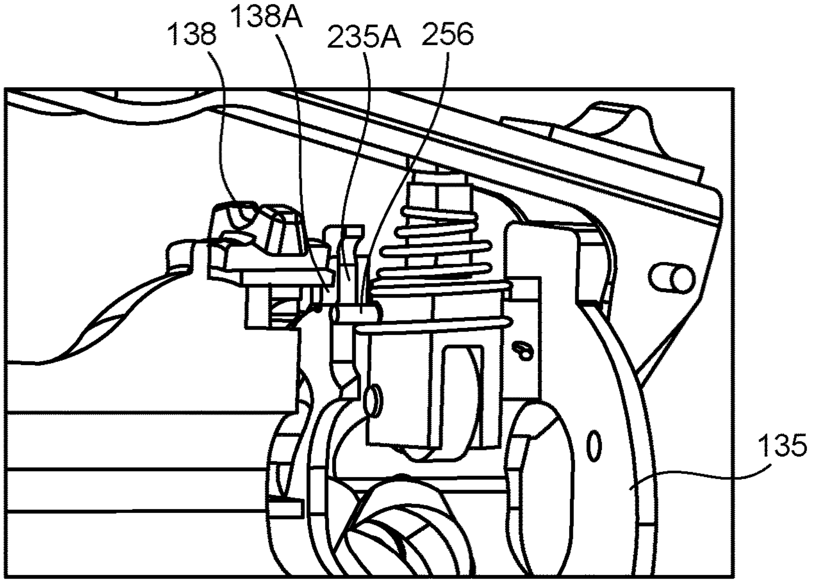

Next, the release switch 138 may be retracted in a rearward direction, as shown in FIG. 8D, away from the pressure roller subassembly 250C, causing the finger 138A to move out of the radial slot 235A. Removal of the finger 138A from the radial slot 235A may allow the pin 256 to slide upward in the radial slot 235A, enabling greater radial movement of the pin 256, and of the pressure roller subassembly 250C, as shown in FIG. 8E.

Figure 8F:
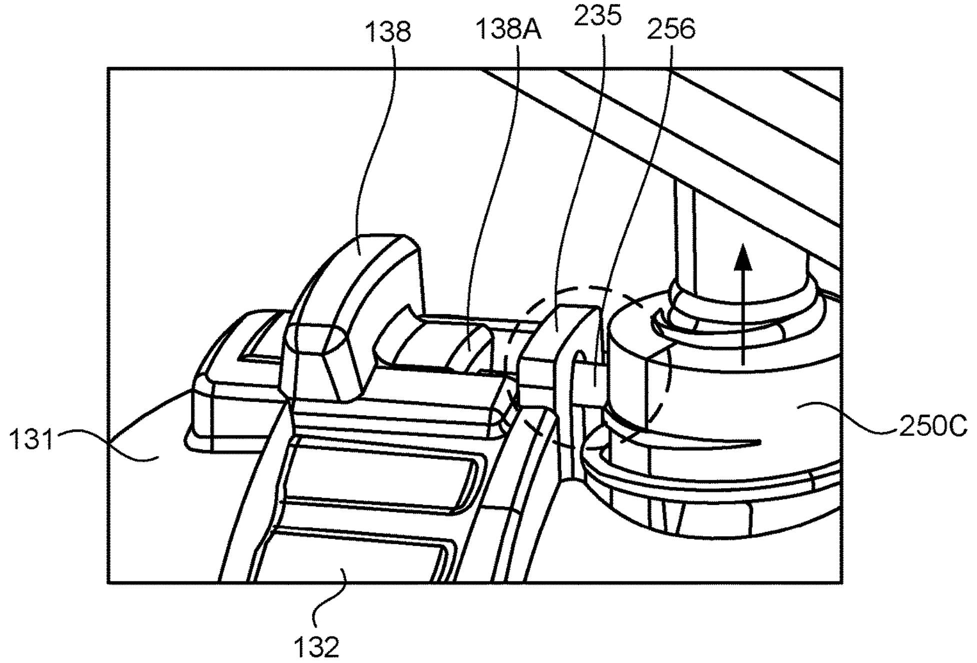
Figure 8G:
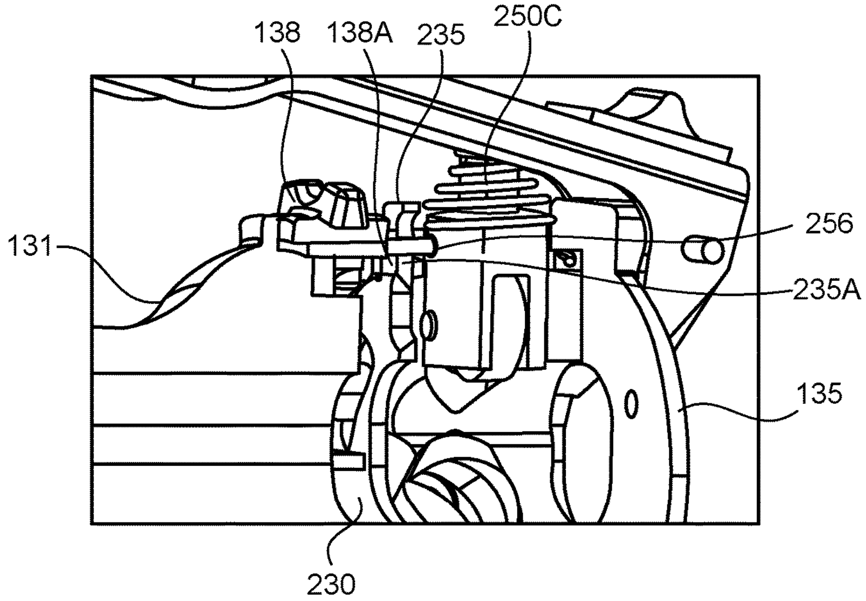

Once the release switch 138 has been retracted to the rearward position, the spring 255 on the pressure roller subassembly 250C may push or urge the pressure roller subassembly 250C radially outward from the feed housing 220, as shown in FIG. 8F. This radial movement of the pressure roller subassembly 250C may create a larger diameter space between the pressure roller subassembly 250C and the rollers 258 of the feed roller subassemblies 250A and 250B, allowing the tool 145, or the enlarged or bulbous end of the cable 140 to pass through the feed housing 220, as shown in FIG. 8G. After the bulbous end of the cable 140 has passed through the feed mechanism 200 in this manner, the pressure roller subassembly 250C may be moved radially inward, against the spring 255 biasing the pressure roller subassembly 250C radially outward, and the release switch 138 may be moved forward in the slot 132B in the shift ring 132 to engage the finger 138A in the radial slot 235A of the radial projection 235, as shown in FIGS. 8B and 8C. In this arrangement, the pressure roller subassembly 250C may be retained in the radially inward position such that pin 256 in once again inside the feed housing 220. This may once again allow rotation of the shift ring 132 to select a forward or reverse feed direction, or the neutral position, with inward radial movement of the pressure roller subassembly 250C to selectively engage the cable 140.

Thus, as described with respect to FIGS. 7 and 8A-8G, alignment of the shift ring 132 and manipulation of the release switch 138 in this manner may allow an enlarged, or bulbous, end of the cable 140, such as the tool 145, to pass through the handle assembly 130 and may allow the feed mechanism 200 to be easily adjusted to then engage the main body portion of the cable 140, having a smaller diameter than the tool 145 or bulbous end. Similarly, alignment of the shift ring 132 and manipulation of the release switch 138, together with manipulation of the selector switch 137 and the lever 134 as described above with respect to FIGS. 6C and 6D, in this manner may allow the feed mechanism 200 to be easily adjusted to accommodate cables having different diameters as the cable 140 is fed through the handle assembly 130.

In some implementations, the handle housing 131 of the handle assembly 130 may be adjustably coupled to the shroud 111 of the drum assembly 110. This may allow the user to rotate the shift ring 132 with one hand to select a feed direction. This may also allow the user to adjust a position of the lever 134, allowing the user to adjust a grasping position of the lever 134 to accommodate different usage environments. As described above, the shroud 111 is fixedly coupled to the housing 121 of the power unit 120, such that the shroud 111 and the power unit 120 remain stationary as the drum 113 rotates within the shroud 111. A rear end portion of the shroud 111 may be essentially closed, while a front end portion of the shroud 111 coupled to the handle assembly 130, and in particular, to the handle housing 131, may be open to facilitate removal and replacement of the cable 140 wound on the drum 113.

Figure 9A:
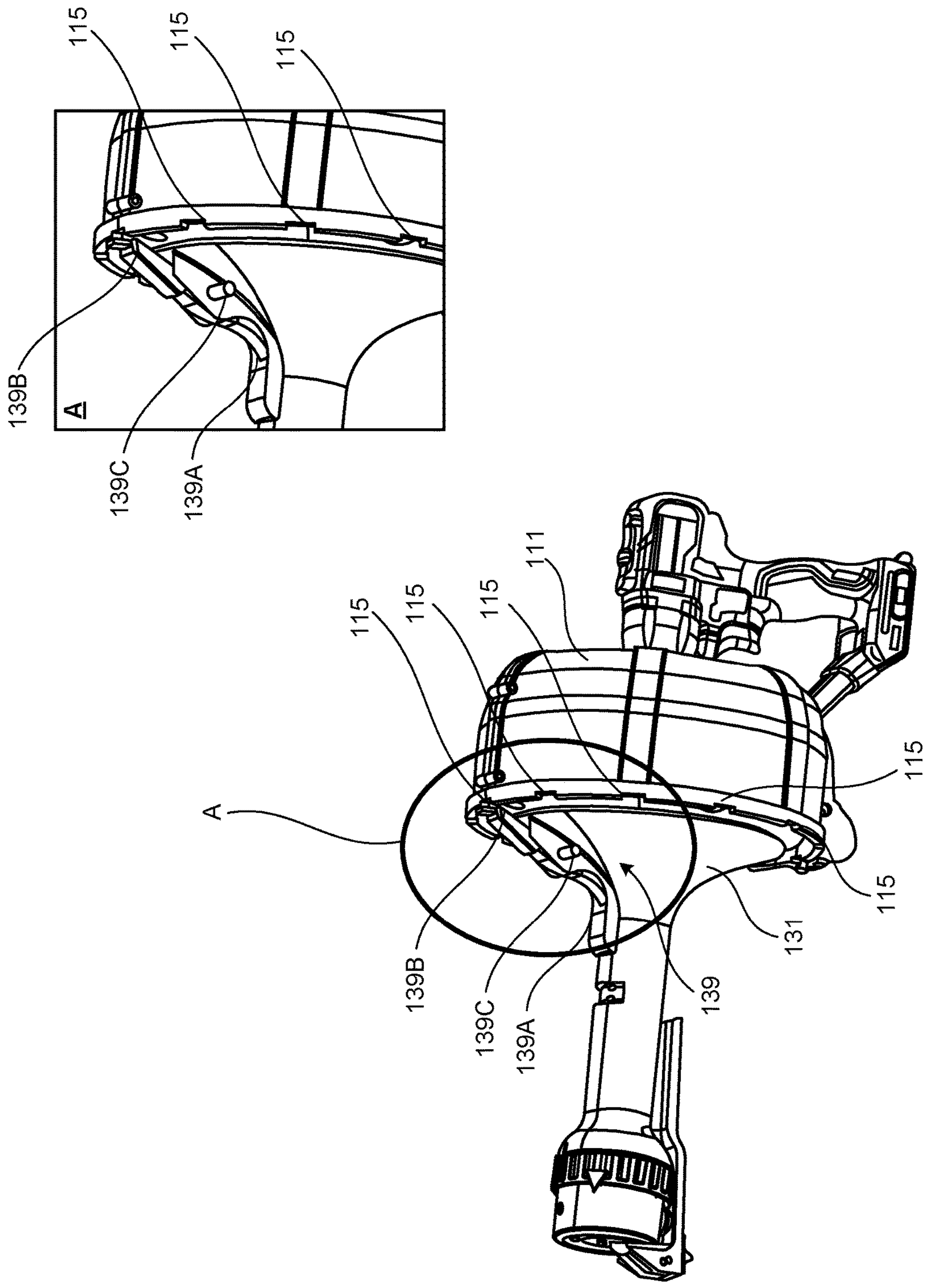
FIGS. 9A-9C illustrate rotation of a handle assembly relative to a drum assembly of a drain cleaning device, in accordance with implementations described herein.
Figure 9C:
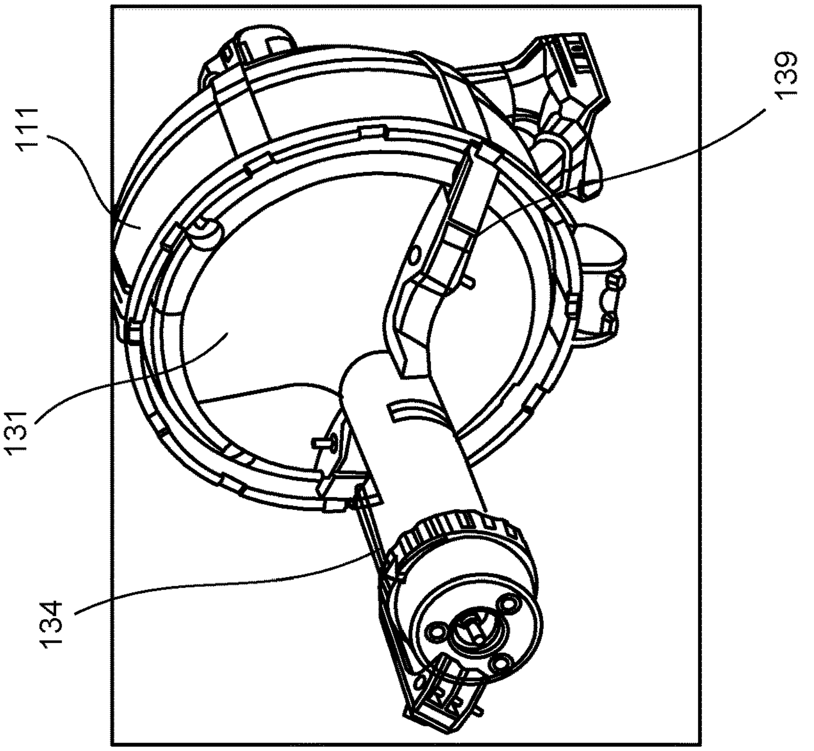
Figure 9B:
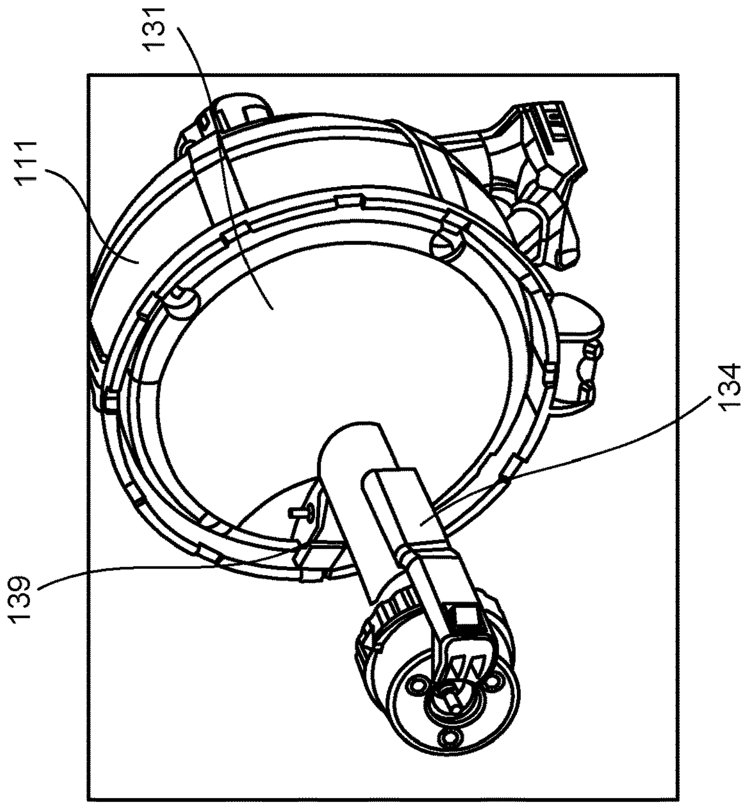

As shown in FIG. 9A, the handle assembly 130 may include a radially extending, spring biased lever 139. The lever 139 may engage a plurality of recesses, or detents 115 defined in a front peripheral edge of the shroud 111. Depression of the lever 139, for example, at an inner radial end 139A of the lever 139, may cause the lever 139 to pivot about a hinge 139C, and release an outer peripheral end 139B of the lever 139 from the detent 115. Release of the outer radial end 139B of the lever 139 from the detent 115 may allow the handle housing 131 to rotate relative to the shroud 111. This may allow for adjustment of the positon of the handle assembly 130 to a plurality of discrete rotational positions corresponding to the number and spacing of the plurality of detents 115 in the front peripheral edge of the shroud 111. This may facilitate adjustment of an orientation of the drain cleaning device 100 to accommodate, for example, right handed usage, as shown in FIG. 9B, left handed usage, as shown in FIG. 9C, and other orientations and arrangements. This arrangement may allow the user to adjust an angle of the feed mechanism 200 relative to the shroud 111 and the handle housing 131, with the shroud 111 preventing the user's hands, arms and the like from contacting the rotating drum 113.

Figure 10A:
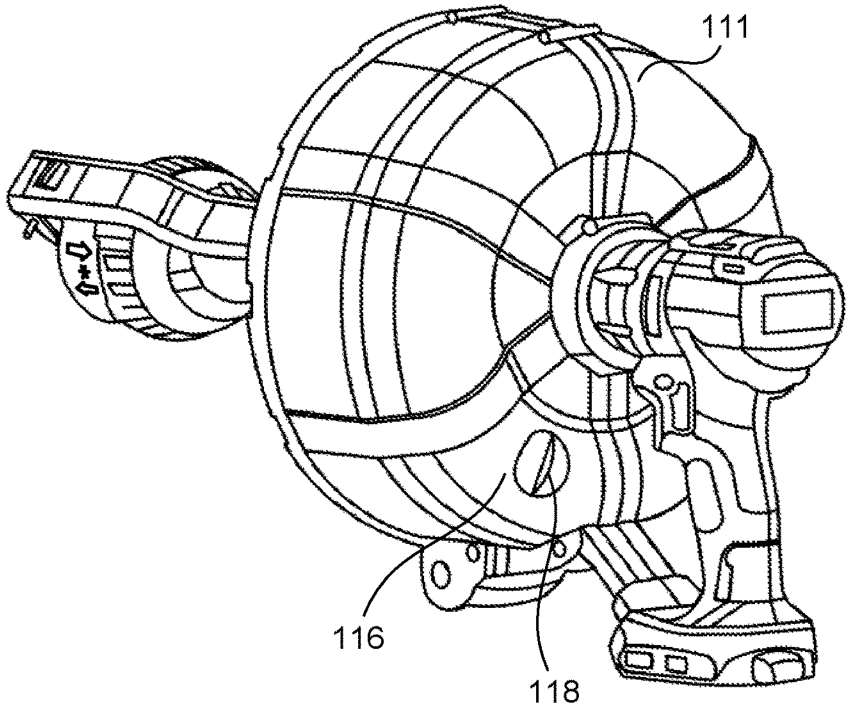
FIGS. 10A-10B illustrate a drum assembly of a drain cleaning device, in accordance with implementations described herein.
Figure 10B:
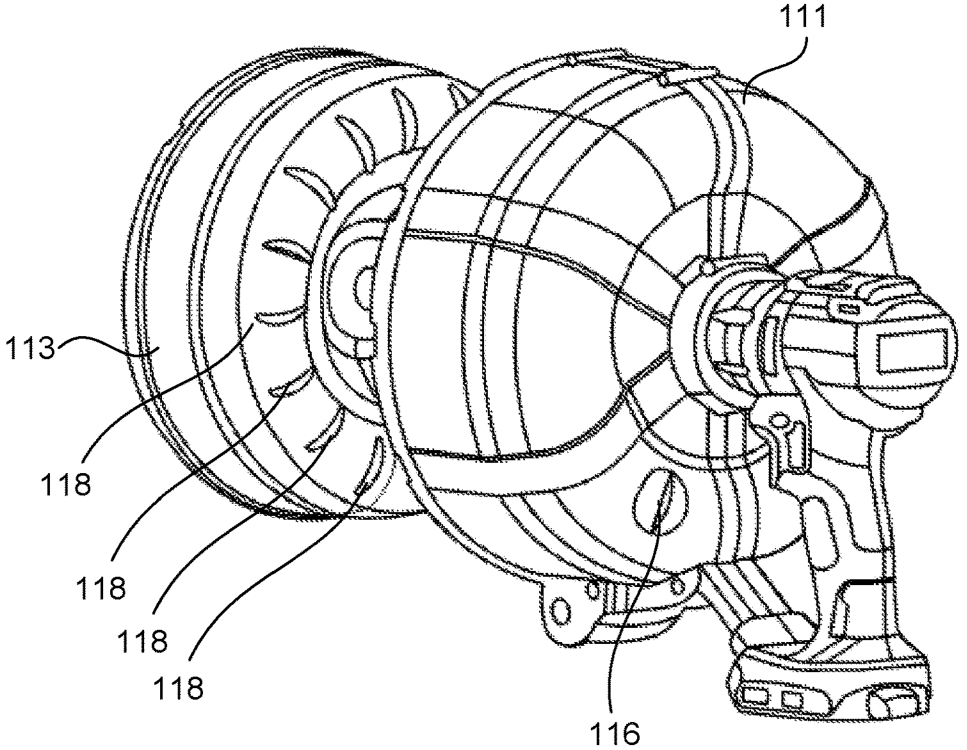

As shown in FIGS. 10A and 10B, in some implementations, the rear facing portion of the shroud 111 may include an opening 116. Protrusions 118 on a corresponding rear facing portion of the drum 113 may be accessible to the user through the opening 116 in the shroud 111. These protrusions 118 are more easily visible in the exploded perspective view shown in FIG. 10B. When adjusting a position of the handle assembly 130 relative to the drum assembly 110, or accessing the interior of the drum 113 to, for example, change or adjust the cable 140, the user may grasp one of the protrusions 118 on the drum 113 through the opening 116 in the shroud 111 to stabilize the shroud 111 and/or drum 113/keep the shroud 111 and/or drum 113 from moving as the desired adjustment is made. In particular, grasping one of the protrusions 118 through the opening in the shroud 111 may keep the base 113A of the drum 113 from rotating as the cover 113B of the drum 113 is attached to the base 113A. This may be applicable in a situation in which, for example, the stiffness of the cable 140 wound in the drum 113 poses some resistance and imparts some rotation to the drum 113 as the cover 113B is installed on the base 113A, when imparting a force on the cover 113B to fasten, for example, screw, the cover 113B onto the base 113A, and the like.

Figure 11A:
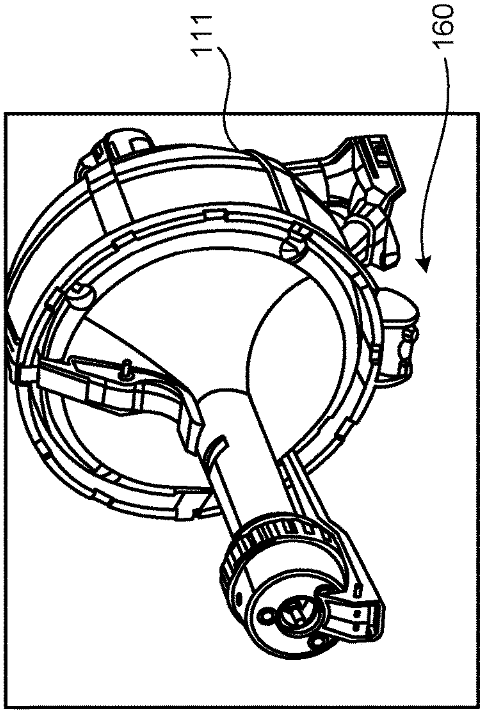
FIGS. 11A-11E illustrate a light assembly of a drain cleaning device, in accordance with implementations as described herein.
Figure 11B:
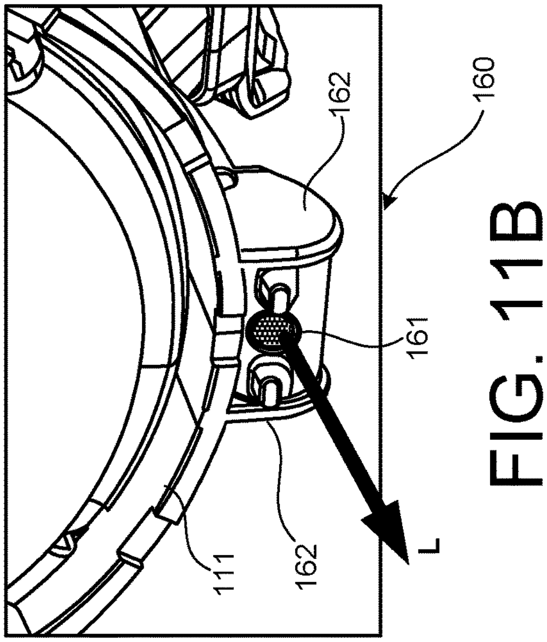
Figure 11C:
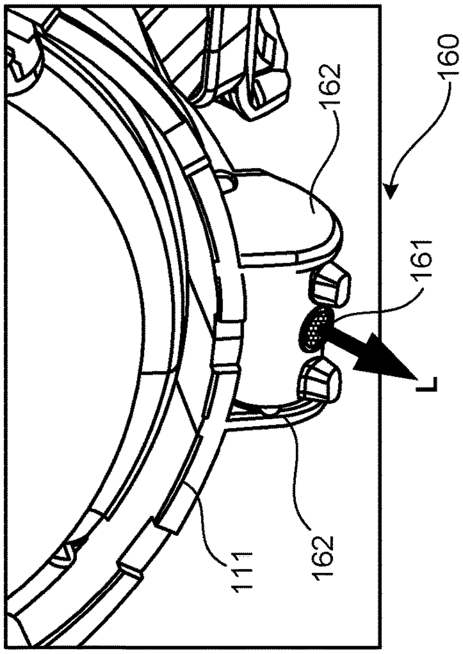
Figure 11D:
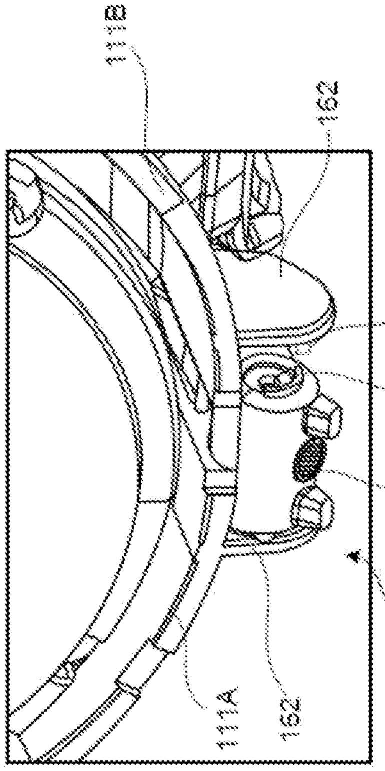

In some implementations, the drain cleaning device 100 may include a light assembly 160 to provide targeted illumination in a work area. The light assembly 160 may be mounted, for example, on the stationary shroud 111, as shown in FIGS. 11A-11E. The light assembly 160 may include a light source 161, for example, a light emitting diode (LED) light source, mounted between mounting flanges 162 extending from the shroud 111. The light source 161 may be pivotably mounted to the mounting flanges 162, and may rotate, for example, about an axis that is substantially perpendicular to the feed direction of the cable 140 through the handle assembly 130, to direct light emitted by the light source 161 (illustrated by the arrow L in FIGS. 11B and 11C) in a desired direction. The mounting flanges 162 may include protrusions 162A that engage corresponding detents 161A in a housing of the light source 161, to hold the light source 161 in the desired position, as shown in FIG. 11D. In some implementations, protrusions may be defined on the housing of the light source 161, and detents may be defined in the mounting flanges 162. In some implementations, the shroud 111 may include a first shroud portion 111A coupled to a second shroud portion 111B, as shown in FIGS. 1C and 11D, and the light assembly 160 may be accommodated in a space between the first and second shroud portions 111A and 111B.

Figure 11E:
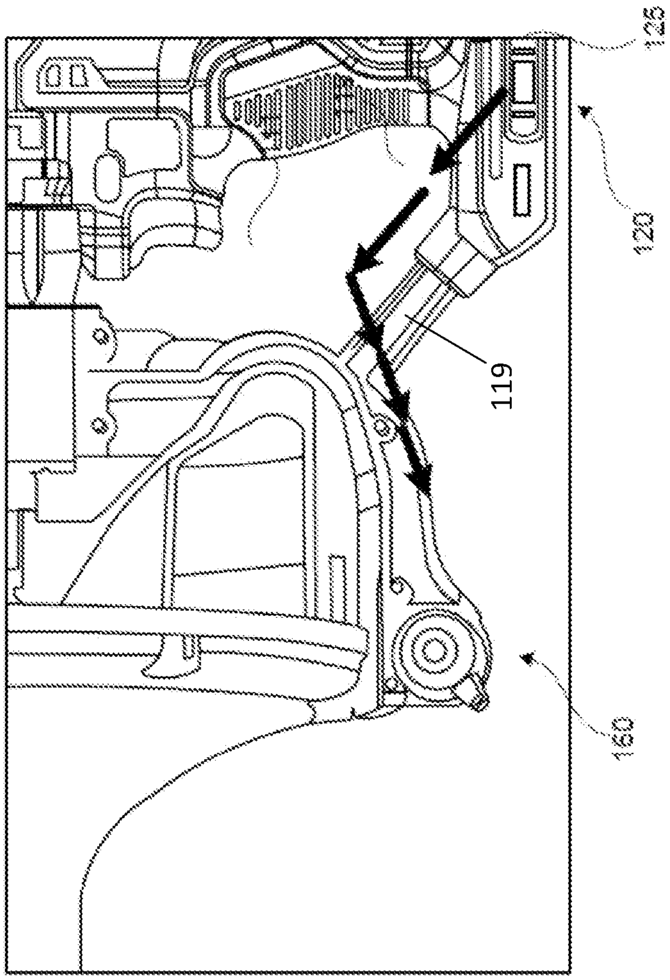

As shown in FIG. 11E, the power unit 120 may include a power supply receptacle 125 for receiving a power supply, such as, for example, a battery or an AC power supply. Wiring for the light assembly 160 may extend from the power supply receptacle 125 through a support arm 119 of the shroud 111 to the light assembly 160 to provide power to the light assembly 160. The support arm 119 may define a bridge between the power unit 120 and the drum assembly 110, and in particular, between the power supply receptacle 125 and the light assembly 160. The support arm 119 may also provide structural support for the weight of the drum assembly 110 and the handle assembly 130. The power unit includes the trigger switch 128, which is configured to control operation of the motor and of the light assembly 160.

As noted above, the power supply receptacle 125 receives a power supply, which may be implemented in the form of a rechargeable battery, allowing the drain cleaning device 100, in accordance with implementations as described herein, to be operated by DC power only (i.e., battery operated), or to by operated by AC/DC power (i.e., operable alternatively by battery power or AC power). This may provide additional flexibility and functionality to the user.

Figure 12A:
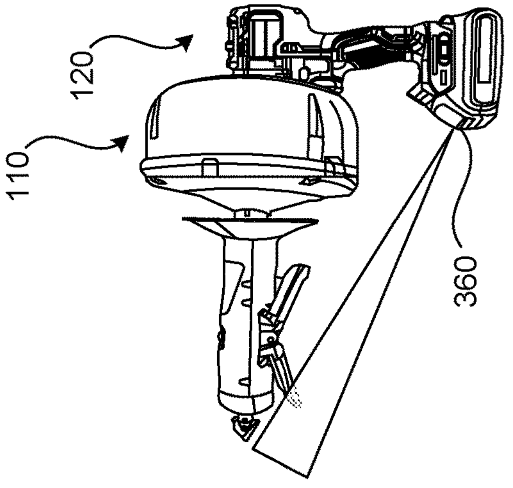
FIGS. 12A-12E illustrate different arrangements of light assemblies of a drain cleaning device, in accordance with implementations described herein.
Figure 12B:
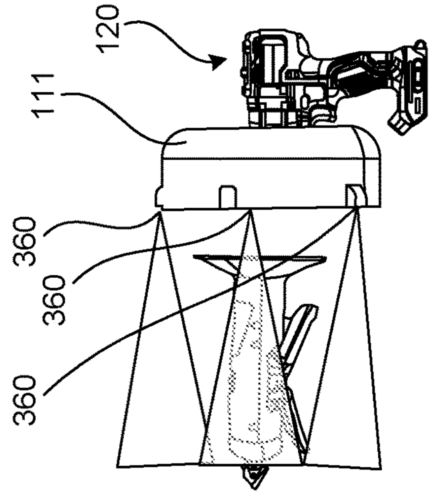
Figure 12C:
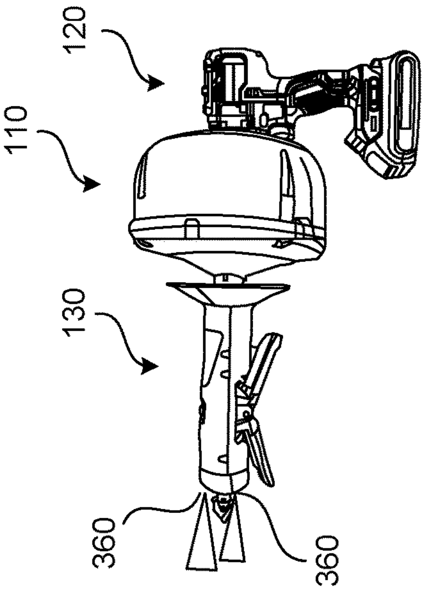
Figure 12D:
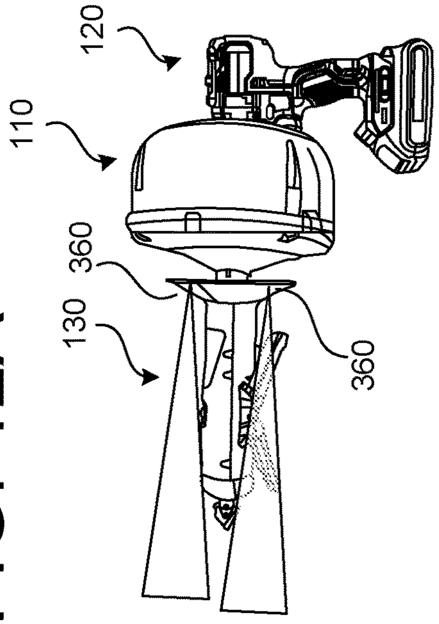
Figure 12E:
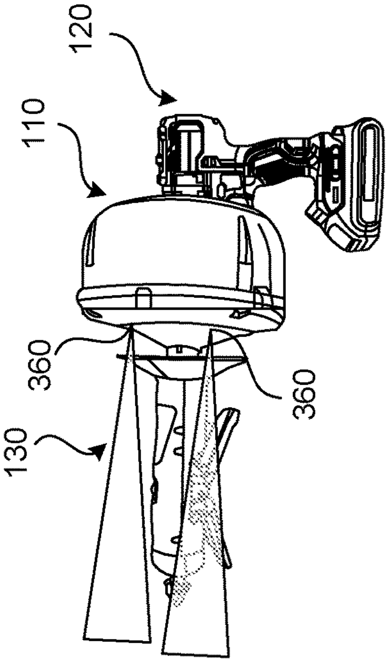

In some implementations, a light assembly may be included on the power unit 120, for example, at a base portion of the power unit 120, as shown in FIG. 12A. In some implementations, a light assembly 360, or a plurality of light assemblies 360, may be included at a peripheral portion of the shroud 111, as shown in FIG. 12B. In some implementations, a light assembly 360, or a plurality of light assemblies 360, may be included at a distal end of the handle assembly 130, as shown in FIG. 12C, along with a secondary energy storage source provided in the handle assembly 130 to provide power to the plurality of light assemblies 360. In some implementations, a light assembly 360, or a plurality of light assemblies 360, may be included on a proximal portion of the handle housing 131 of the handle assembly 130, along with a secondary energy storage source provided in the handle assembly 130 to provide power to the plurality of light assemblies 360, as shown in FIG. 12D. In some implementations, a light assembly 360, or a plurality of light assemblies 360, may be included on the drum 113 of the drum assembly 110, along with a secondary energy storage source provided in the drum cover 113B to provide power to the plurality of light assemblies 360, as shown in FIG. 12E.

In other implementations, the secondary energy storage source may be replaced by a primary coil in the power unit 120 electrically coupled to the power supply receptacle 124 and a secondary coil in the handle assembly 130 or drum housing 111 to wirelessly transmit electrical power from the power supply to the light assemblies, similar to the primary and secondary coils described in U.S. Pat. No. 9,028,088, which is hereby incorporated by reference.

As noted above, in a drain cleaning device in accordance with implementations as described herein, the roller subassemblies 250A/250B/250C may be rotated in their respective radial bores 240A/240B/240C defined in the feed housing 220 to change an orientation of the rollers 258 in the axial bore, contacting the outer circumferential surface of the cable 140, thus changing a feed direction of the cable 140 through the handle assembly 130. In the implementations described above, rotation of the shift ring 132 causes a corresponding rotation of the roller subassemblies 250A/250B/250C, resulting in this change in orientation of the rollers and change in feed direction of the cable 140. Thus, in a drain cleaning device in accordance with implementations as described herein, a feed direction of a cable through the device may be controlled by controlling a direction/orientation of a single set of roller subassemblies, without changing a rotation direction of the motor provided in the power unit 120. Further, enlarged ends of the cable, and differed sized cables, may be easily accommodated by manipulation of a shift ring, lever, and selector switch to adjust a size of a feed opening at a distal end of the device.

As noted above, in some situations, the user may choose to operate a drain cleaning device, in accordance with embodiments described herein, in a manual mode. When operating in the manual mode, the user may, for example, manually control the feed of a cable through a handle assembly of the drain cleaning device. This manual operation, and manual control of the movement, positioning, and manipulation of the cable, may provide additional feedback, for example, tactile feedback, to the user related to, for example, the position of the obstruction, a magnitude or density of the obstruction, progress made in clearing the obstruction, and the like, during operation of the drain cleaning device.

Figure 13A:
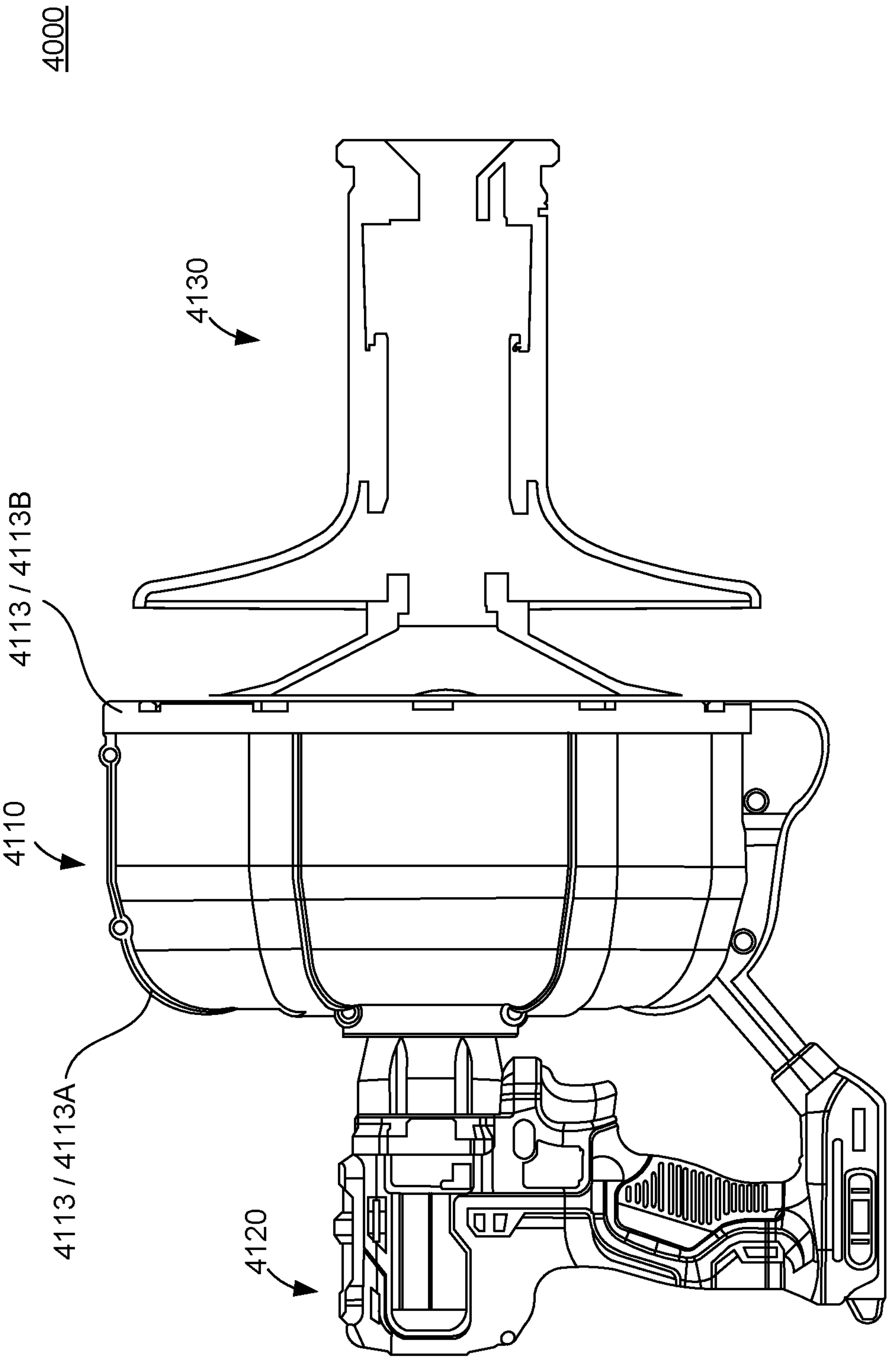
FIGS. 13A-13G illustrate a cable locking mechanism of a drain cleaning device, in accordance with implementations as described herein.

As shown in FIG. 13A, a drain cleaning device 4000, in accordance with implementations as described herein, may include a drum assembly 4110 coupled to a handheld power unit 4120. The power unit 4120 may include various user manipulation devices, allowing the user to selectively control various features related to operation of the device 4000, such as, for example, cable rotation direction and/or speed, and the like. A drum 4113 may be installed in the drum assembly 4110 to receive a cleaning cable, such as, for example, the cable 140 shown in FIG. 1D. A feed handle assembly 4130 may be coupled to the drum assembly 4110 to guide the cleaning cable 140 into and out of the device 4000. In the example implementation shown in FIG. 13A, the feed handle assembly 4130 may be configured for manual feed of the cleaning cable 140 into and out of the drain cleaning device 4000. In some implementations, the feed handle assembly 4130 may be interchangeable with the feed handle assembly 130 shown in FIG. 1A, for coupling to the power unit 120 and drum assembly 110 as described in detail above.

Figure 13B:
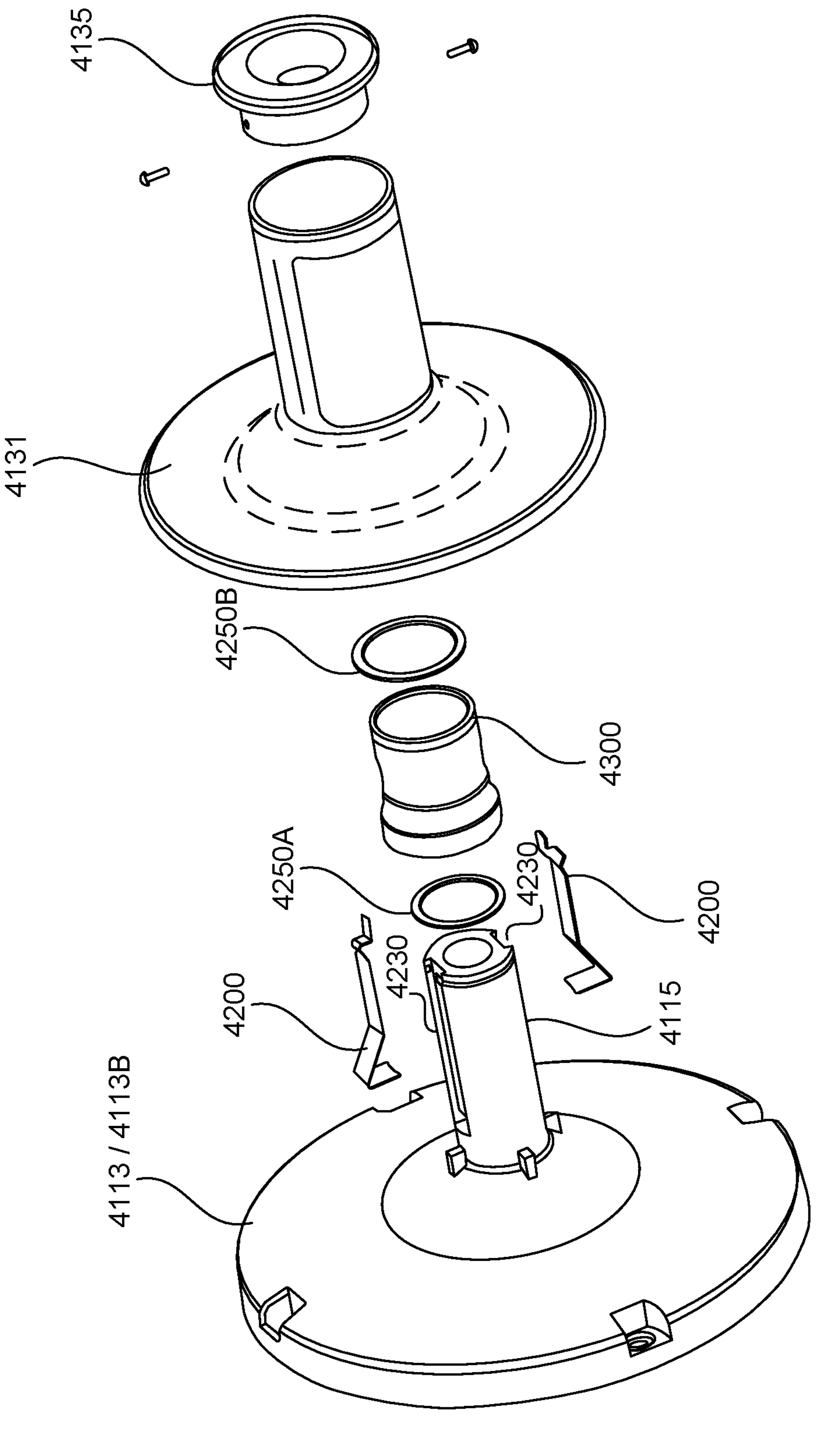

As shown in FIG. 13B, the feed handle assembly 4130 may include a handle housing 4131 coupled to a drum cover 4113B of the drum 4113. A sleeve 4300 may be positioned between an outer circumferential portion of a guide portion 4115 of the drum cover 4113B and an inner circumferential portion of a guide portion 4133 of the handle housing 4131. A front end cap 4135 may be coupled to the handle housing 4131, at a front end portion of the guide portion 4133 of the handle housing 4131. A cable locking mechanism including locking clamps 4200 may be positioned in respective locking grooves 4230 defined in the outer circumferential portion of the guide portion 4115 of the drum cover 4113B. Retaining rings 4250A and 4250B may be respectively positioned at a forward end portion and a rear end portion of the sleeve 4300 to maintain a relative position of the sleeve 4300, the guide portion 4115 of the drum cover 4113B and the guide portion 4133 of the handle housing 4131.

Figure 13C:
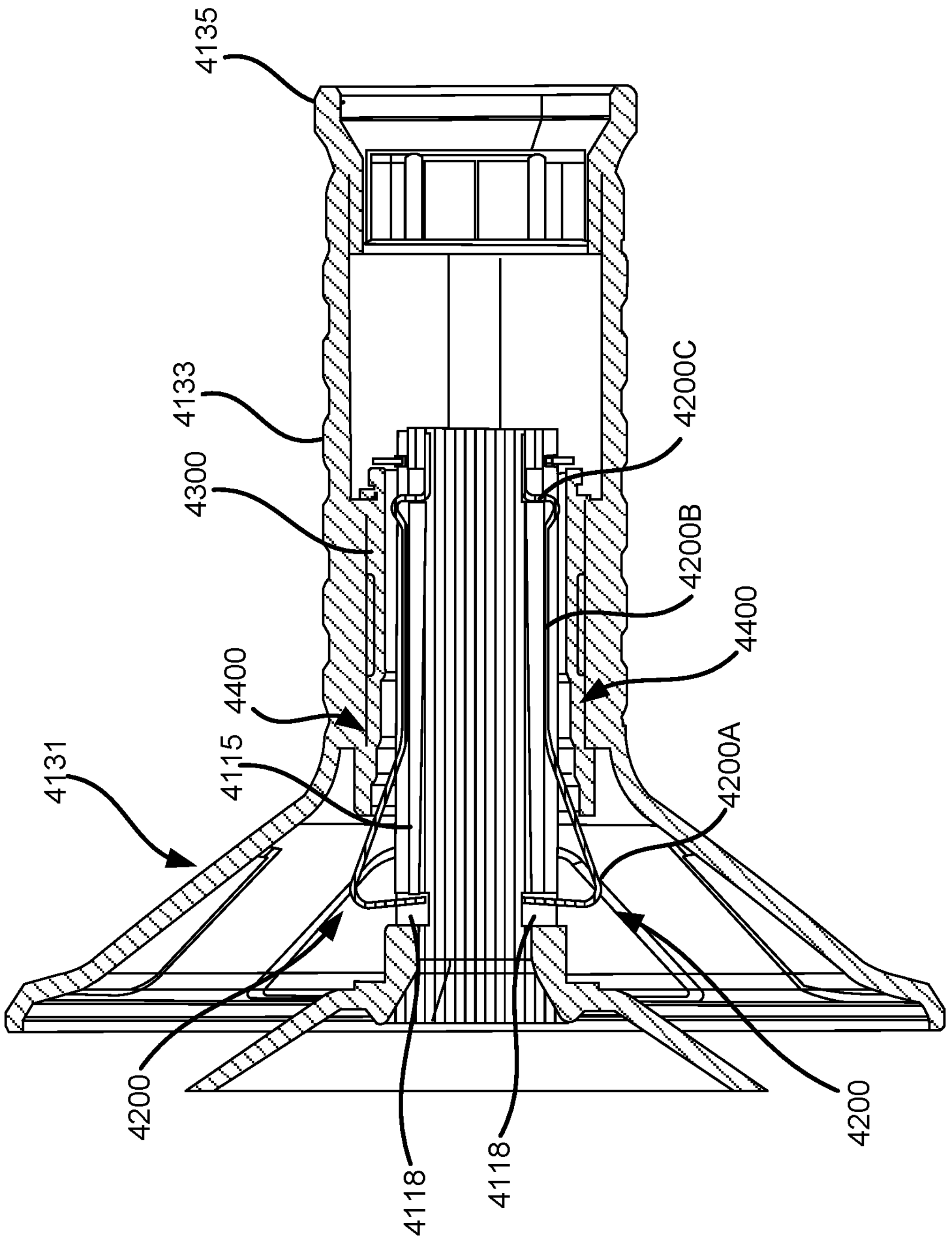

FIG. 13C is a cross sectional view of the handle housing 4131 coupled to the drum cover 4113B, with the sleeve 4300 positioned between the outer circumferential portion of the guide portion 4115 of the drum cover 4113B and the inner circumferential portion of the guide portion 4133 of the handle housing 4131. Each of the locking clamps 4200 may include, for example, an inclined portion 4200A, a body portion 4200B, and a coupling portion 4200C. The body portion 4200B of each locking clamp 4200 may be received in a respective locking groove 4230 defined in the outer circumferential portion of the guide portion 4115 of the drum cover 4113B, with the coupling portion 4200C of each locking clamp 4200 fitted in a respective slot defined in the guide portion 4115 to maintain an axial position of the locking claim 4200 relative to the guide portion 4115.

The inclined portion 4200A of each locking clamp 4200 may engage a stepped and/or ramped portion 4400, or locking clamp engagement portion 4400, defined on an interior circumferential surface portion of the sleeve 4300. In particular, the inclined portion 4200A of each locking clamp 4200 may selectively engage one of a series of sequentially arranged steps 4402 and/or ramps 4404 forming the engagement portion 4400 in response to an axial movement of the sleeve 4300 relative to the guide portion 4115 of the drum cover 4113B. The locking clamps 4200 may be made of a resilient material, forming a spring mechanism, for example, in the area of the inclined portion 4200A of the locking clamp 4200. For example, the inclined portion 4200A of the clamp 4200 may be urged toward the guide portion 4115 of the drum cover 4113B in response to movement of the sleeve 4300 in a first direction and corresponding contact with the engagement portion 4404 of the sleeve 4300.

This movement of the inclined portion 4200A of the clamp 4200 toward the guide portion 4115 of the drum cover 4113B may cause a leg portion 4200D of the clamp 4200 to extend into and/or through a corresponding aperture 4118 formed in the guide portion 4115, causing the leg portion 4200D of the clamp 4200 to contact, or engage, a cable 140 received in/extending through the guide portion 4115, and secure a position of the cable 140 in the guide portion 4115. The inclined portion 4200A of the clamp 4200 may selectively engage one of the steps 4402, to fix a position of the clamp 4200 relative to the guide portion 4115 of the drum cover 4113B and maintain engagement between the leg portion 4200D of the clamp 4200 and the cable 140 in the guide portion 4115 of the drum cover 4113B. Similarly, the inclined portion 4200A of the clamp 4200 may move away from the guide portion 4115 in response to movement of the sleeve 4300 in a second direction and corresponding contact with the stepped/ramped portion 4404 of the sleeve 4300. This movement of the inclined portion 4200A of the clamp 4200 away from the guide portion 4115 may cause the leg portion 4200D of the clamp 4200 to be drawn through the aperture 4118 and away from the interior of the guide portion 4115, for example, to release engagement of the leg portion 4200D with the cable 140 received in the guide portion 4115.

Figure 13D:
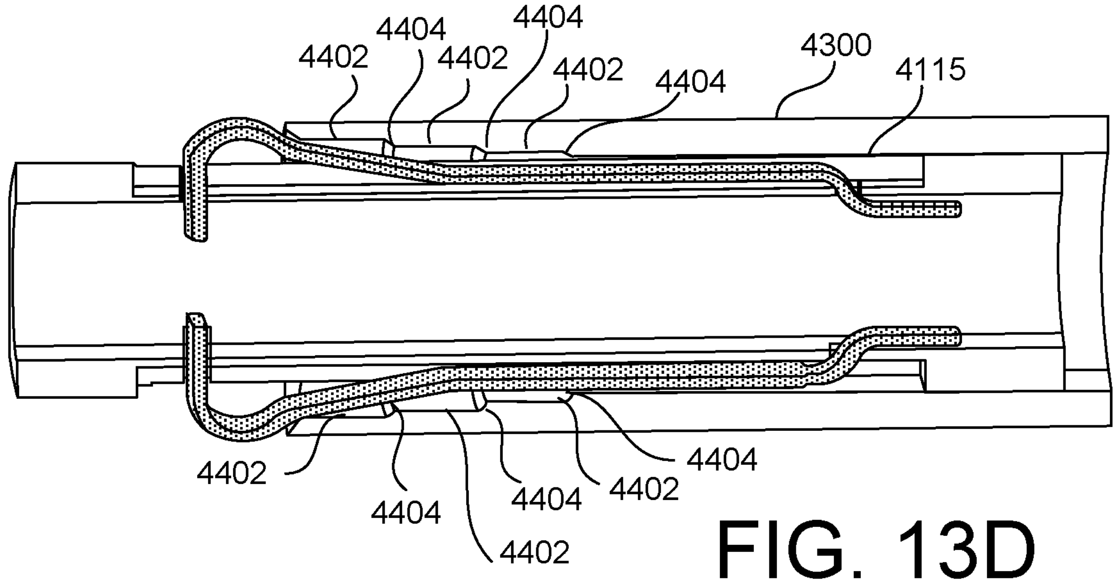
Figure 13E:
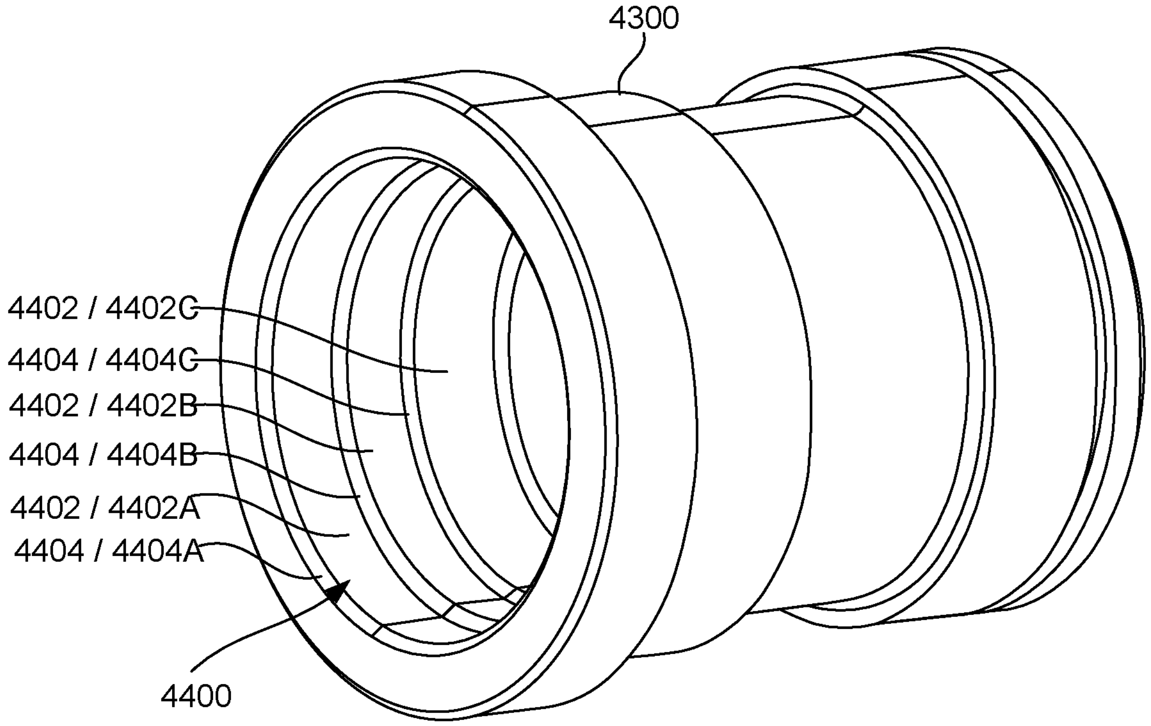
Figure 13F:
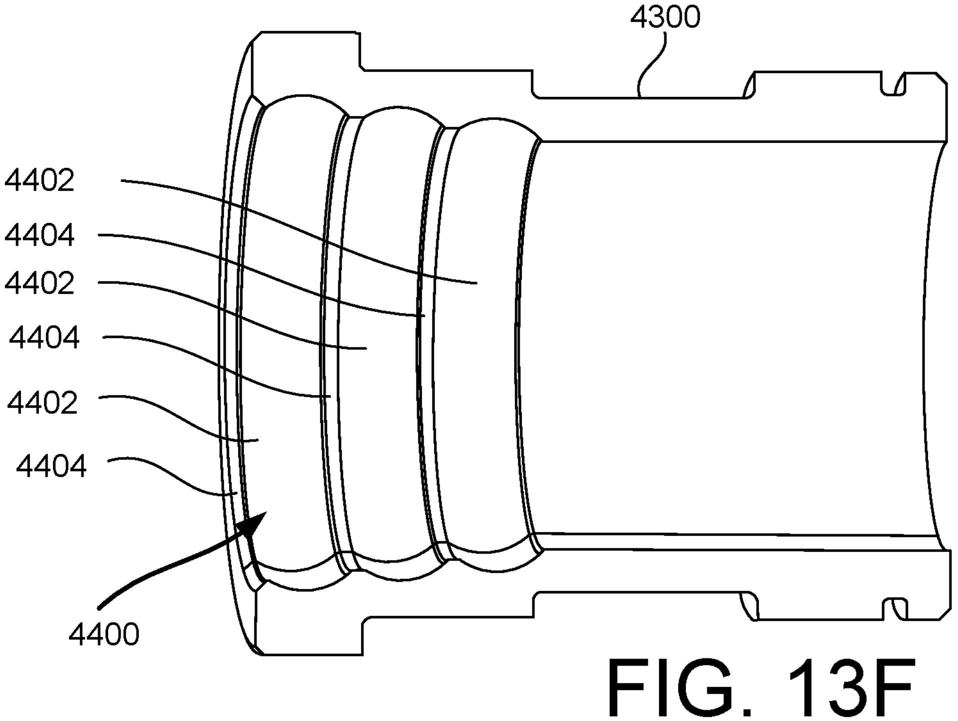
Figure 13G:
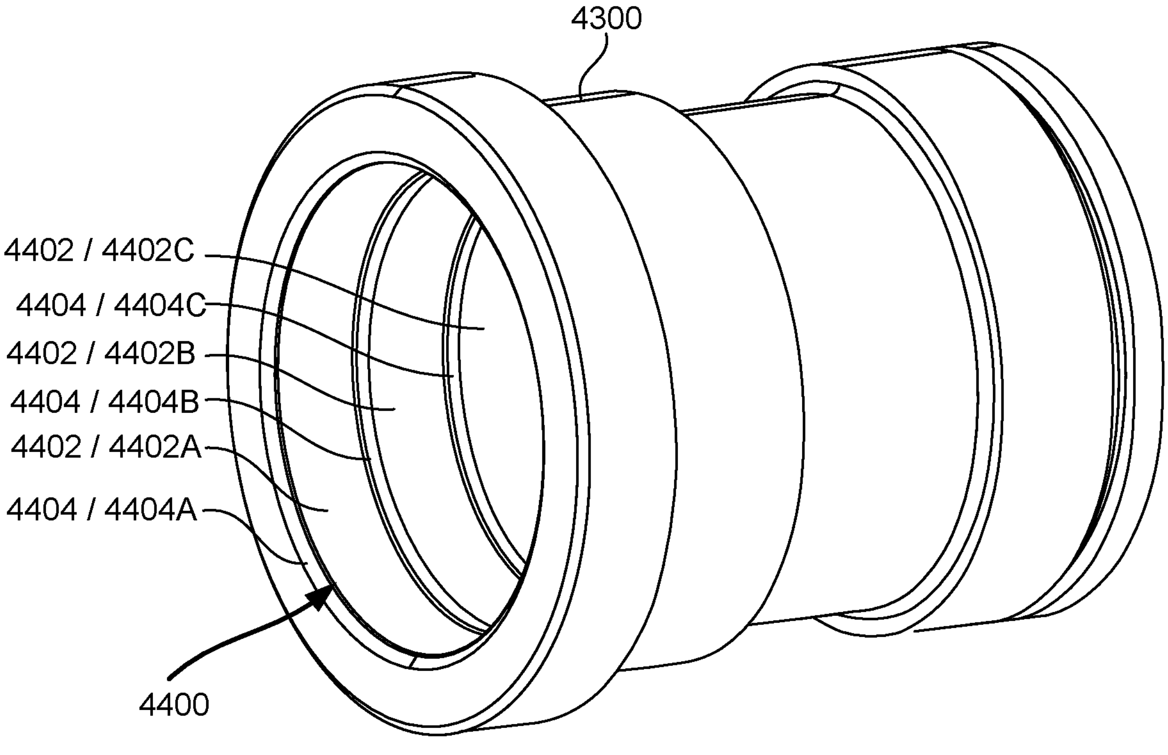

Cross sectional views of the engagement portion 4400 of the sleeve 4300 are shown in FIGS. 13D and 13F, and perspective views of the engagement portion 4400 of the sleeve 4300 are shown in FIGS. 13E and 13G. As described above, the engagement portion 4400 may include sequentially arranged steps 4402 and ramps 4404. In the example implementations shown in FIGS. 13D-13G, the engagement portion 4400 includes three sets of sequentially arranged steps 4402A, 4402B and 4402C, and ramps 4404A, 4404B and 4404C. Each of the steps 4402 and ramps 4404 may be defined in an interior circumferential surface of the sleeve 4300. In some implementations, each of the steps 4402 and ramps 4404 may define a circumferential band in the inner circumferential surface of the sleeve 4300. In some implementations, the steps 4402 may be essentially flat, or straight, as shown in FIGS. 13D and 13E. In some implementations, the steps 4402 may be cupped, defining a detent associated with each of the steps 4402, as shown in FIGS. 13F and 13G. This cupped portion, or detent, included in the step 4402 may facilitate engagement with the inclined portion 4200A of the clamp 4200, and may provide some tactile feedback to the user during manual adjustment, confirming engagement of the inclined portion 4200A of the clamp 4200 with the desired step 4200, and engagement of the leg portion 4200D of the clamp 4200 with the cable 140 received in the guide portion 4115. The steps 4402 including the cupped portion, or detent as shown in FIGS. 13F and 13G may also improve fatigue life of the clamp 4200.

In the example shown in FIG. 13C, the handle housing 4131 is positioned in an essentially forward-most axial position relative to the drum cover 4113B. With the sleeve 4300 coupled, for example, fixed to, the interior of the handle housing 4131, the sleeve 4300 may move together with the handle housing 4131 as the handle housing 4131 moves axially with respect to the guide portion 4115 of the drum cover 4113B. In this forward-most position, the leg portions 4200D of the two clamps 4200 shown in FIG. 13C are essentially retracted out through the respective aperture 4118, with the inclined portion 4200A of each clamp 4200 engaged with a first of the series of sequentially arranged steps 4404. This separation between the ends of the leg portions 4200D of the clamps 4200 may allow the cable 140 to be inserted through the guide portion 4115 of the drum cover 4113B/guide portion 4133 of the handle housing 4131.

Figure 14A:
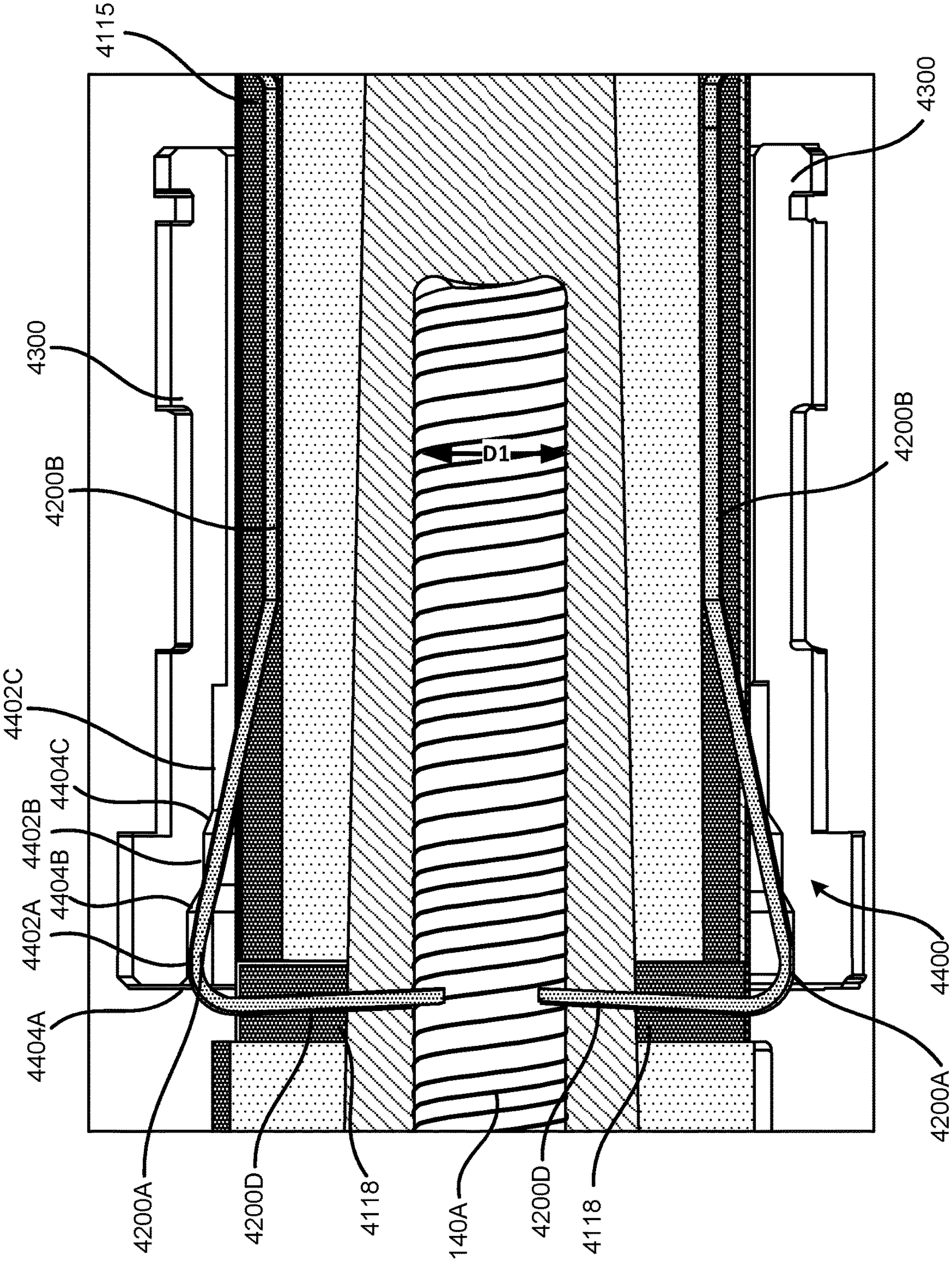
FIGS. 14A-14C illustrate operation of a cable locking mechanism of a drain cleaning device, in accordance with implementations as described herein.
Figure 14B:
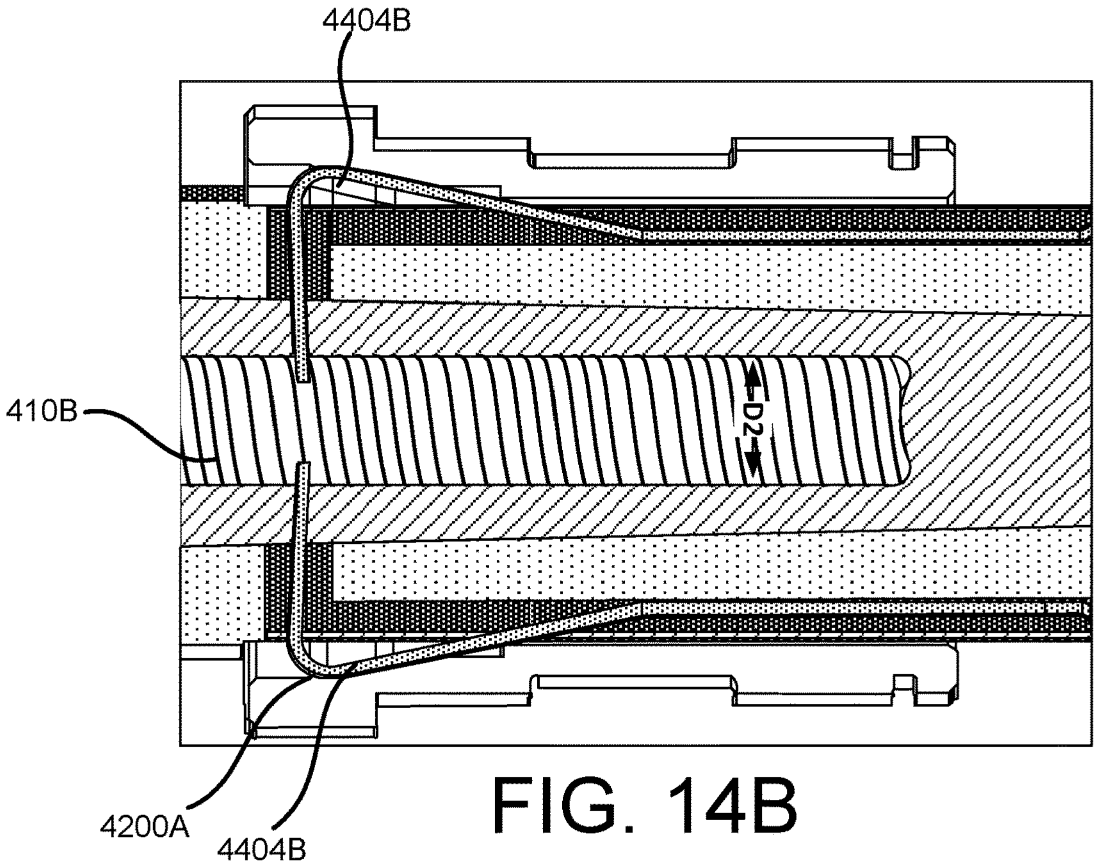
Figure 14C:
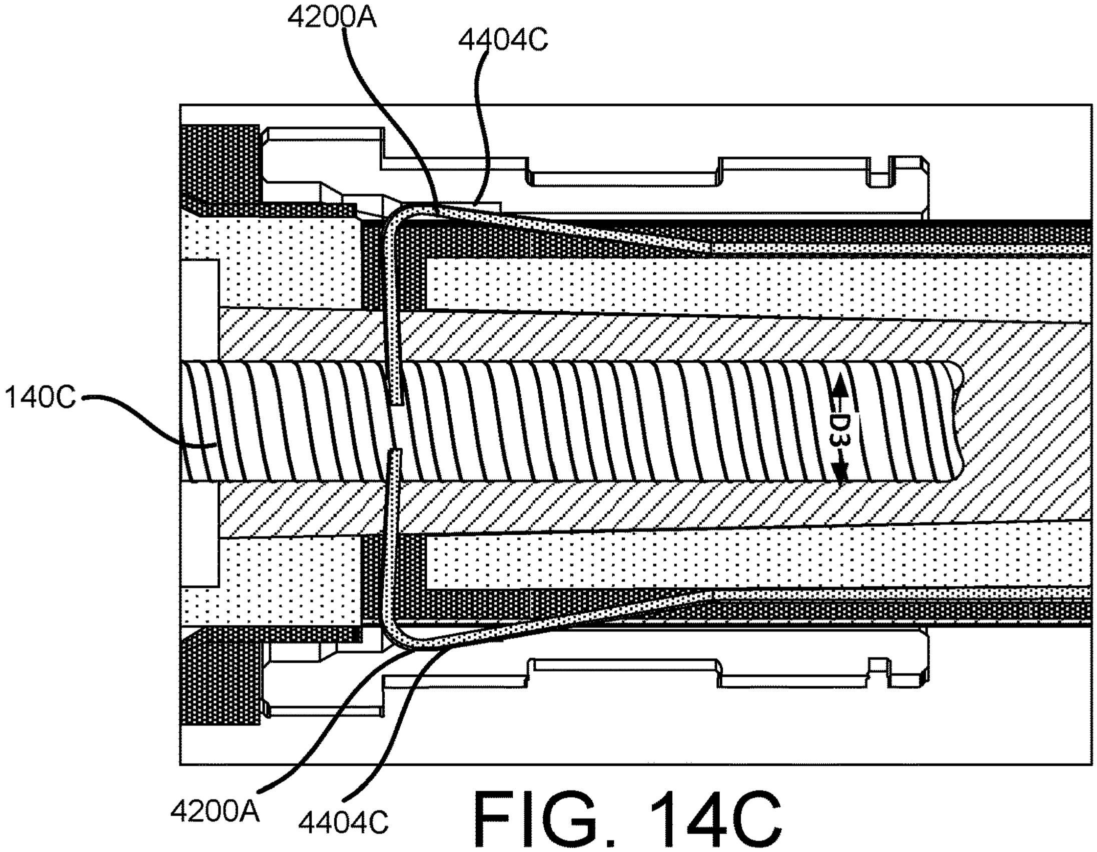

As shown in FIGS. 14A-14C, this separation distance between the ends of the leg portions 4200D of the clamps 4200 may be adjusted as the handle housing 4131 and sleeve coupled thereto, slide axially with respect tot the guide portion 4115, allowing the clamps 4200 to grasp and secure in place cables 140 having different diameters. In the example implementations shown in FIGS. 13A-14C, the engagement portion 4400 of the sleeve 4300 includes a set of three sequentially formed steps 4402A, 4402B and 4402C and ramps 4404A, 4404B and 4404C, which, when engaged with the inclined portions 4200A of the clamps 4200 as described above, may allow the cable locking mechanism to grasp and secure cables having three different diameters. In some implementations, the engagement portion 4400 of the sleeve 4300 may include more, or fewer steps 4402 and ramps 4404 to secure engage and secure cables having more, or fewer, respectively, different diameters. Similarly, in the example implementations shown in FIGS. 13A-14C, the locking mechanism includes two locking clamps 4200 coupled in an axially extending slot formed in an outer circumferential portion of the guide portion 4115, with a front end of each locking clamp 4200 axially retained in a radial slot formed in the outer circumferential portion of the guide portion 4115. In some implementations, the locking mechanism may include a different number of locking clamps 4200, coupled to and retained with respect to the guide portion of the drum cover 4113B in a different manner.

As noted above, the user may slide the handle housing 4131, and sleeve 4300 coupled thereto, to the open position shown in FIG. 13C, to feed the cable 140 from the drum 4113, and out through the handle assembly 4130. After inserting the cable 140, the user may slide the handle housing 4131, and sleeve 4300 coupled thereto, to engage and secure the cable 140 in position using the cable locking mechanism including the clamps 4200. For example, after inserting the cable 140, the user may slide the handle housing 4131 and sleeve 4300 coupled thereto in an axial direction with respect to the guide portion 4115, from the open position shown in FIG. 13C, toward the drum cover 4113B. Movement of the handle housing 4131 and sleeve 4300 in this direction may cause the leg portion 4200D of each of the clamps 4200 to extend through the respective aperture 4118 in the guide portion 4115, and the inclined portions 4200A of the clamps 4200 to move along the ramps 4404. Continued movement of the leg portion 4200D of each clamp 4200, in response to the continued sliding movement of the sleeve 4300 and subsequent movement of the inclined portion 4200A of the clamp 4200 along the ramps 4404, may in turn cause the leg portion 4200D of each clamp 4200 to contact the outer circumferential portion of the cable 140, and the inclined portion 4200A of each clamp 4200 to engage a corresponding one of the steps 4402.

For example, as shown in FIG. 14A, a cable 140A having a first diameter D1 may be inserted into the guide portion 4115. After inserting the cable 140, the user may slide the handle housing 4131/sleeve 4300 axially with respect to the guide portion 4115, in a direction toward the drum 4113. At a certain point during this sliding motion, the leg portion 4200D of each clamp 4200 may contact the outer circumferential portion of the cable 140, thus restricting further sliding motion of the handle housing 4131/sleeve 4300, and causing the inclined portion 4200A of each clamp 4200 to engage a first step 4402A of the steps 4402 defined in the inner circumferential surface of the sleeve 4300. This engagement of the inclined portion 4200A with the first step 4402A may secure the position of the leg portion 4200D against the outer circumferential portion of the cable 140A, thus securing the position of the cable 140A in the device 4000.

As shown in FIG. 14B, a cable 140B having a second diameter D2 may be inserted into the guide portion 4115, the diameter D2 of the second cable 140B being less than the diameter D1 of the first cable 140A. In this instance, sliding movement of the handle housing 4131/sleeve 4300 in the manner described above may cause the leg portion 4200D of each of the clamps 4200 to extend through the respective aperture 4118 and further into the guide portion 4115 before contacting the outer circumferential portion of the cable 140B. This contact of the leg portions 4200D with the outer circumferential portion of the cable 140B may restrict further sliding movement of the handle housing 4131/sleeve 4300, causing the inclined portion 4200A of each clamp 4200 to engage a second step 4402B of the steps 4402 defined in the inner circumferential surface of the sleeve 4300. This engagement of the inclined portion 4200A with the second step 4402B may secure the position of the leg portion 4200D against the outer circumferential portion of the cable 140B, thus securing the position of the cable 140B in the device 4000.

In a similar manner, as shown in FIG. 14C, a cable 140C having a third diameter D3 may be inserted into the guide portion 4115, the diameter D3 of the third cable 140C being less than the diameter D2 of the second cable 140B, and less than the diameter D1 of the first cable 140A. In this instance, sliding movement of the handle housing 4131/sleeve 4300 in the manner described above may cause the leg portion 4200D of each of the clamps 4200 to extend through the respective aperture 4118 and further into the guide portion 4115 before contacting the outer circumferential portion of the cable 140C. This contact of the leg portions 4200D with the outer circumferential portion of the cable 140C may restrict further sliding movement of the handle housing 4131/sleeve 4300, causing the inclined portion 4200A of each clamp 4200 to engage a third step 4402C of the steps 4402 defined in the inner circumferential surface of the sleeve 4300. This engagement of the inclined portion 4200A with the third step 4402C may secure the position of the leg portion 4200D against the outer circumferential portion of the cable 140C, thus securing the position of the cable 140C in the device 4000.

Once the cable 140 is secured in the device 400 in this manner, the cable 140 may be manipulated, either manually or via power transferred to the cable 140 from the power unit 4120, to dislodge an obstruction from a pipe or drain as previously described. To disengage the cable locking mechanism including the clamps 4200 and release the cable 140 from the device 4000, the user may slide the handle housing 4131/sleeve 4300 axially with respect to the guide portion 4115 of the drum cover 4113B, in a direction away from the drum 4113. This sliding movement may release the engagement between the leg portion 4200D of each of the clamps 4200 and the cable 140, and release the engagement of the inclined portion 4200A of each of the clamps 4200 and the respective step 4402, thus allowing the cable 140 to move freely into and out of the handle assembly 4130.

The stepped/ramped engagement portion 4400 of the sleeve 4300 in the cable locking mechanism described above may allow cables having different diameters to be accommodated and secured in the device with a relatively consistent, and relatively nominal, actuating force, with the engagement of the clamps 4200 with the steps 4402 providing tactile feedback to the user of positive engagement, and securing of the cable 140. The ramps 4404 may facilitate sliding movement of the corresponding surfaces of the locking clamps 4200 along the inner circumferential surface of the sleeve 4300, with the steps 4402 being sized to provide adequate cable locking force and optimum sleeve actuating force for the various different diameters of cables to be accommodated.

Figure 15:
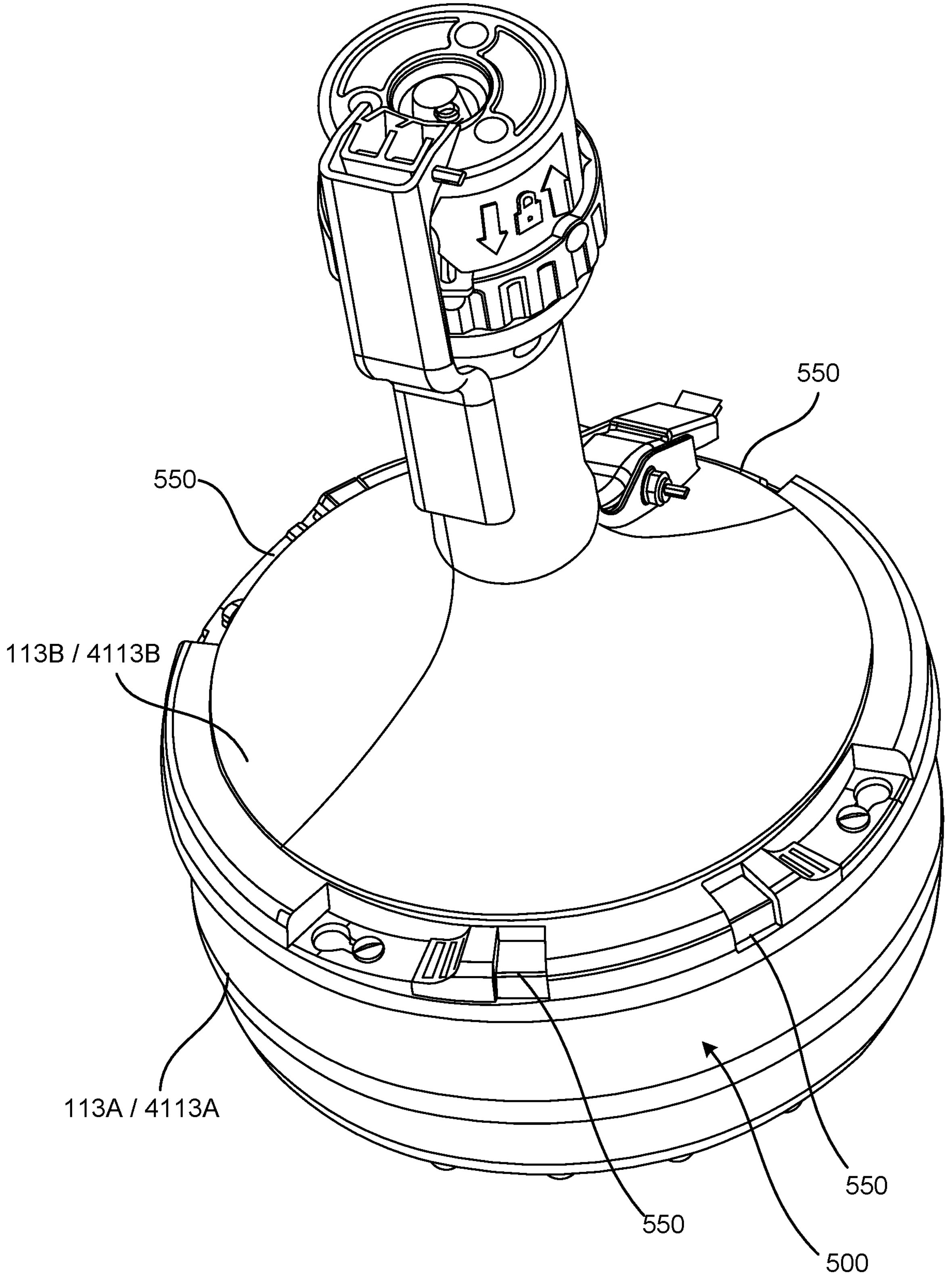
FIG. 15 illustrates a coupling of a drum cover to a drum base of a drain cleaning device, in accordance with implementations as described herein.

Referring to FIGS. 15-21D, a user may choose to remove and/or replace the drain cleaning cable 140 received in the drum assembly 110 (as shown in FIG. 1C) or 4110 (as shown in FIG. 13A) to, for example, replace a cable 140 that has broken or become kinked, install a cable 140 having a different diameter, remove a cable 140 for storage of the drain cleaning device, install a cable 140 to initiate use of the drain cleaning device, and other such reasons. One or more cover taper lock assemblies 500, as shown in FIG. 15, may couple the drum base 113A/4113A and the drum cover 113B/4113B to facilitate engagement and disengagement between the drum base 113A/4113A and the drum cover 113B/4113B. In the example implementation shown in FIG. 15, the drum cover 113B is coupled to the drum base 113A by two cover taper lock assemblies 500, each cover taper lock assembly 500 including two cover taper locks 550. However, more, or fewer, cover taper locks 550 may be operated, cooperatively or individually, to couple the drum base 113A/4113A and the drum cover 113B/4113B. Hereinafter, cover taper locks in accordance with various implementations will be described with respect to the drum base 113A and the drum cover 113B of the drum assembly 110 of the drain cleaning device 100 shown in FIG. 1C, simply for ease of discussion and illustration. However, cover taper locks in accordance with implementations described herein may also be used to couple the drum base 4113A and the drum cover 4113B of the drum assembly 4110 of the drain cleaning device 4000 shown in FIG. 13A.

Figure 16:
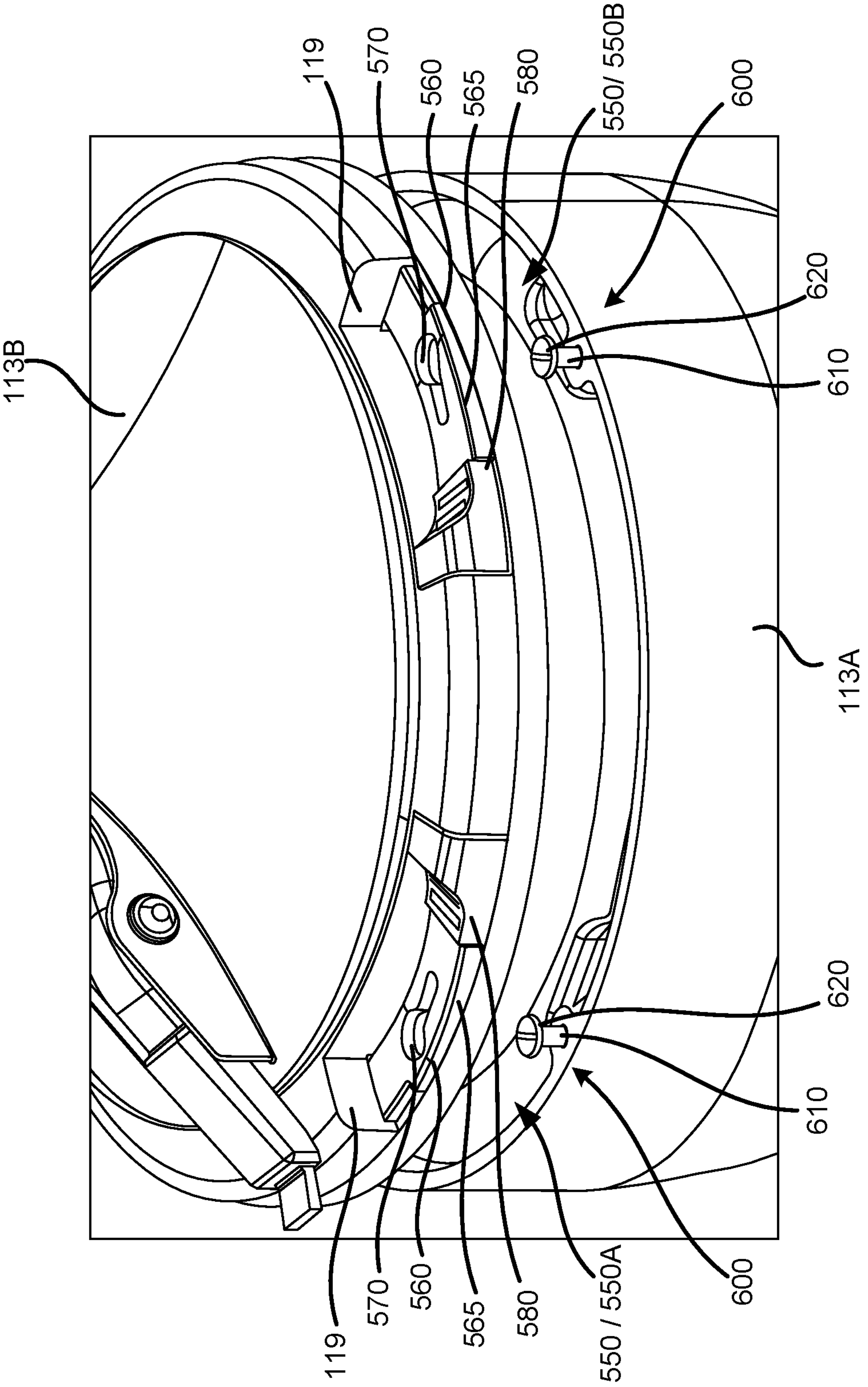
FIG. 16 illustrates a drum cover separated from a drum base of a drain cleaning device, in accordance with implementations as described herein.

FIG. 16 is a partially exploded, partial view of the drum cover 113B and the drum base 113A to be coupled by a cover taper lock assembly 500 including a first cover taper lock 550A and a second cover taper lock 550B. In the example implementation shown in FIG. 16, the first and second cover taper locks 550A and 550B may be essentially mirror image parts that may be actuated together by the user to selectively couple and decouple the drum cover 113B and the drum base 113A. Each of the cover taper locks 550 may be installed in a respective recess 119 defined in an outer peripheral portion of the drum cover 113B. Each cover taper lock 550 may include a locking plate 560 including a tapered ramp portion 565, and an elongated key slot 570 defined in the locking plate 560. An actuating pad 580 may be coupled on an upper portion of the locking plate 560, and may cause the locking plate 560 move, or slide, in response to a force applied by the user. The keyhole slot 570 may be aligned with an opening 129 in the recess 119 (see FIG. 17C). An engagement pin 600, such as, for example, a fastener 600 including, for example, a screw, having a shank 610 and an enlarged head 620, may extend upward from the drum base 113A and through the opening 129 in the recess 119, so that the pin 600 may be slidably coupled in the keyhole slot 570. Each cover taper lock 550 may be retained in its respective recess 119 by, for example, a fastener 720 extending through the bottom wall of the recess 119 and into the cover taper lock 550 (see FIG. 17C). In some implementations, the fastener 720 may pass through the locking plate 560 and into a corresponding portion of the actuating pad 580, thus fixing the locking late 560 and the actuating pad 580, and securing the cover taper lock 550 in its respective recess 119.

Figure 17A:
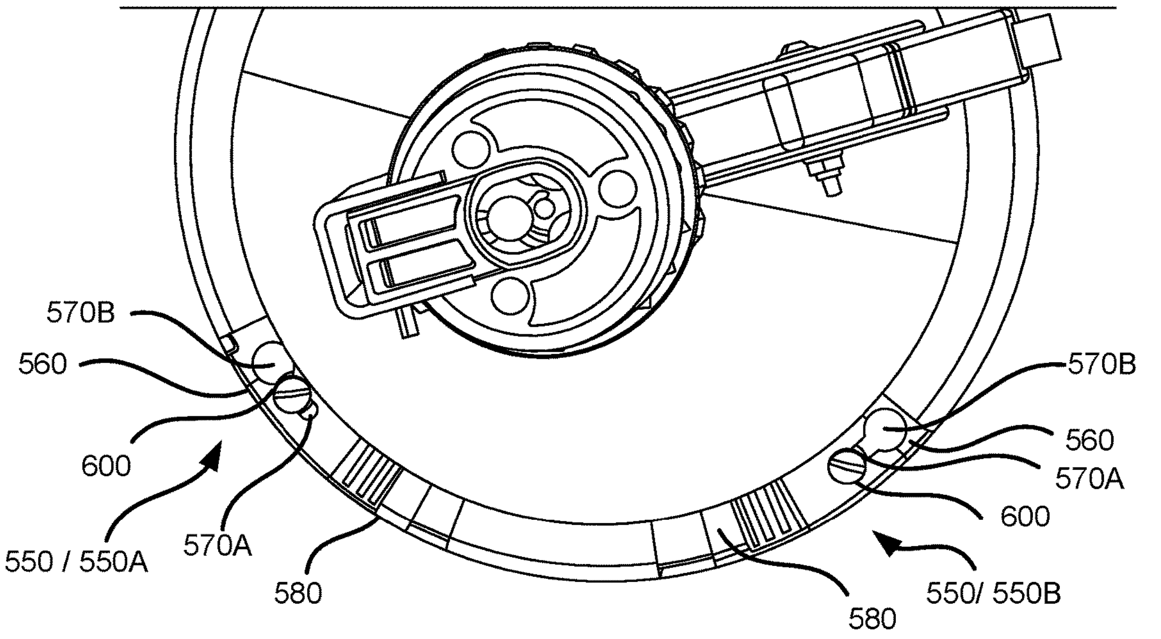
FIGS. 17A and 17D are a top views.
Figure 17B:
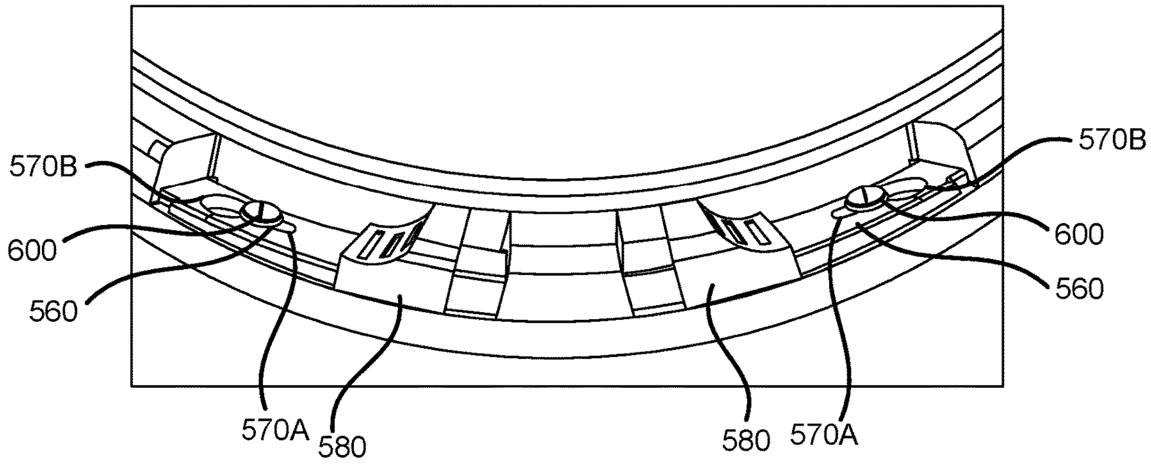
FIGS. 17B and 17E are side views.
Figure 17C:
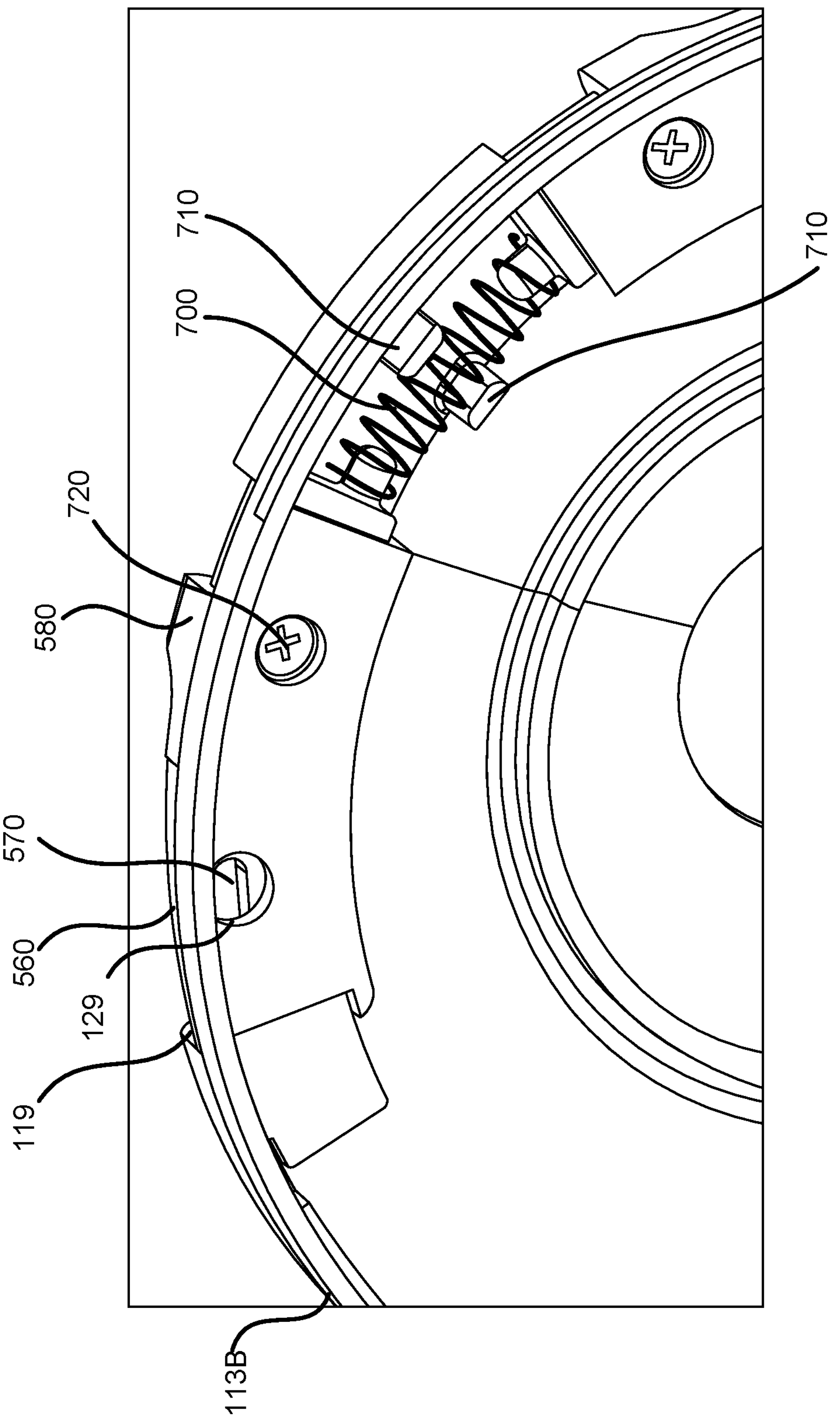
FIG. 17C is a bottom view, of a drum cover of a drain cleaning device, in accordance with implementations as described herein.

The cover taper locks 550A, 550B illustrated in the top view of the drum cover 113B shown in FIG. 17A are in a locked position, fixing the drum cover 113B to the drum base 113A. A side view of the locked position of the cover taper locks 550A, 550B is shown in FIG. 17B. In this locked position, the shank 610 of each pin 600 is received in a narrow, elongated end 570A of the keyhole slot 570, so that the cover taper lock 550, and drum cover 113B coupled thereto, are retained relative to the drum base 113A by the position of the head 620 of the pin 600 against the locking plate 560 of the cover taper lock 550. An elastic member 700, or spring 700, may extend between the first and second cover taper locks 550A, 550B, as shown in FIG. 17C. Alignment of the spring 700 between the locking plates 560 may be maintained by, for example, protrusions 710 formed on the interior side surface of the drum cover 113B. The spring 700 may exert a biasing force on the locking plates 560 of the first and second cover taper locks 550A, 550B that urges the locking plates 560 apart, maintaining the cover taper locks 550A, 550B in the locked position.

Figure 17D:
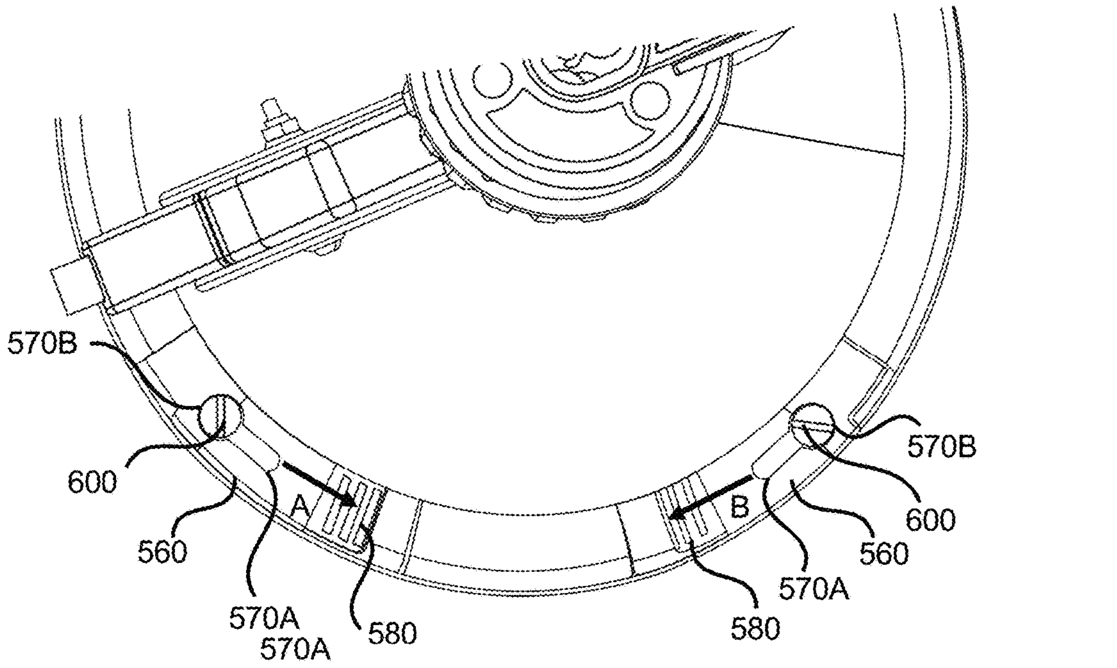
Figure 17E:
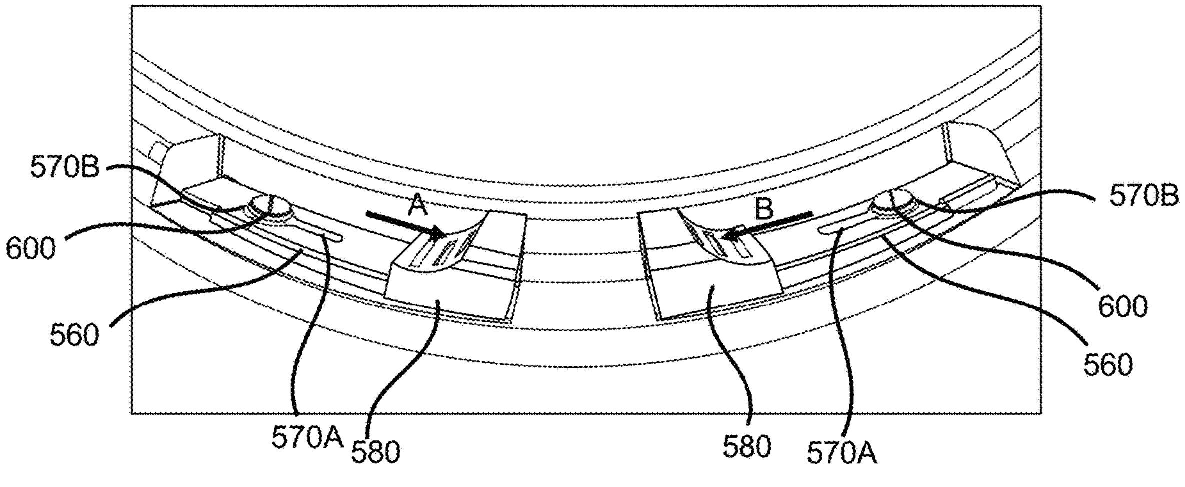

A force A may be applied to the actuation pad 580 of the first taper lock 550A, and a force B may be applied to the actuation pad 580 of the second taper lock 550B, as shown in FIGS. 17D and 17E to release the engagement between the head 620 of the pin 600 and the locking plate 560 of the respective cover taper lock 550A, 550B. The force A and the force B may be applied by the user by, for example, a finger exerting a force on each of the two the actuating pads 580, emulating in a pinching type motion with two fingers of one hand, to draw the actuating pads 580, and locking plates 560 coupled thereto, together, and the spring 700 to compress. The sliding motion of the locking plates 560 of the first and second cover taper locks 550A, 550B in this manner, in an essentially arcuate path, from the position shown in FIGS. 17A-17B to the position shown in FIGS. 17D-17E, cause keyhole slot 570 to also move along this path, so that the shank 610 of the pin 600 (previously positioned in a narrow, elongated end 570A of the keyhole slot 570, as shown in FIGS. 17A-17B) is positioned in an enlarged end 570B of the keyhole slot 570 (as shown in FIGS. 17D-17E). A dimension, for example, a diameter, of the enlarged end 570A of the keyhole slot 570 may be greater than a corresponding dimension of the head 620 of the pin 600, for example, greater than a diameter of the head 620 of the pin 600, allowing the head 620 of the pin 600 to pass through the enlarged end 570A of the keyhole slot 570. This may release the engagement between the head 620 of the pin 600 and the locking plate 560 of the respective cover taper lock 550A, 550B, allowing the drum cover 113B to be removed from the drum base 113A by a simple lifting motion.

To couple the drum cover 113B on the drum base 113A, the user may, in a similar manner, apply the forces A and B to the respective actuating pads 580 of the cover taper locks 550A, 550B as described above with respect to FIGS. 17D and 17E, and align the enlarged ends 570B of the keyhole slots 570 of the cover taper locks 550A, 550B with the heads 620 of the respective pins 600. The user may release the forces A and B once the heads 620 of the respective pins 600 have passed through the enlarged end 570B of the keyhole slot 570. Release of the forces A and B applied to the actuating pads 580 cause the locking plates 560 to slide outward in response to the biasing force of the spring 700, and the shanks 610 of the pins 600 to be positioned in the elongated end 570A of the keyhole slot 570. The positioning of the pin 600 at the elongated end 570A of the keyhole slot may cause the locking plate 560 to once again be retained by the head 620 of the pin 600, as shown in FIGS. 17A and 17B, thus securing the drum cover 113B to the drum base 113A.

The example implementation described above with respect to FIGS. 17A-17E was discussed with respect to a single set of cover taper locks 550A and 550B. However, multiple sets of cover taper locks may be implemented, as shown in FIGS. 15 and 16, to releasably secure the drum cover 113B to the drum base 113A. The multiple sets of cover taper locks may be operated in a similar manner to that described with respect to FIGS. 17A-17E.

Figure 18A:
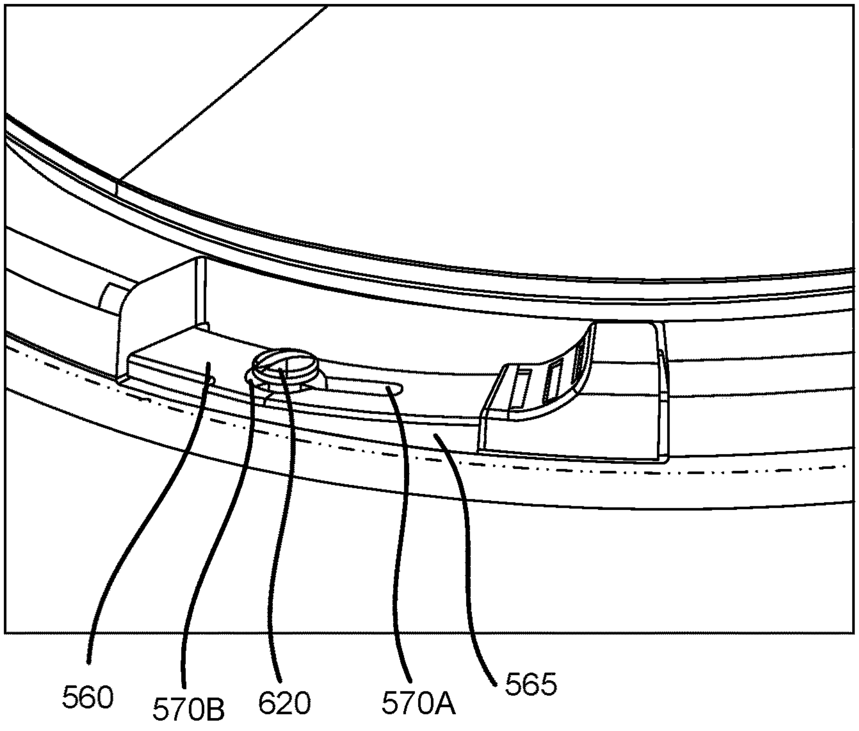
FIGS. 18A-18D illustrate features of cover taper locks of a drain cleaning device, in accordance with implementations as described herein.
Figure 18B:
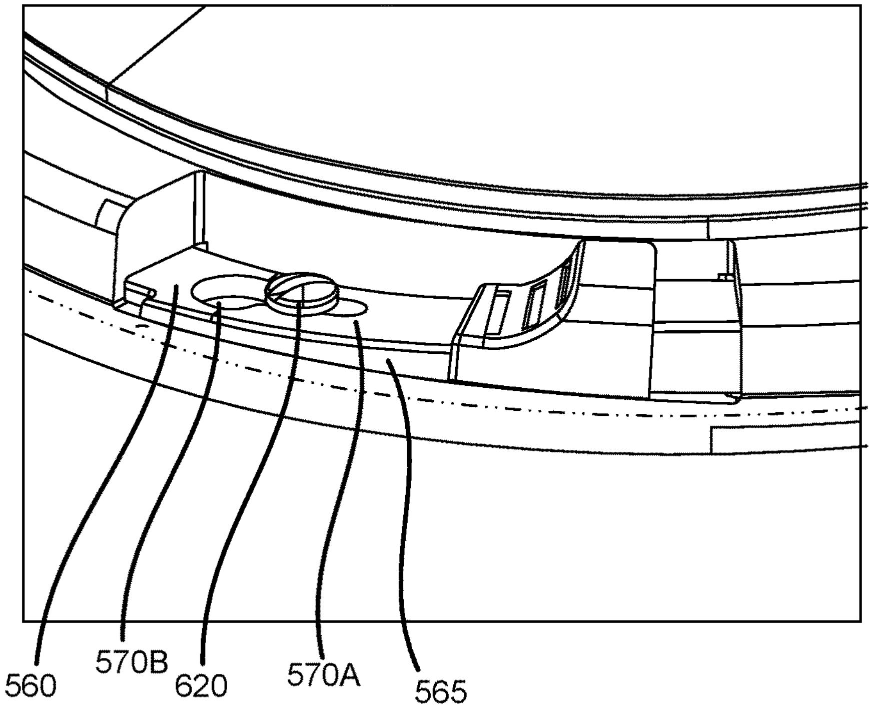

As noted above, each of the pins 600 may be fixedly installed in the drum base 113A. For example, the pin 600 may be a screw that is threadably coupled to the drum base 113A. In some implementations, the height of the head 620 of the pin 600, for example, a distance from the top surface portion of the drum base 113A to the bottom surface of the head 620 of the pin 600 (the bottom surface of the head of the pin 600 defining an engagement surface that selectively engages the locking plate 560) may be set to allow for proper engagement with the tapered portion 565 of the locking plate 560. For example, when coupling the drum cover 113B to the drum base 113A, after the head 620 has passed through the enlarged end 570B of the keyhole slot 570 and the force is released, the force of the spring 700 may drive the tapered portion 565 of the locking plate 560 under the head 620 of the pin 600 to provide for secure attachment of the drum cover 113B to the drum base 113A, as shown in FIGS. 18A-18B. In some implementations, the tapered portion 565 of the locking plate 560 may have a wedge shaped cross section, as shown in FIGS. 18A-18B. This gradually increasing thickness of the locking plate 560 in the area of the tapered portion 565 may provide some additional assurance that the head 620 of the pin 600 will securely engage the locking plate 560 as the pin 600 moves along the elongated end 570A of the keyhole slot 570, even if there is some fluctuation in the distance between the head 620 of the pin 600 and the top surface of the drum base 113A. In some implementations, in which the pin 600 is a fastener, such as a screw, that may be threadably coupled to the drum base 113A, a height of the head 620 of the fastener 600 may be adjusted by the user, by, for example, rotation of the pin 600 with a screwdriver or other appropriate tool.

Figure 18C:
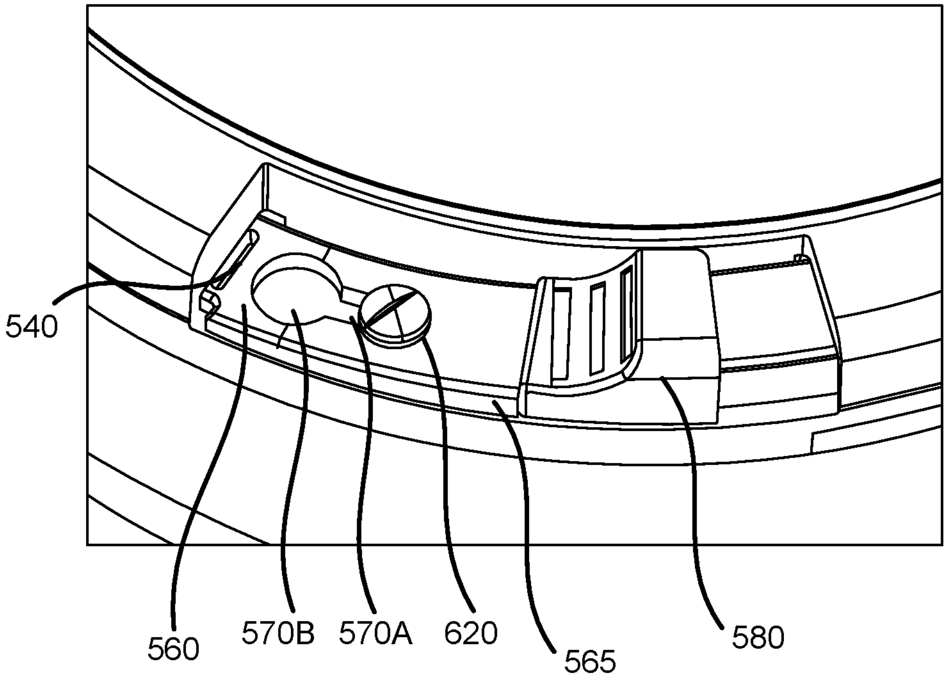
Figure 18D:
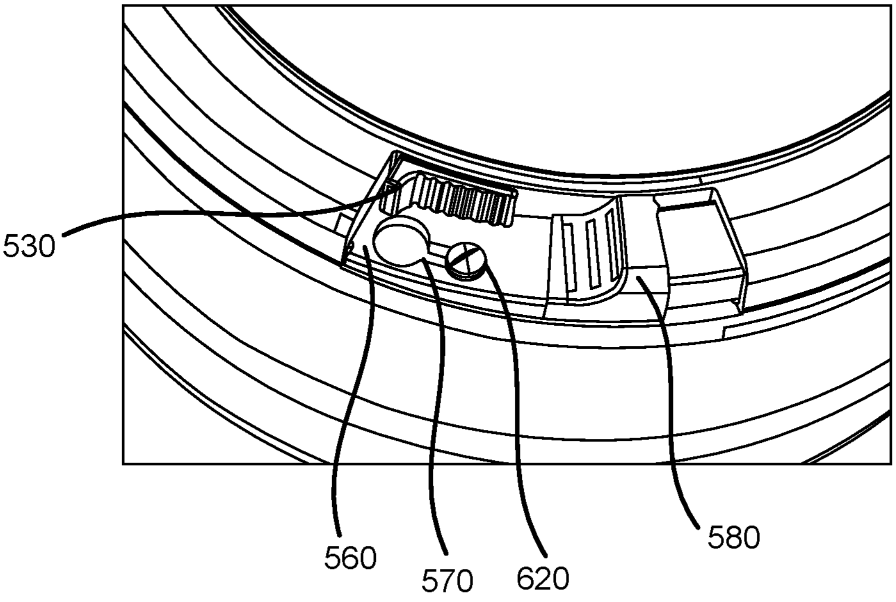

In some situations, one or more of the cover taper locks may seize due to inactivity, may creep, corrode, or otherwise degrade over time, rendering the cover taper lock difficult to disengage. In some implementations, a release slot 540 may be formed in the locking plate 560, as shown in FIG. 18C. This may allow a tool, for example, a prying tool such as the working end of a flat head screwdriver, to be inserted into the release slot 540 to facilitate release of the cover taper lock. In some implementations, a release pad 530 may be included, for example, on a peripheral edge of the locking plate 560, as shown in FIG. 18D. The release pad 530 may provide a gripping surface to facilitate manual manipulation of a positon of the locking plate 560 by a user.

Figure 19B:
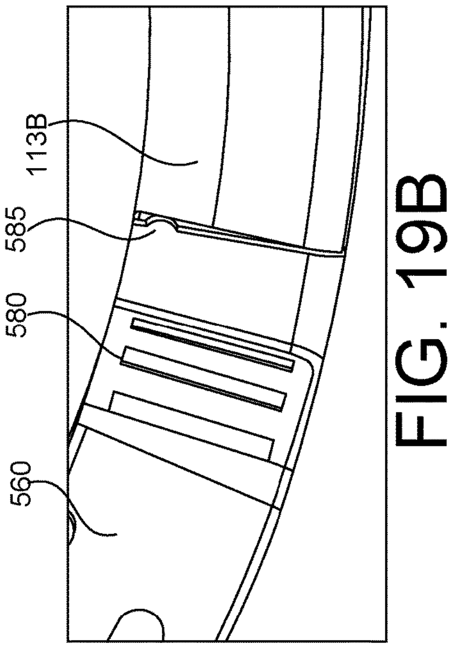
FIGS. 19A-19E illustrate operation of a retaining device of a cover taper lock of a drain cleaning device, in accordance with implementations as described herein.
Figure 19D:
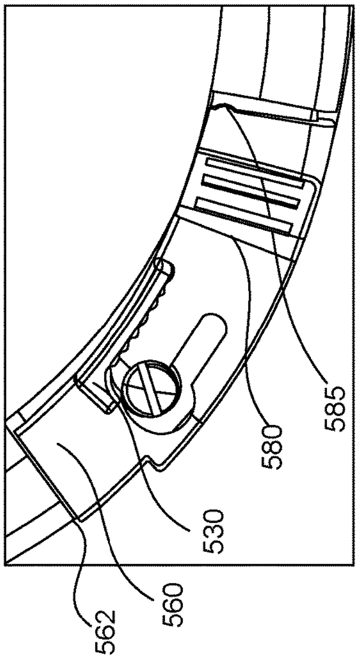
Figure 19E:
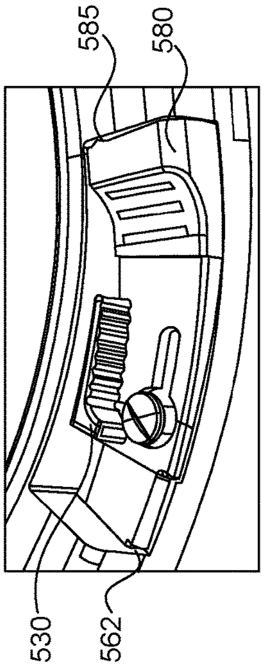
Figure 19A:
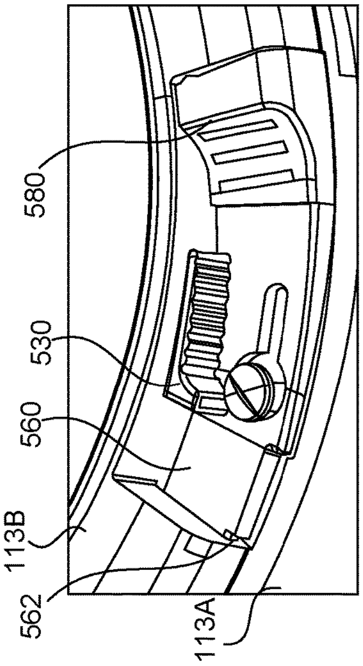
Figure 19C:
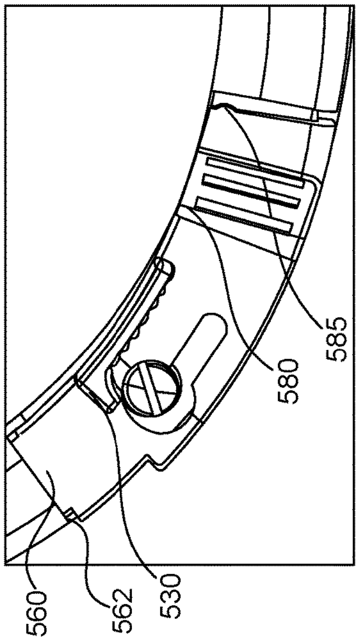

In some situations, the user may choose to maintain the cover taper locks 550 in the open, unlocked position, for example, while making adjustments to other areas of the device, tending to a peripheral task, and the like. As shown in FIG. 19A, the user may apply a force on the actuating pad 580, causing the pair of cover taper locks 550 to be drawn together (as described above with respect to FIGS. 17A-17E. In some implementations, this may cause an articulating protrusion 585, or dimple 585, for example, a cylindrical, or curved, or arcuate, or semispherical protrusion or dimple 585, for example, on an edge of the actuating pad 580, to contact a side wall of the recess 119 formed in the drum cover 113B, as shown in FIG. 19B), thus causing the locking plate 560/taper cover lock 550 to articulate, or rotate, outward, as illustrated by the arrow shown in FIG. 19C. Rotation of the locking plate 560/cover taper lock 550 in this manner may in turn cause a step 562 formed in an outer peripheral corner of the locking plate 560 to catch and engage a corresponding corner portion of the recess 119 formed in the drum cover 113B, as shown in FIG. 19D. Engagement between the step 562 formed in the outer peripheral corner of the locking plate 560 and the corner portion of the recess 119 in this manner may hold the cover taper lock 550 in the open, or unlocked position. The step 562 may be disengaged from the corner of the recess 119 to release the cover taper lock 550 from the open, or unlocked position by application of a force to the release pad 530, as shown in FIG. 19E. Upon release of the cover taper lock 550 from open, or unlocked position, the biasing force of the spring 700 will cause the locking plate 560/cover taper lock 550 to move in an arcuate path, causing the pin 600 to be positioned in the elongated end 570A of the keyhole slot 570, and causing the tapered portion 565 of the locking plate to tighten under the head 620 of the pin 600.

The cover taper lock assemblies 500 described above may include pairs of cover taper locks 550 (550A, 550B, as described above) that function together to lock and release the coupling of the drum cover 113A and the drum base 113A. In some implementations, as shown in FIGS. 20A-20F, a cover taper lock assembly may include a plurality of cover taper locks 850 that operate independently. In the implementation shown in FIGS. 20A-20E, the keyhole slots 570 formed in the locking plates 560 of each of the cover taper locks 850 may all be oriented in essentially the same circumferential direction. That is, each of cover taper locks 850 may be essentially the same (rather than the mirror image cover taper lock pairs 550A and 550B described above), with the elongated ends 570A and the enlarged ends 570B of each of the keyhole slots, the tapered portions 565, and the actuating pads 580 oriented in essentially the same manner.

Figure 20A:
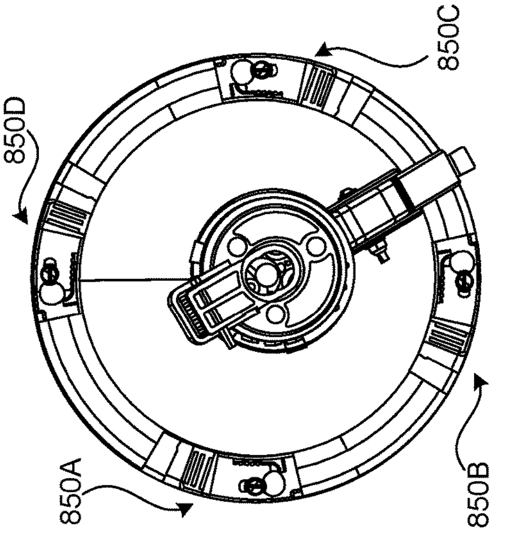
FIGS. 20A-20F illustrate operation of cover taper locks of a drain cleaning device, in accordance with implementations as described herein.
Figure 20B:
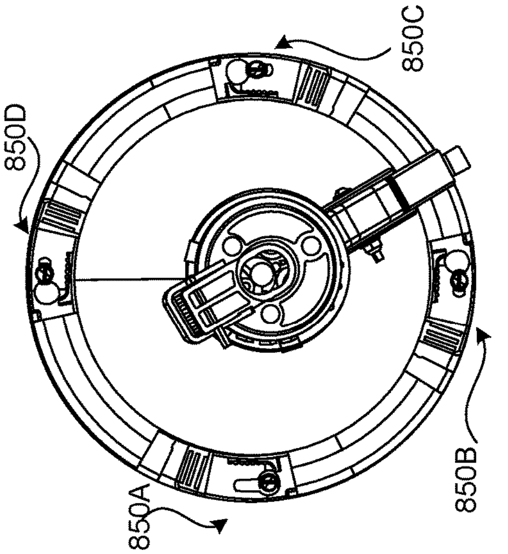
Figure 20C:
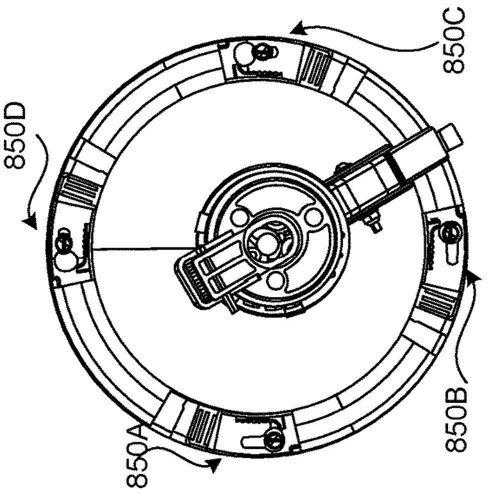
Figure 20D:
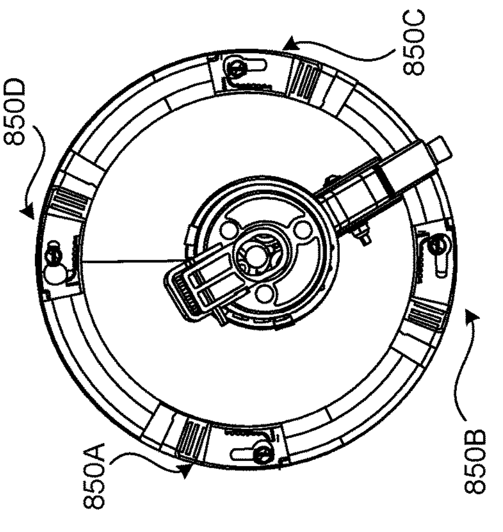
Figure 20E:
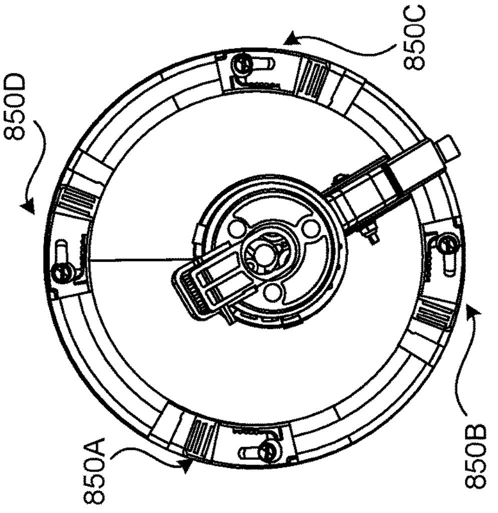
Figure 20F:
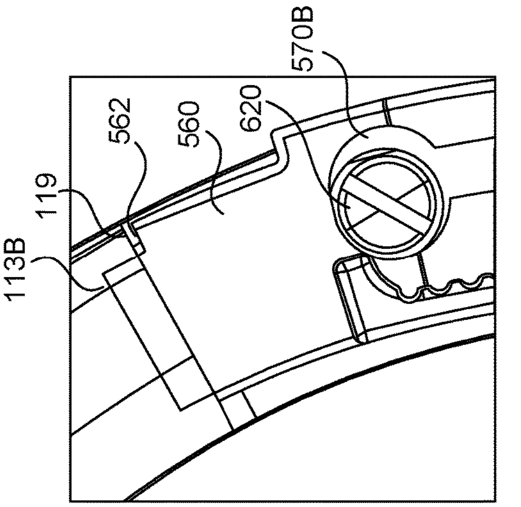

In FIG. 20A, each of the four exemplary cover taper locks 850 (850A, 850B, 850C and 850D) are in the locked position, with the head 620 of each pin 600 engaged against the tapered portion 565 of its respective locking plate 560, maintained in the locked position under the biasing force exerted on the respective cover taper lock 850 by the spring 700 as previously described. In FIG. 20B, a first cover taper lock 850A has been moved to the unlocked position, with the head 620 of each pin now positioned in the enlarged end 570B of the keyhole slot 570 of the cover taper lock 850A. The first cover taper lock 850A may be maintained in the open, unlocked position shown in FIG. 20B by, for example, engagement between the step 562 and the corner of the recess 119, as described above with respect to FIGS. 19A-19E, and as illustrated in FIG. 20F. In FIG. 20C, the second cover taper lock 850B has been moved to and latched in the opened, unlocked position. In FIG. 20D, the third cover taper lock 850C has been moved to and latched in the opened, unlocked position. In FIG. 20E, the fourth cover taper lock 850D has been moved to and latched in the opened, unlocked position. In the arrangement shown in FIG. 20E, with all four of the cover taper locks 850A, 850B, 850C and 850D in the opened, unlocked position, the drum cover 113B may be lifted off of, and removed from the drum base 113A as described above.

Figure 21A:
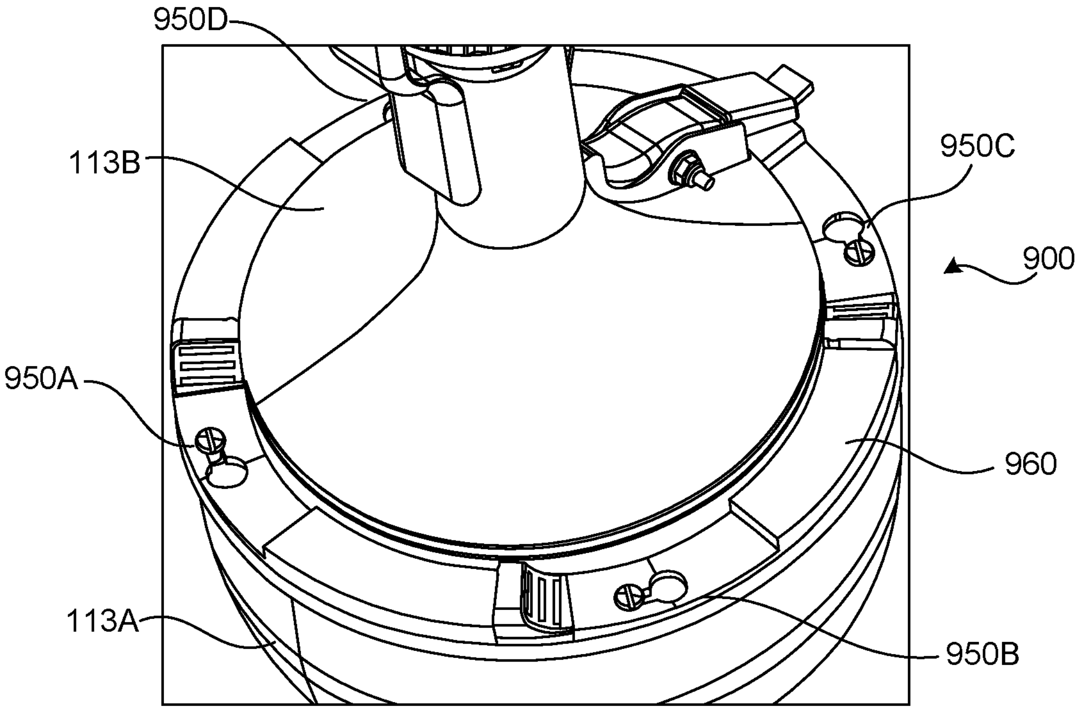
FIGS. 21A-21D illustrate operation of cover taper locks of a drain cleaning device, in accordance with implementations as described herein.
Figure 21B:
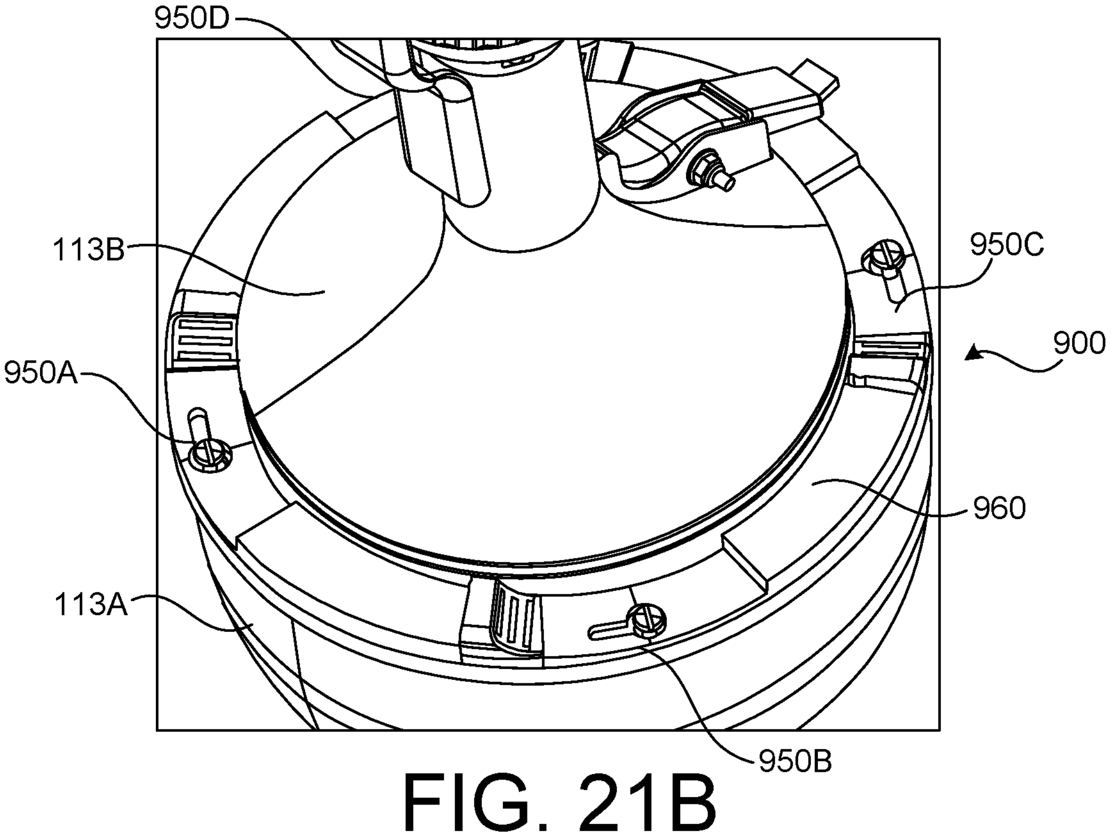
Figure 21C:
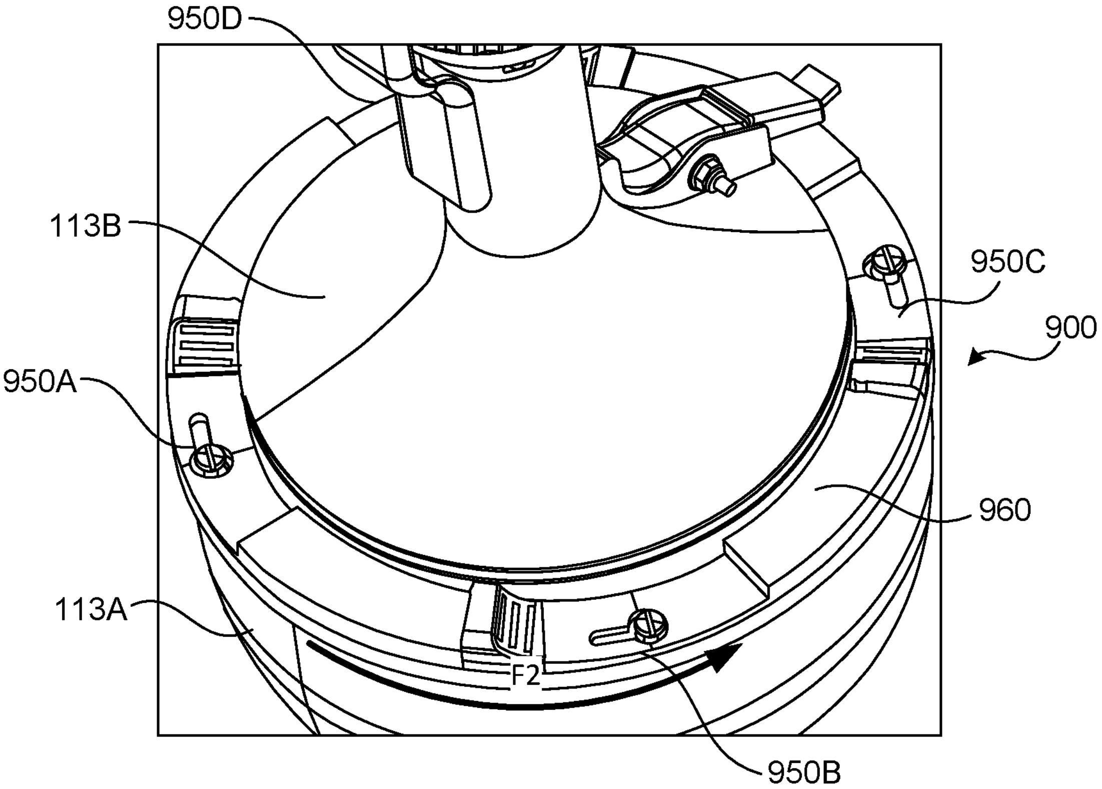
Figure 21D:
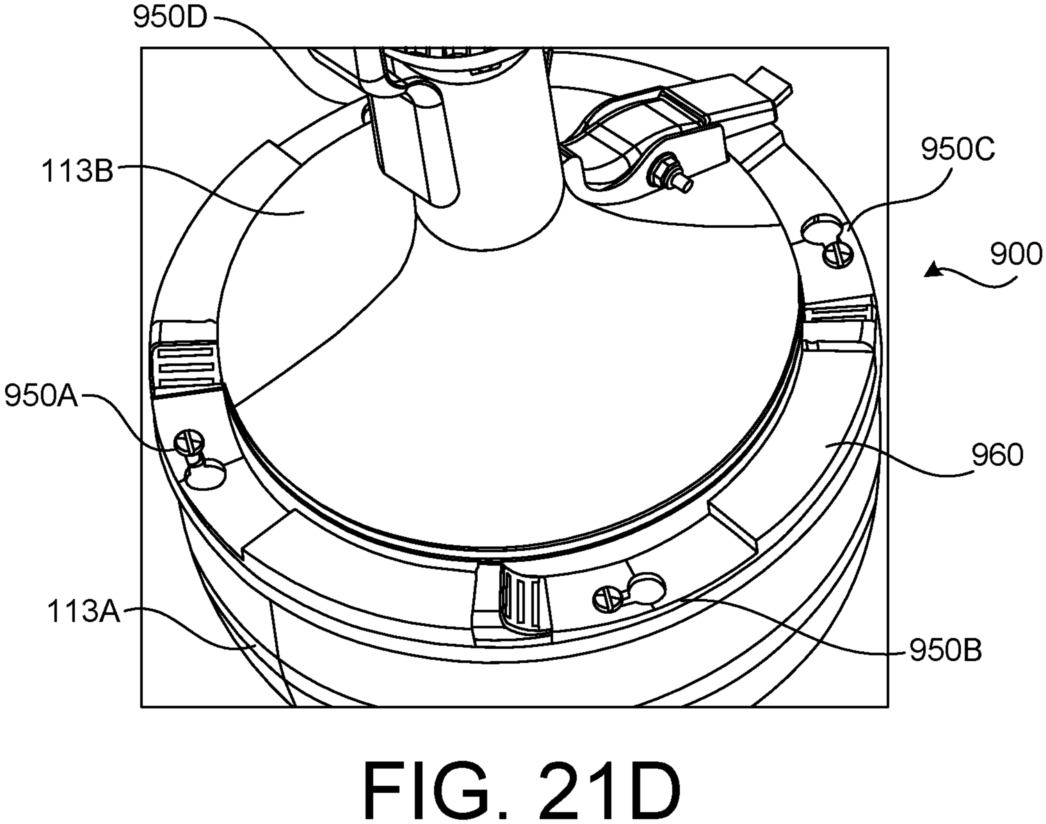

FIGS. 21A-21D illustrate an implementation of a cover lock assembly 900, in which multiple cover taper locks 950 (950A, 950B, 950C and 950D) are operated simultaneously, in response to a single rotational force applied to the cover lock assembly 900 by the user. In the example implementation shown in FIGS. 21A-21D, the multiple cover taper locks 950A, 950B, 950C and 950D are integrated into a single locking ring 960. In FIG. 21A, all of the cover taper locks 950A, 950B, 950C and 950D are in the locked position, with the head 620 of each pin 600 of each of the cover taper locks 950A, 950B, 950C and 950D engaged against a corresponding ramped, or tapered portion of the locking ring 960, and maintained in the locked position under a biasing force exerted on the respective cover taper lock 950A, 950B, 950C and 950D by the spring 700 as previously described. As the user applies a rotational force F1 to the locking ring 960 (in the clockwise direction shown in FIG. 21A), the locking ring 960 rotates, moving the head 620 from the elongated end 570A of the keyhole slot 570 of its respective cover taper lock 950A, 950B, 950C and 950D into the enlarged end 570B of the keyhole slot 570, thus moving all four cover taper locks 950A, 950B, 950C and 950D simultaneously into the opened, unlocked position shown in FIG. 21B. From the opened, unlocked position shown in FIG. 21B, the drum cover 113B may be lifted off of and removed from the drum base 113A as previously described. Similarly, to couple the drum cover 113B to the drum base 113A, the user may align each head 620 with the corresponding enlarged end 570B of the keyhole slot 570 of the respective cover taper lock 950A, 950B, 950C and 950D, and then apply a rotational force F2 to the locking ring 960 (in the counter clockwise direction shown in FIG. 21C) until each cover taper lock 950A, 950B, 950C and 950D is in the locked position, with each head 620 positioned in the elongated end 570A of the keyhole slot 570 of its respective cover taper lock 950A, 950B, 950C and 950D, with the head 620 engaged against the corresponding tapered portion of the locking ring 960, as shown in FIG. 21D.

In the example cover lock assemblies described above with respect to FIGS. 15-21E, a drum cover (for example, the drum cover 113B shown in FIG. 1C, or the drum cover 4113B shown in FIG. 13A) may be quickly and easily attached to and detached from a drum base (for example, the drum base 113A shown in FIG. 1C, or the drum base 4113A shown in FIG. 13A). This may facilitate removal and replacement of drain cleaning cables from the drum assembly, enhancing convenience, efficiency and effectiveness in operation of the drain cleaning device.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A drain cleaning device, comprising:

a drum assembly coupleable to a power unit with a motor for rotation by the motor, the drum assembly including a base configured to receive a cable, a cover releasably coupleable to the base, and a tool-free lock assembly that releasably couples the cover to the base, the tool-free lock moveable, without use of a secondary tool, between a locked position in which the cover is coupled to the base and an unlocked position in which the cover is removable from the base; and a feed handle assembly coupled to the drum assembly and configured to receive the cable to feed the cable into a drain, wherein the tool-free lock assembly comprises a taper lock including a locking plate movable between the locked position and the unlocked position, the locking plate including a keyhole slot having an elongated portion and an enlarged portion, an engagement pin configured to be selectively receivable in the elongated portion or the enlarged portion based on a position of the locking plate, and an elastic member configured to bias the locking plate toward the locked position, the locking plate being movable against the biasing force to be moved to the unlocked position in response to an external force applied to the locking plate.

2. The drain cleaning device of claim 1, wherein the taper lock is coupled to an outer peripheral portion of the cover and to an outer peripheral portion of the base.

3. The drain cleaning device of claim 1, wherein a thickness of the locking plate increases gradually from a portion of the locking plate corresponding to the enlarged portion of the keyhole slot to a portion of the locking plate corresponding to the elongated portion of the keyhole slot.

4. The drain cleaning device of claim 1, wherein the engagement pin includes a shank extending upward from the outer peripheral portion of the base and receivable through the keyhole slot in the locking plate, and a head at a top end portion of the shank, the head selectively engaging a top surface of the locking plate based on a position of the engagement pin in the keyhole slot.

5. The drain cleaning device of claim 4, wherein, in the unlocked position, the head of the engagement pin is at a position corresponding to the enlarged portion of the keyhole slot, and, in the locked position, the shank of the engagement pin is received in the elongated portion of the keyhole slot such that the head of the engagement pin abuts a top surface of the locking plate.

6. The drain cleaning device of claim 1, wherein the tool-free lock assembly further comprises an actuating pad provided on a top surface of the locking plate and configured to receive a first external force, the first external force moving the tool-free lock assembly from the locked position to the unlocked position, an articulating protrusion formed on an edge of the actuating pad, at a first end portion of the tool-free lock assembly, and a stepped portion formed in an edge portion of the locking plate, at a second end portion of the tool-free lock assembly opposite the first end portion of the taper lock.

7. The drain cleaning device of claim 6, wherein the articulating protrusion is configured to contact a first lateral side wall of a recess in response to the first external force applied to the actuating pad, and to articulate the second end portion of the tool-free lock assembly outward, and wherein the stepped portion is configured to engage a corner portion of a second lateral side wall of the recess, opposite the first lateral side wall of the recess, in response to the outward articulation of the tool-free lock assembly, the engagement of the stepped portion of the locking plate with the corner portion of the second lateral side wall of the recess holding the tool-free lock assembly in the unlocked position.

8. The drain cleaning device of claim 7, further comprising a release pad extending upward from a top portion of the locking plate, wherein the locking plate is configured to articulate inward, from the unlocked position, in response to a second external force applied to the release pad, releasing the engagement of the stepped portion of the locking plate with the corner portion of the second lateral side wall of the recess.

9. The drain cleaning device of claim 1, wherein the engagement pin is configured to be received in the elongated portion when the locking plate is in the locked position and is configured to be removable from the enlarged portion when the locking plate is in the unlocked position.

10. A drain cleaning device, comprising:
- a power unit including a housing that contains a motor;
- a drum assembly coupleable to a power unit for rotation by the motor, the drum assembly including a base configured to receive a cable, a cover releasably coupleable to the base, and a tool-free lock assembly that releasably couples the cover to the base, the tool-free lock moveable, without use of a secondary tool, between a locked position in which the cover is coupled to the base and an unlocked position in which the cover is removable from the base; and
- a feed handle assembly coupled to the drum assembly and configured to receive the cable to feed the cable into a drain, wherein the tool-free lock assembly comprises a taper lock including
- a locking plate movable between the locked position and the unlocked position, the locking plate including a keyhole slot having an elongated portion and an enlarged portion,
- an engagement pin configured to be selectively receivable in the elongated portion or the enlarged portion based on a position of the locking plate, and
- an elastic member configured to bias the locking plate toward the locked position, the locking plate being movable against the biasing force to be moved to the unlocked position in response to an external force applied to the locking plate.

11. The drain cleaning device of claim 10, wherein the taper lock is coupled to an outer peripheral portion of the cover and to an outer peripheral portion of the base.

12. The drain cleaning device of claim 11, wherein the locking plate is coupled to the outer peripheral portion of the cover and the engagement pin coupled to the outer peripheral portion of the base.

13. The drain cleaning device of claim 10, wherein a thickness of the locking plate increases gradually from a portion of the locking plate corresponding to the enlarged portion of the keyhole slot to a portion of the locking plate corresponding to the elongated portion of the keyhole slot.

14. The drain cleaning device of claim 10, wherein the engagement pin includes a shank extending upward from the outer peripheral portion of the base and receivable through the keyhole slot in the locking plate, and a head at a top end portion of the shank, the head selectively engaging a top surface of the locking plate based on a position of the engagement pin in the keyhole slot.

15. The drain cleaning device of claim 14, wherein, in the unlocked position, the head of the engagement pin is at a position corresponding to the enlarged portion of the keyhole slot, and, in the locked position, the shank of the engagement pin is received in the elongated portion of the keyhole slot such that the head of the engagement pin abuts a top surface of the locking plate.

16. The drain cleaning device of claim 10, wherein the elastic member is configured to be compressed in response to the external force applied to the locking plate to move the taper lock to the unlocked position.

17. The drain cleaning device of claim 10, wherein the tool-free lock assembly further comprises an actuating pad provided on a top surface of the locking plate and configured to receive a first external force, the first external force moving the tool-free lock assembly from the locked position to the unlocked position, an articulating protrusion formed on an edge of the actuating pad, at a first end portion of the tool-free lock assembly, and a stepped portion formed in an edge portion of the locking plate, at a second end portion of the tool-free lock assembly opposite the first end portion of the taper lock.

18. The drain cleaning device of claim 17, wherein the articulating protrusion is configured to contact a first lateral side wall of a recess in response to the first external force applied to the actuating pad, and to articulate the second end portion of the tool-free lock assembly outward, and wherein the stepped portion is configured to engage a corner portion of a second lateral side wall of the recess, opposite the first lateral side wall of the recess, in response to the outward articulation of the tool-free lock assembly, the engagement of the stepped portion of the locking plate with the corner portion of the second lateral side wall of the recess holding the tool-free lock assembly in the unlocked position.

19. The drain cleaning device of claim 18, further comprising a release pad extending upward from a top portion of the locking plate, wherein the locking plate is configured to articulate inward, from the unlocked position, in response to a second external force applied to the release pad, releasing the engagement of the stepped portion of the locking plate with the corner portion of the second lateral side wall of the recess.

* * * * *